(12) United States Patent
Kroll et al.

(10) Patent No.: US 10,031,019 B2
(45) Date of Patent: *Jul. 24, 2018

(54) WEIGH IN MOTION STRIP SCALE HAVING PLURAL COMPLIANT FEATURES

(71) Applicant: Intercomp Company, Medina, MN (US)

(72) Inventors: William P. Kroll, Medina, MN (US); Karl Kroll, Maple Grove, MN (US); Kai Kroll, Plymouth, MN (US); Matt Young, Golden Valley, MN (US)

(73) Assignee: Intercomp Company, Medina, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/169,570

(22) Filed: May 31, 2016

(65) Prior Publication Data

US 2016/0273955 A1 Sep. 22, 2016

Related U.S. Application Data

(63) Continuation-in-part of application No. 14/051,255, filed on Oct. 10, 2013, now Pat. No. 9,354,105.

(60) Provisional application No. 61/960,140, filed on Sep. 11, 2013, provisional application No. 61/712,002, filed on Oct. 10, 2012.

(51) Int. Cl.
*G01G 19/02* (2006.01)
*G01G 21/28* (2006.01)

(52) U.S. Cl.
CPC ........... *G01G 19/024* (2013.01); *G01G 21/28* (2013.01)

(58) Field of Classification Search
CPC .............................. G01G 19/024; G01G 21/28
See application file for complete search history.

(56) References Cited

U.S. PATENT DOCUMENTS

| | | | | |
|---|---|---|---|---|
| 3,474,875 A | * | 10/1969 | Laimins | G01G 3/1408 177/134 |
| 4,203,497 A | | 5/1980 | Harris | |
| 4,281,728 A | * | 8/1981 | Dickason | G01G 19/027 177/134 |
| 4,282,748 A | * | 8/1981 | Lockery | G01L 1/26 73/1.15 |
| 4,712,423 A | * | 12/1987 | Siffert | G01L 1/16 177/132 |
| 4,799,381 A | * | 1/1989 | Tromp | G01G 19/024 177/211 |
| 4,899,840 A | * | 2/1990 | Boubille | G01G 19/083 177/139 |
| 4,980,936 A | | 1/1991 | Frickland et al. | |
| 5,461,924 A | * | 10/1995 | Calderara | G01G 3/13 73/768 |
| 5,501,111 A | * | 3/1996 | Sonderegger | G01G 3/13 29/25.35 |
| 9,372,110 B2 | * | 6/2016 | Cornu | G01G 3/13 |
| 2004/0132222 A1 | | 7/2004 | Hembree et al. | |

(Continued)

*Primary Examiner* — Randy Gibson
(74) *Attorney, Agent, or Firm* — Skinner and Associates; Joel Skinner

(57) ABSTRACT

A strip scale suitable for use in connection with high speed, in motion weighing applications. The scale has a base, a load cell, a compliant member, and a platform. Also disclosed are load cells for use with the scale, and systems and methods for using the scales.

12 Claims, 59 Drawing Sheets

(56) References Cited

U.S. PATENT DOCUMENTS

| | | | |
|---|---|---|---|
| 2006/0137913 A1* | 6/2006 | Dicko | G01G 7/02 177/1 |
| 2012/0199627 A1 | 8/2012 | Newhouse et al. | |
| 2014/0209395 A1* | 7/2014 | Kroll | G01G 3/14 177/1 |
| 2014/0251700 A1* | 9/2014 | Cornu | G01G 3/13 177/136 |
| 2014/0299390 A1 | 10/2014 | Kroll et al. | |
| 2014/0345955 A1* | 11/2014 | Cornu | G01G 3/13 177/180 |
| 2015/0075297 A1* | 3/2015 | Cornu | G01G 3/13 73/862.642 |

\* cited by examiner

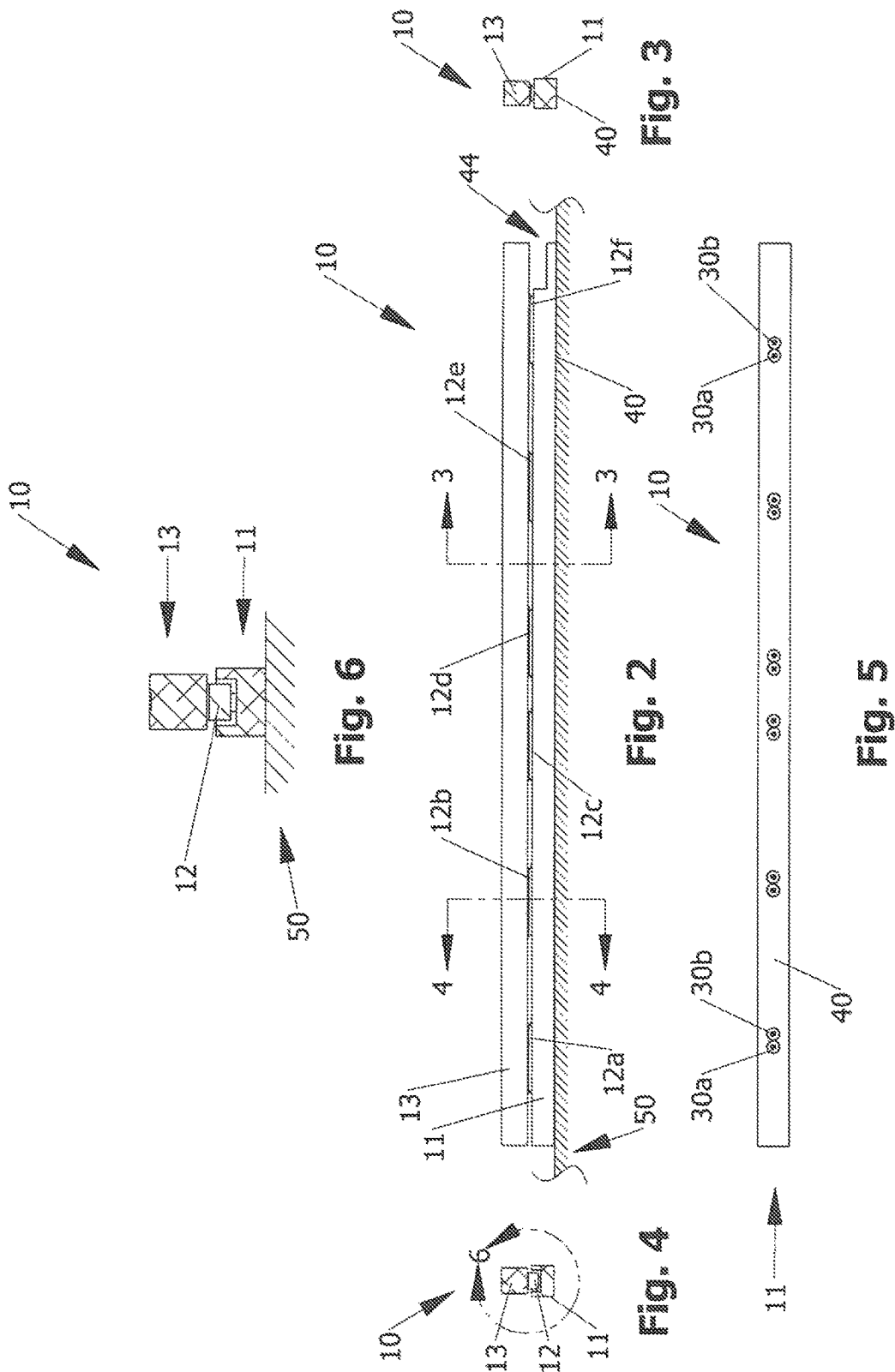

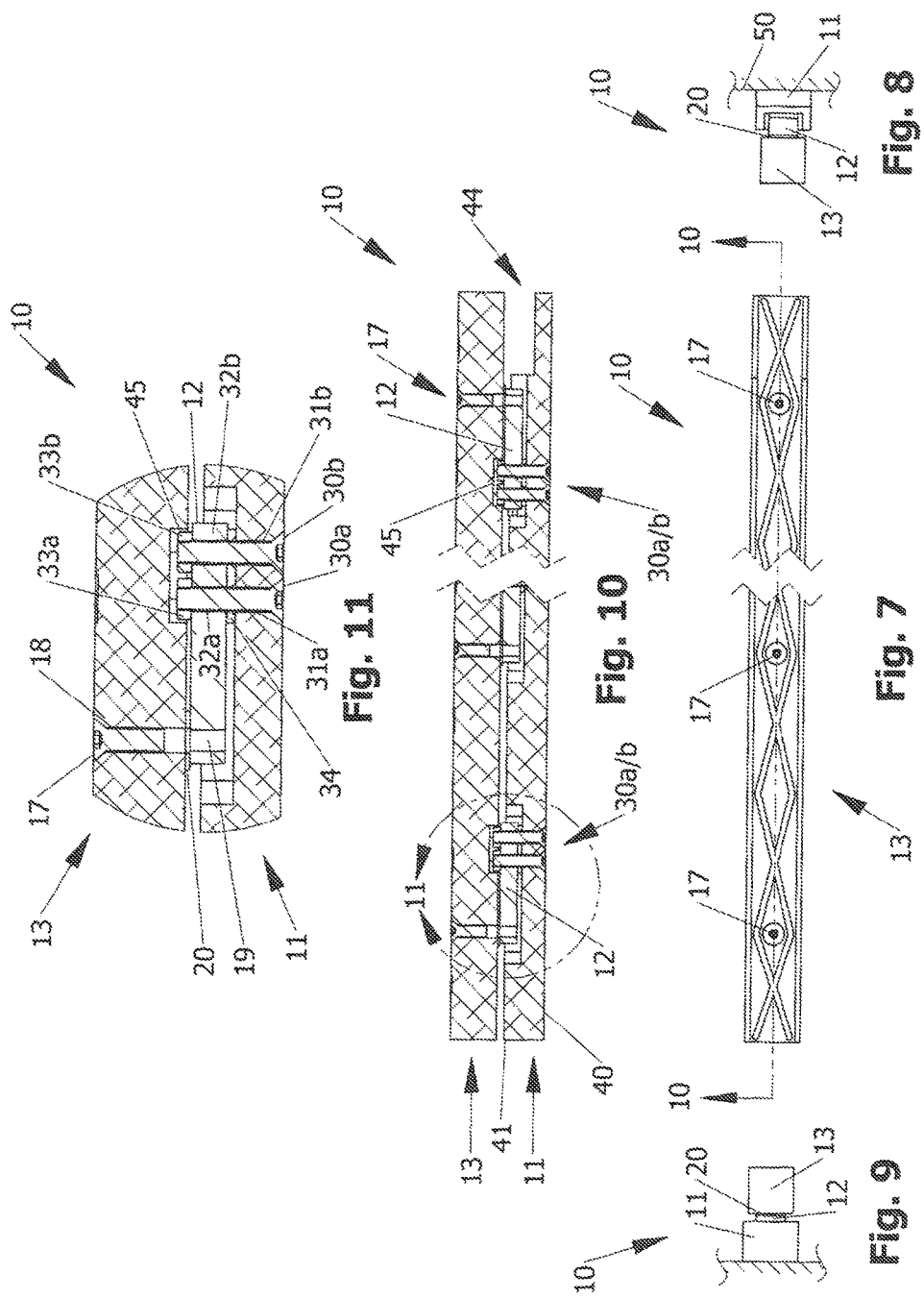

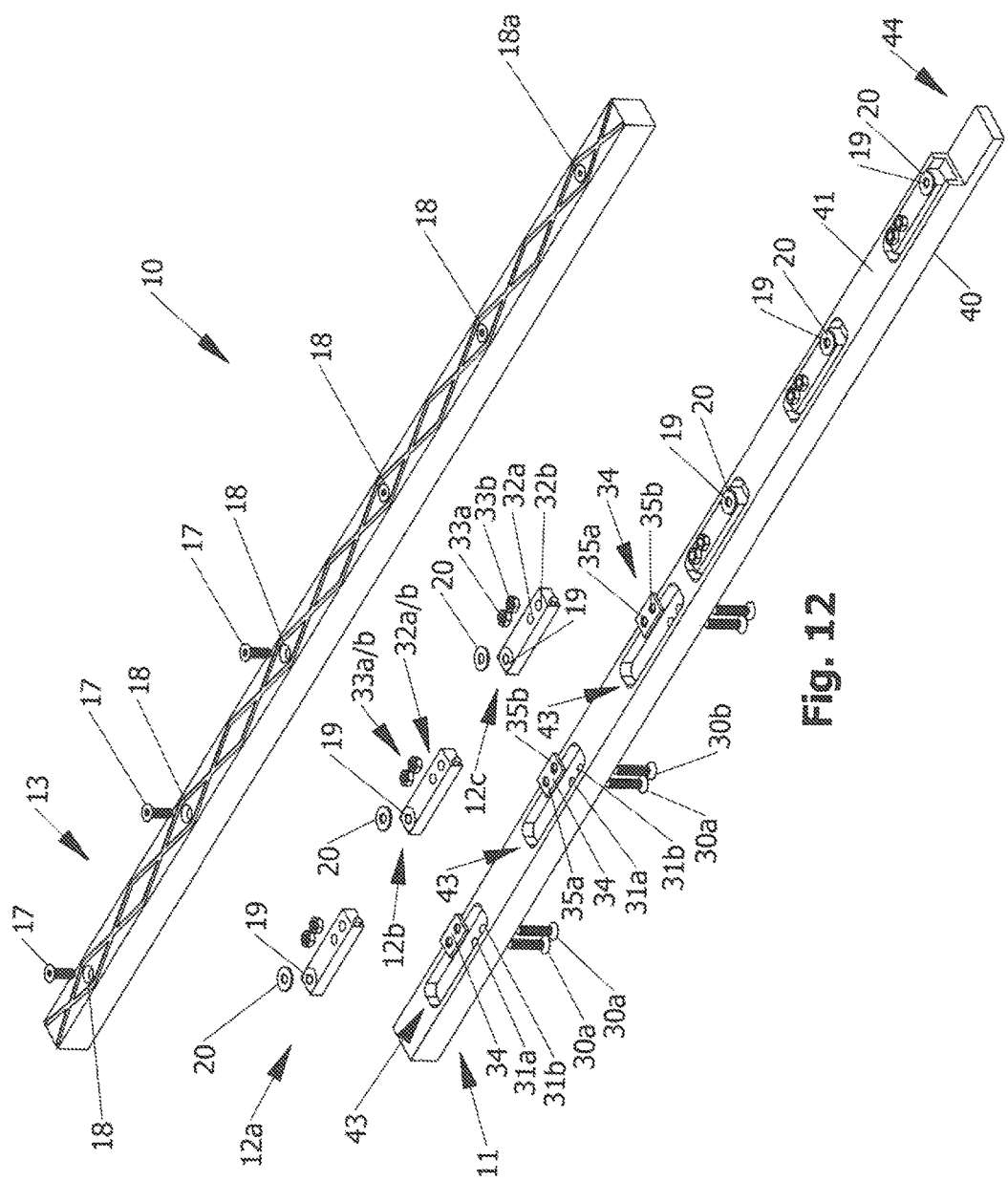

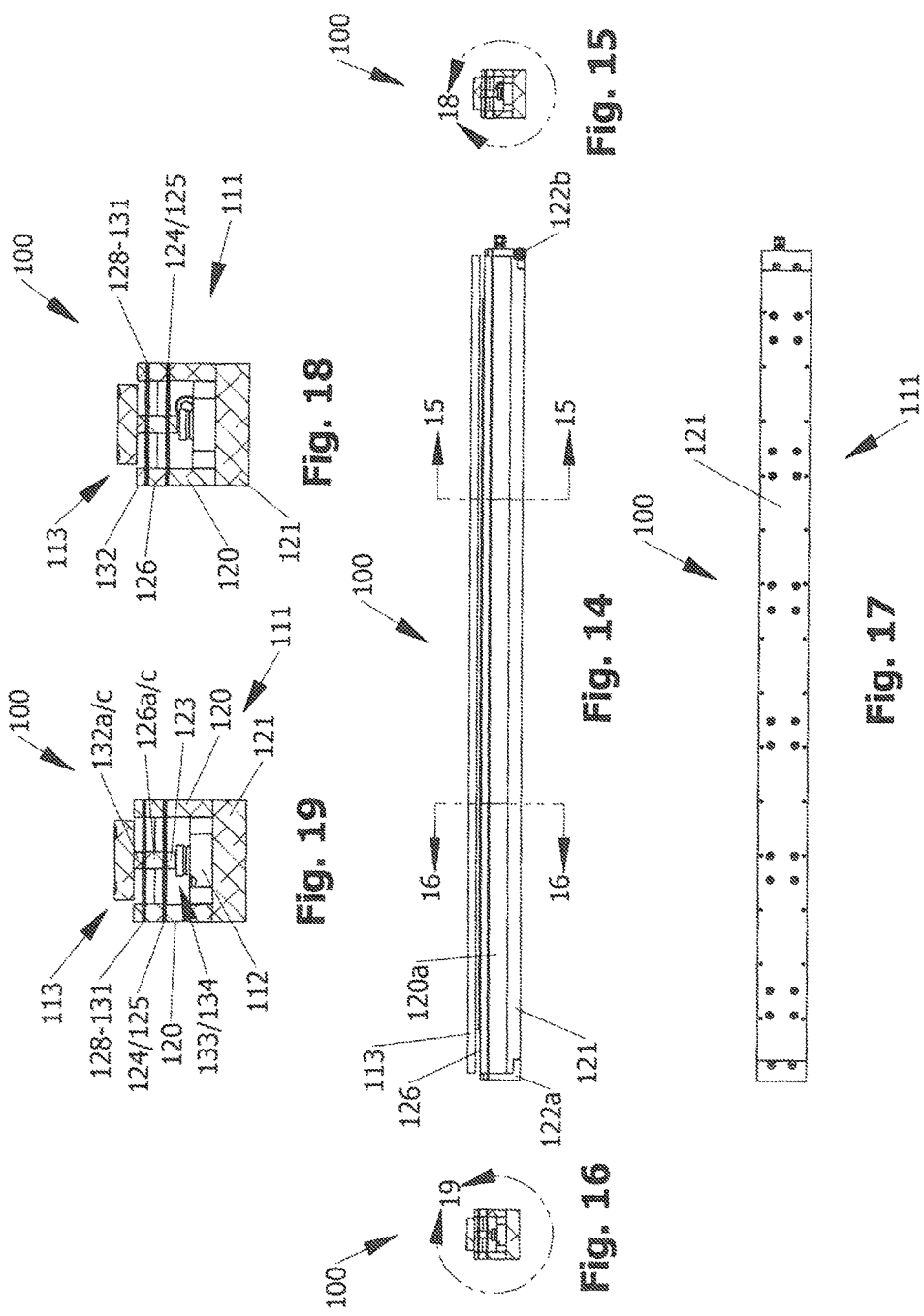

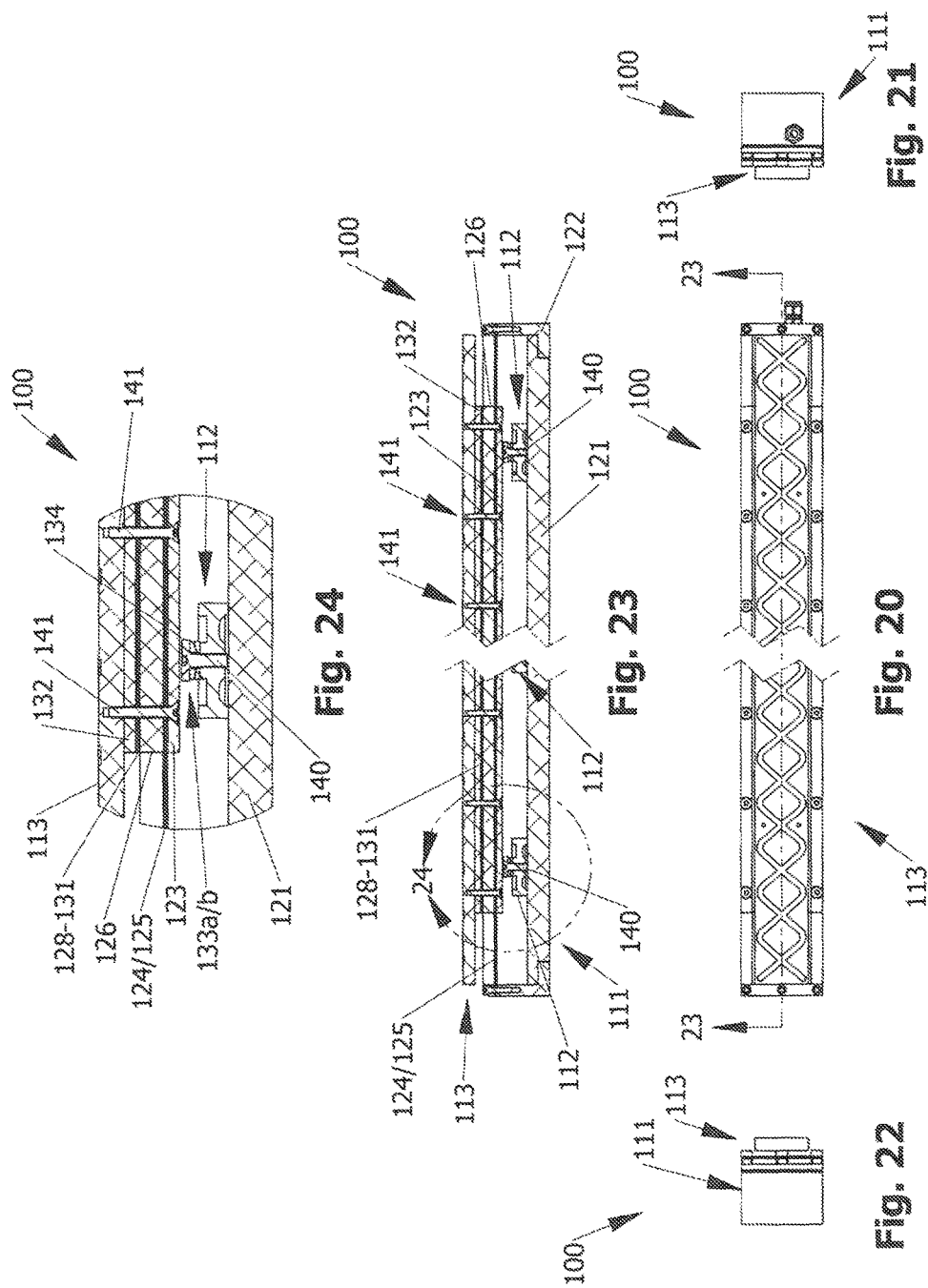

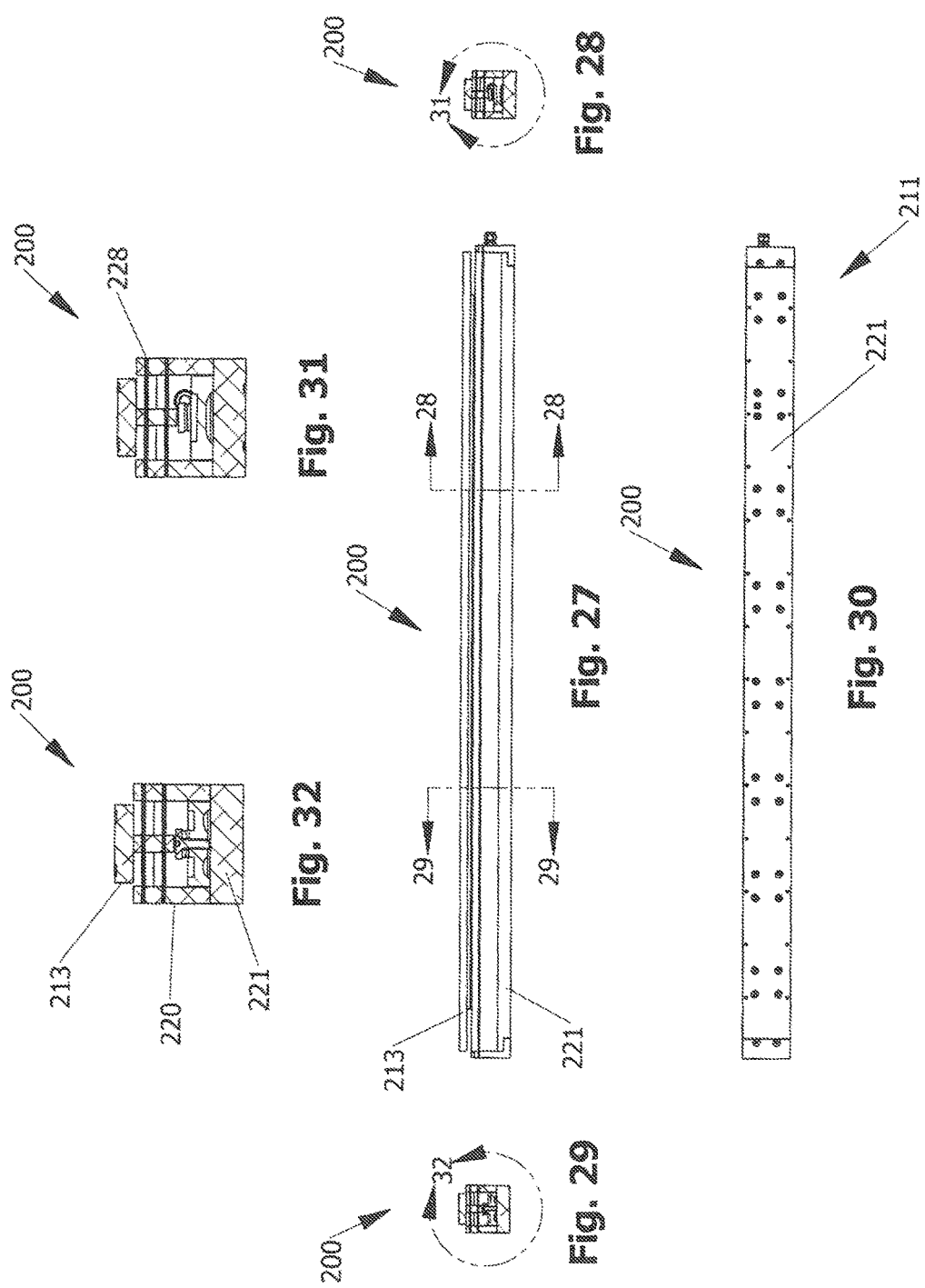

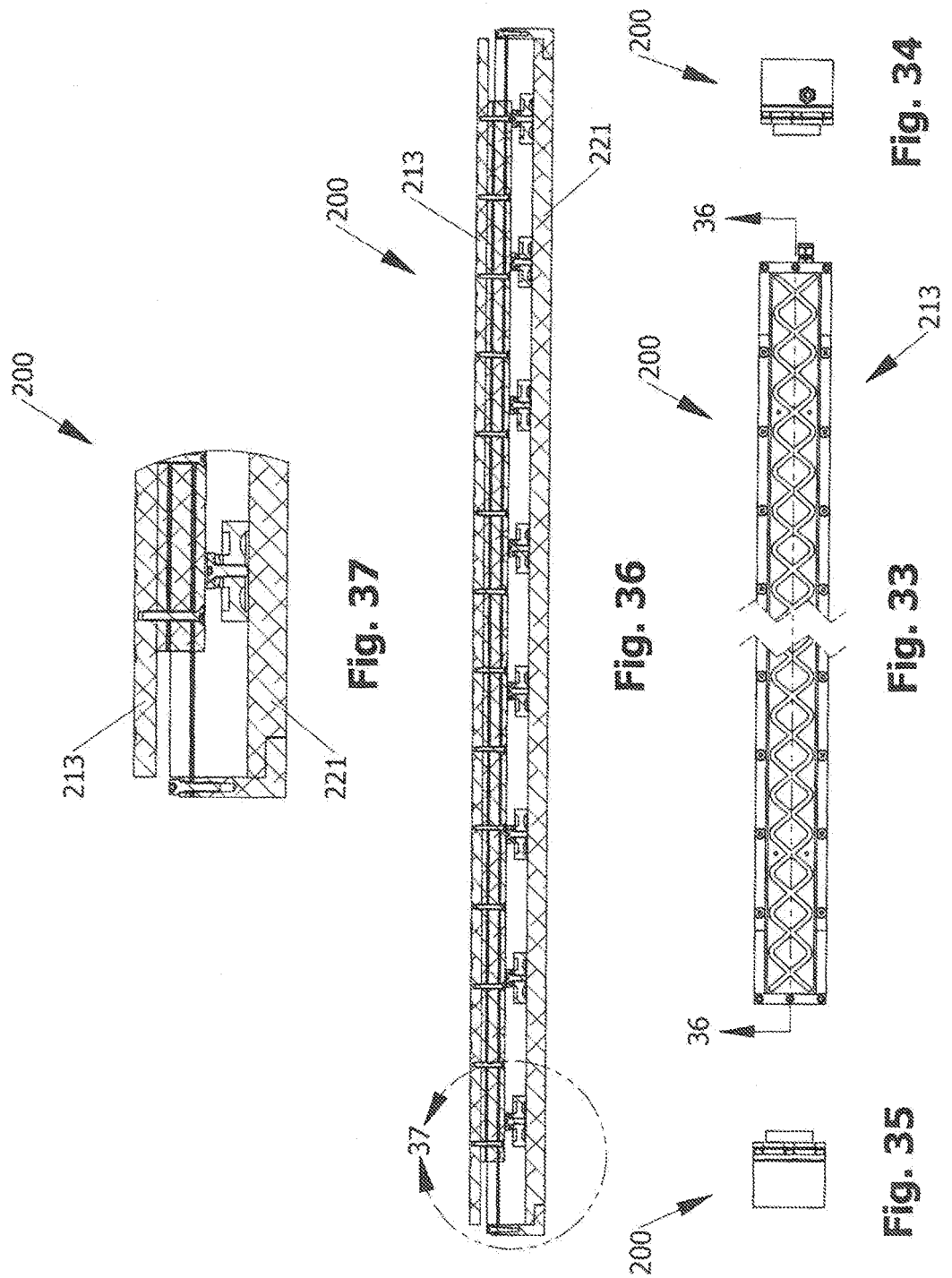

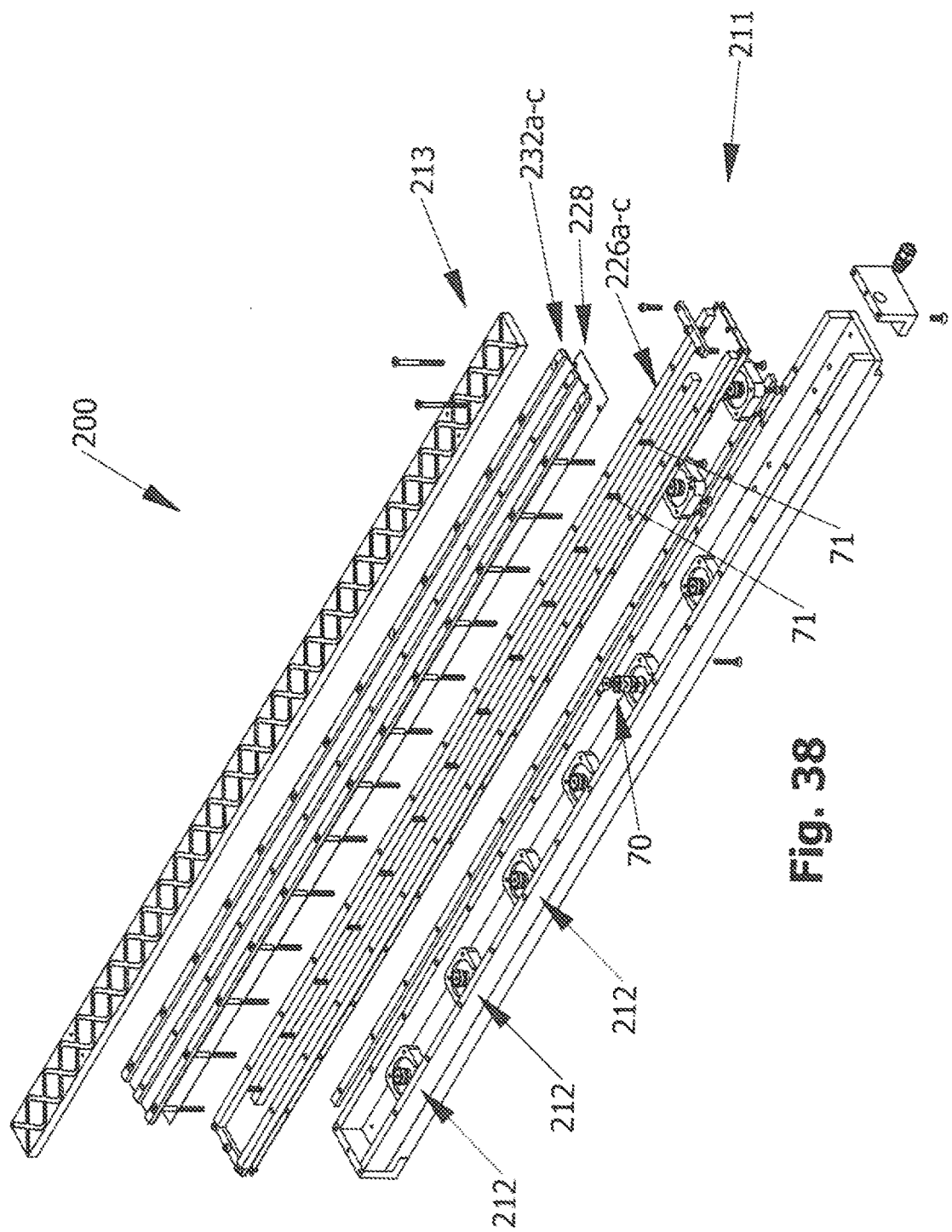

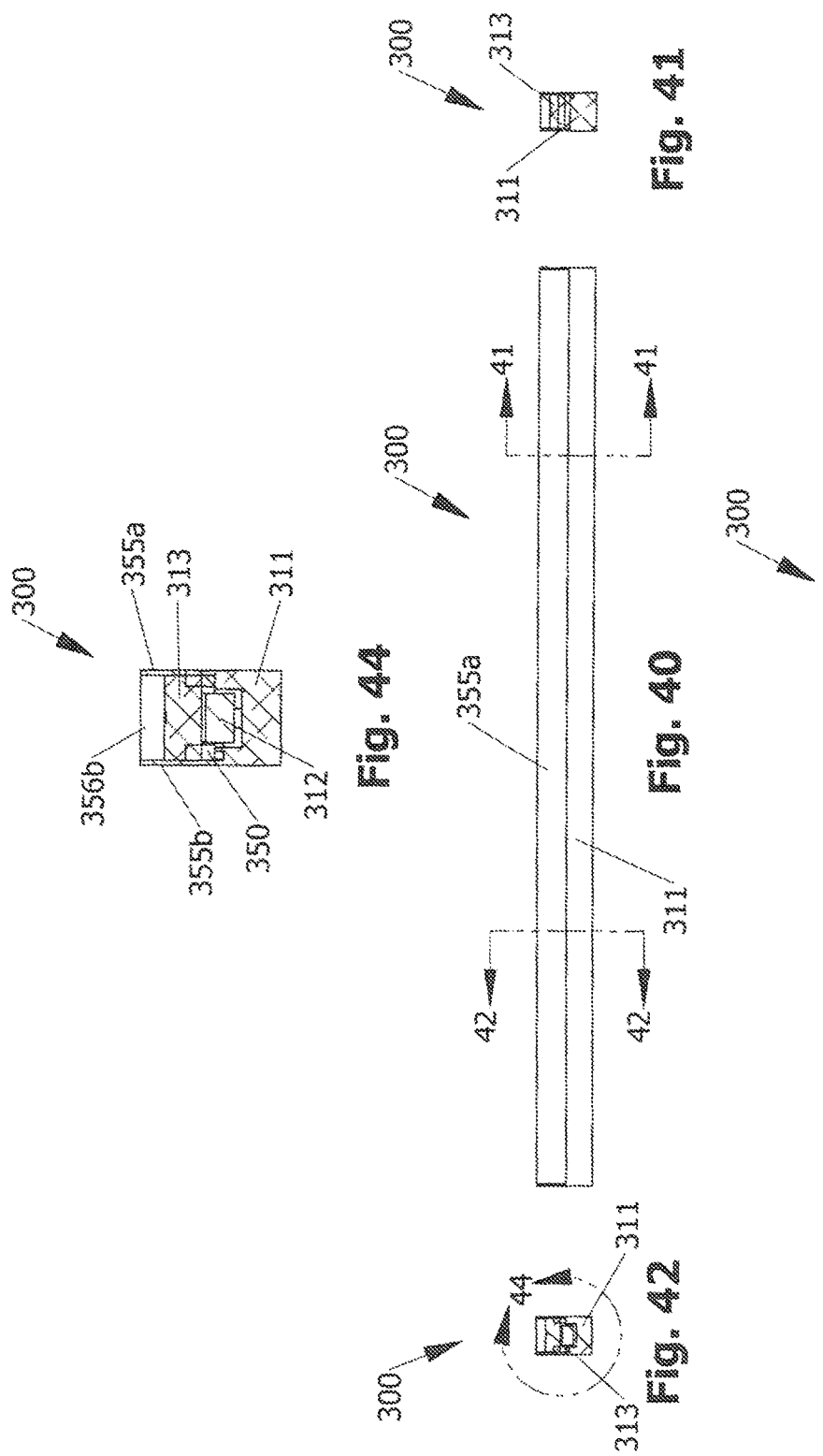

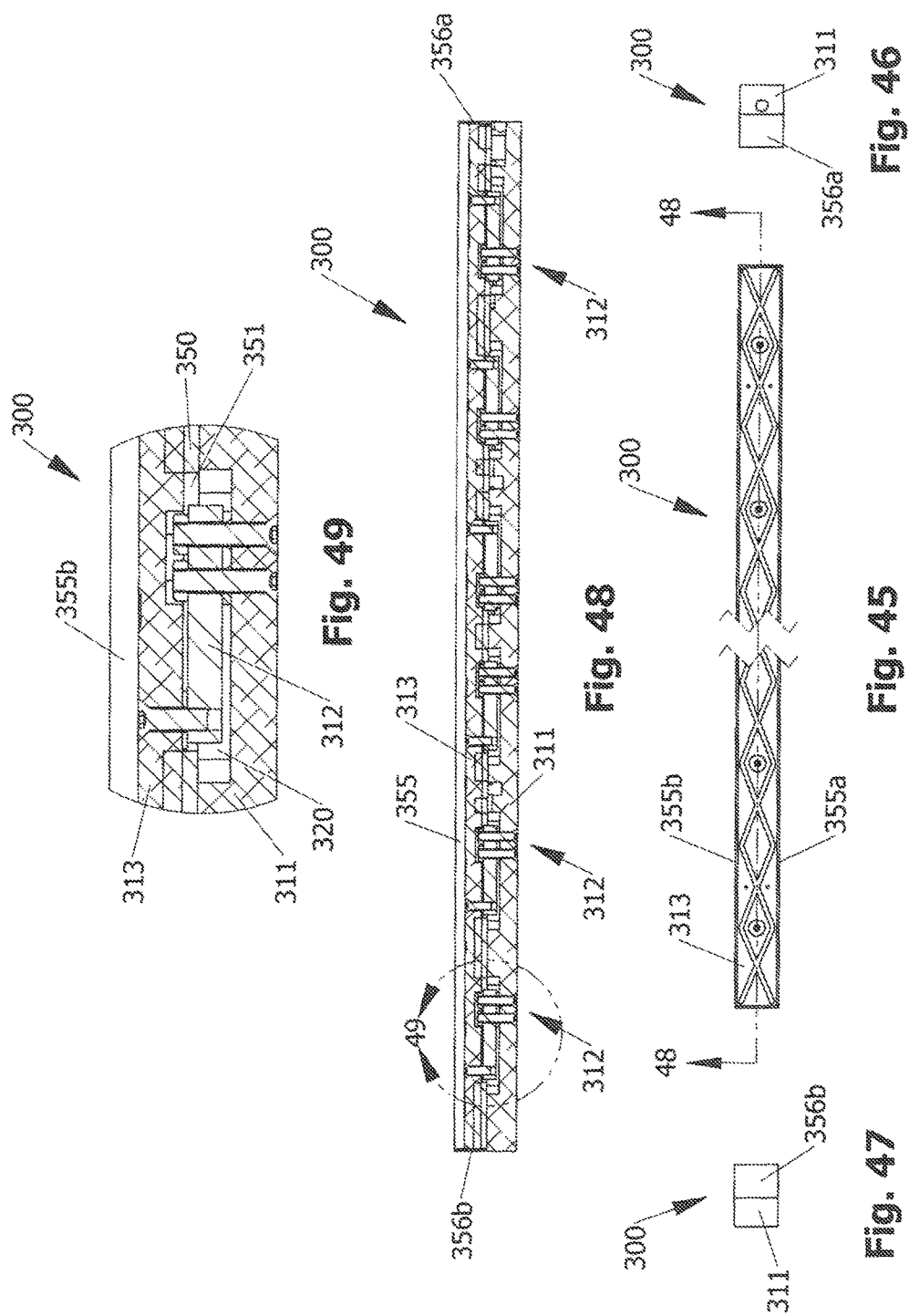

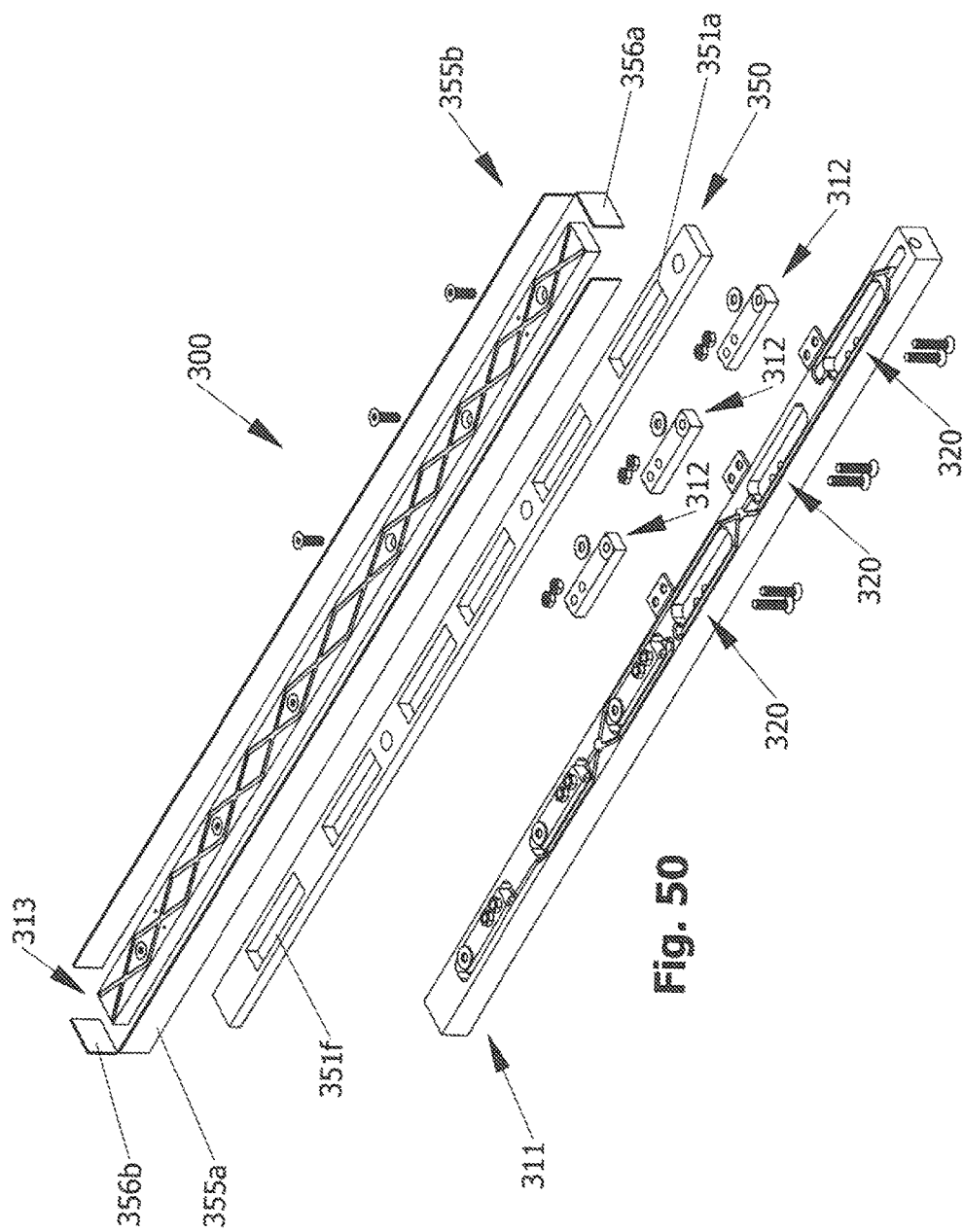

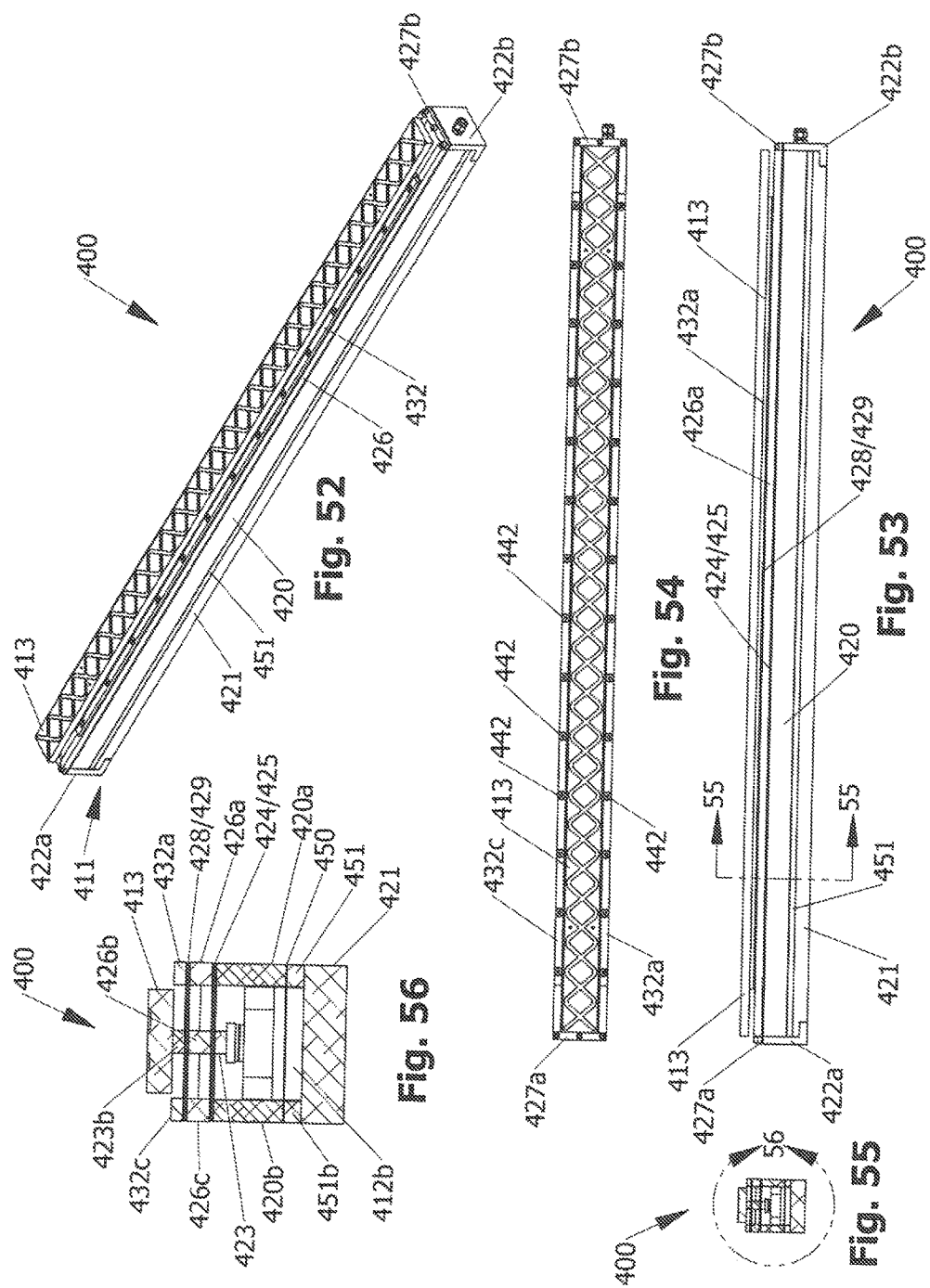

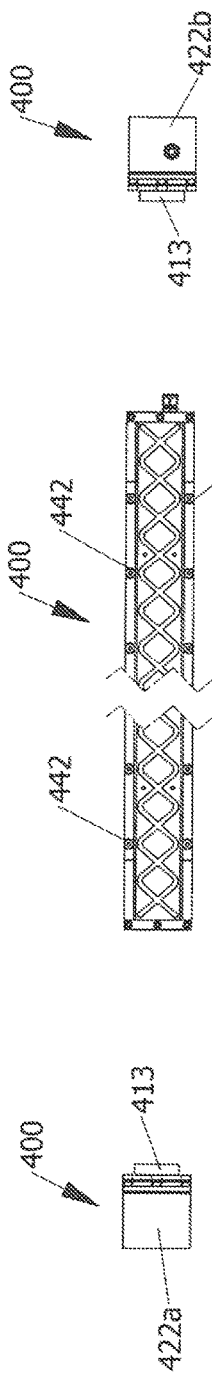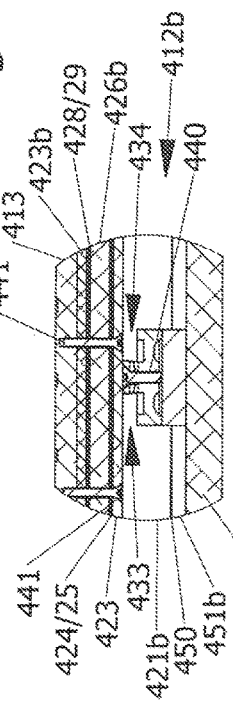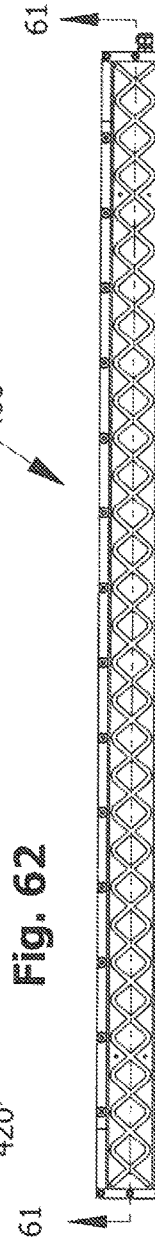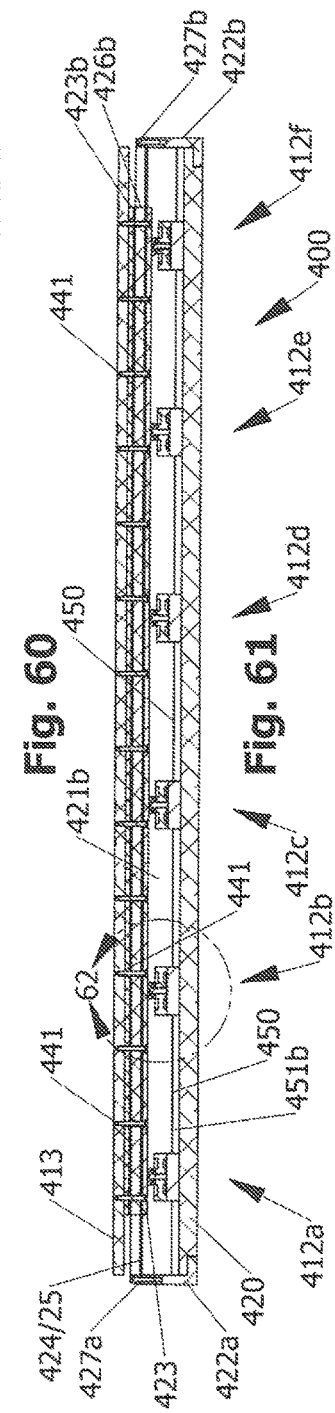

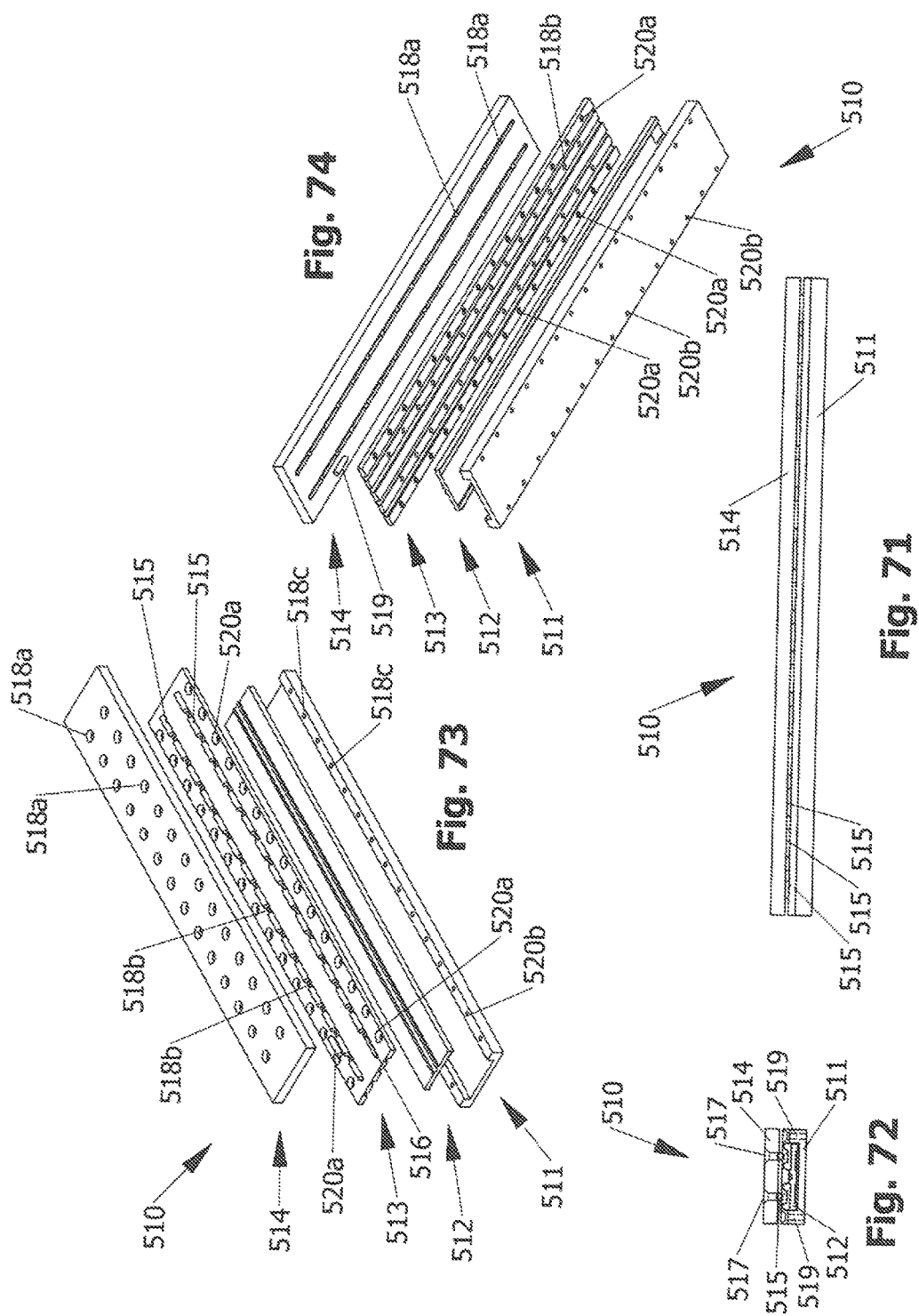

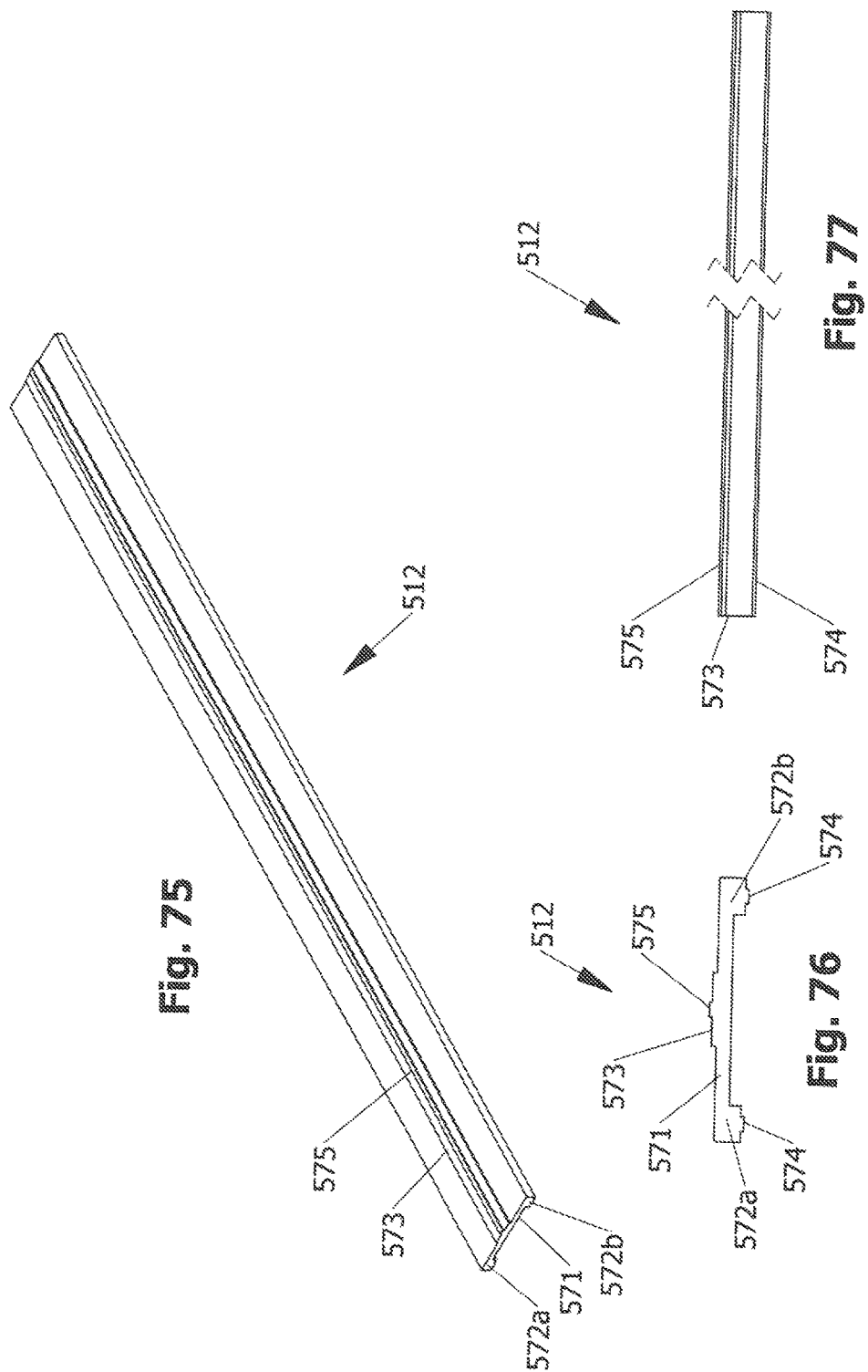

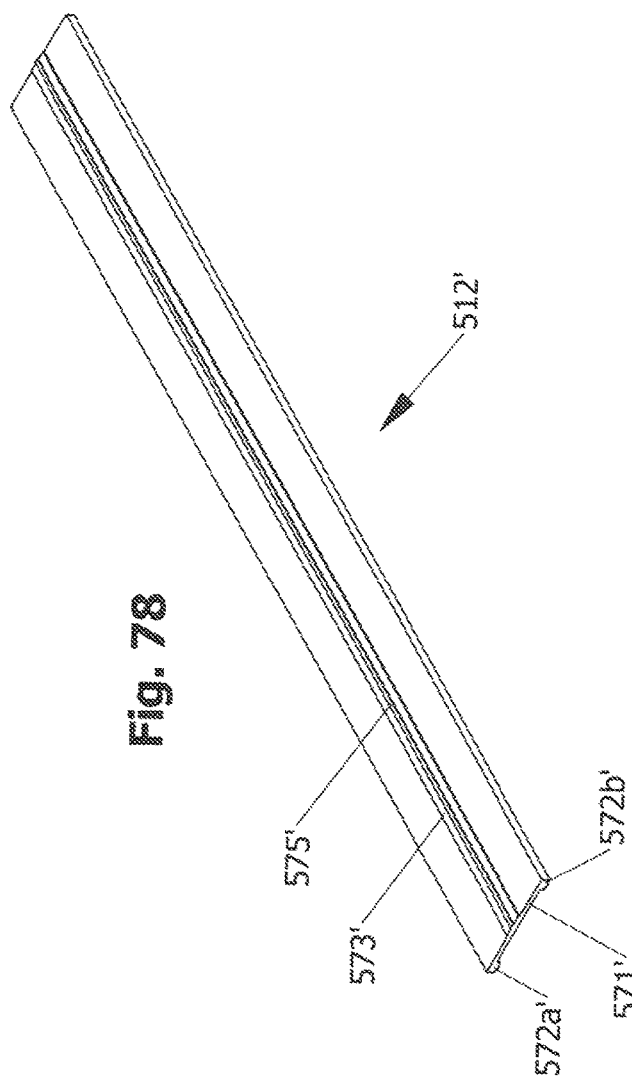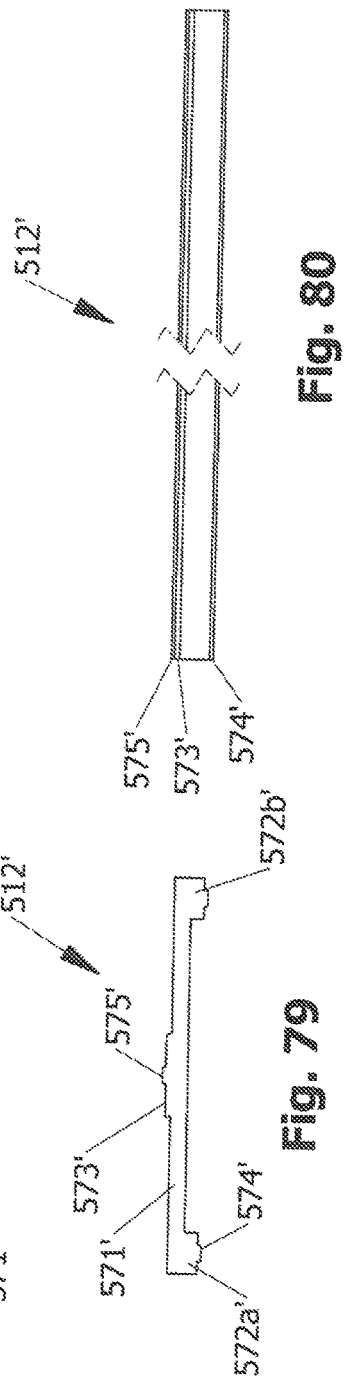

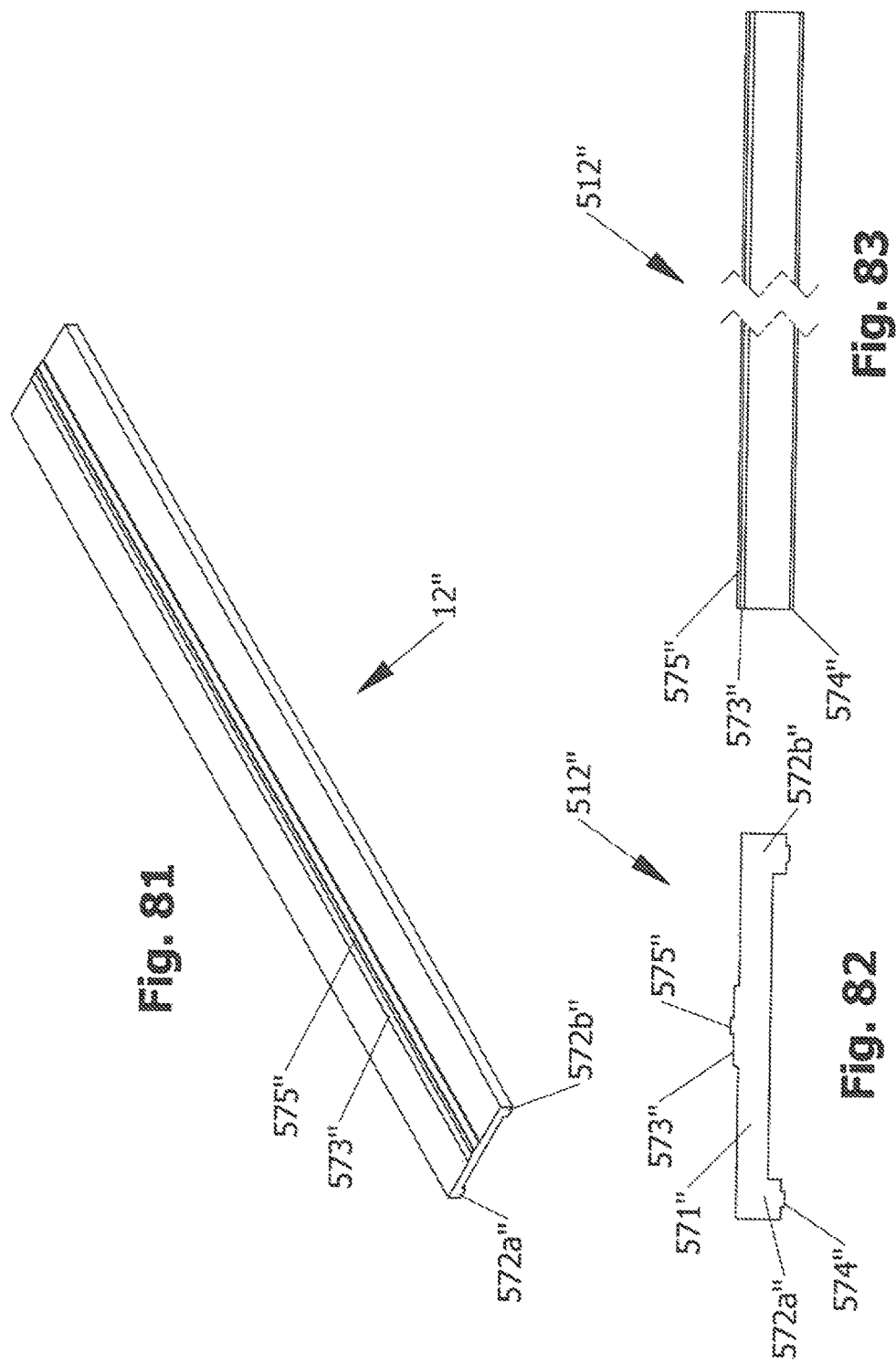

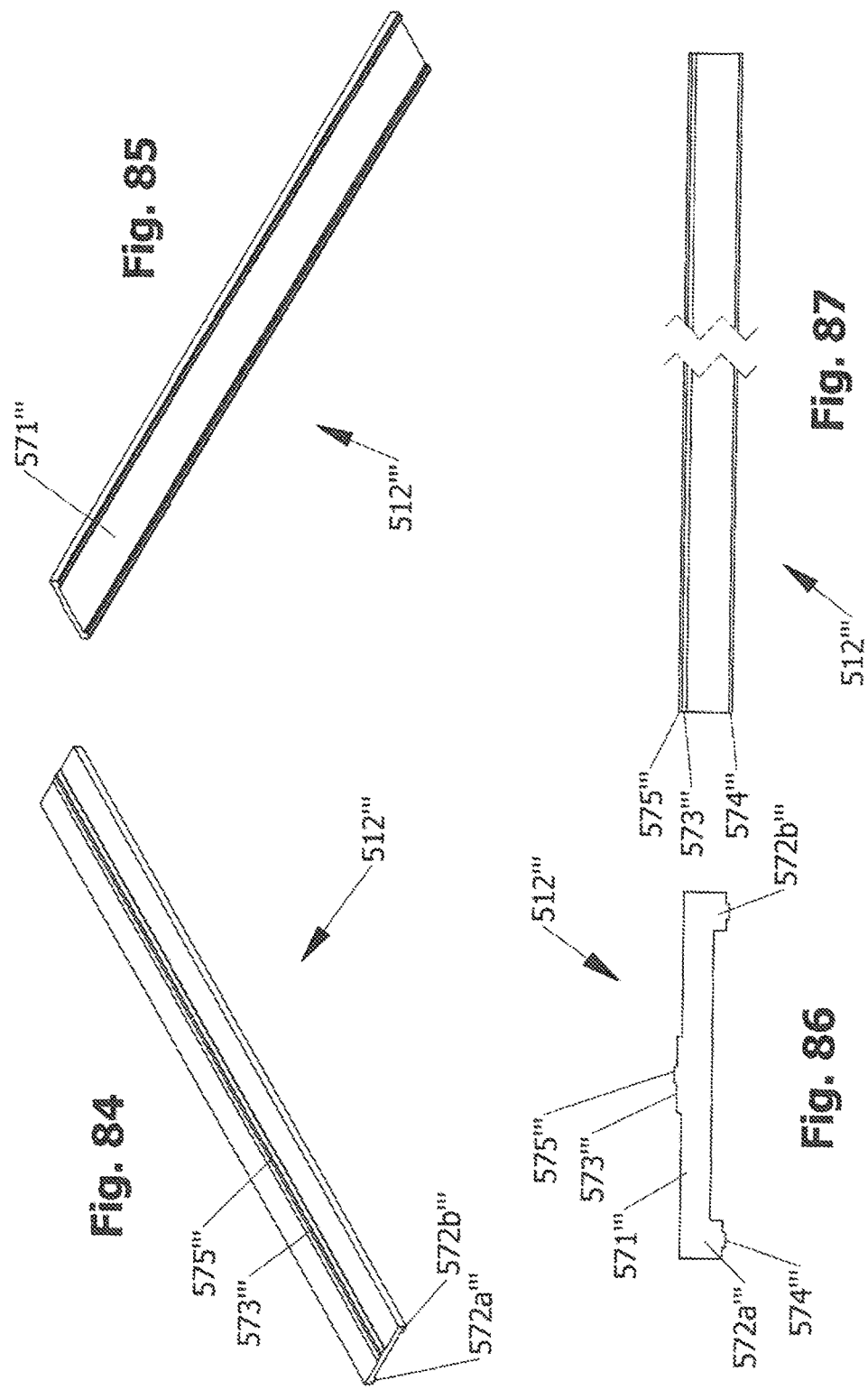

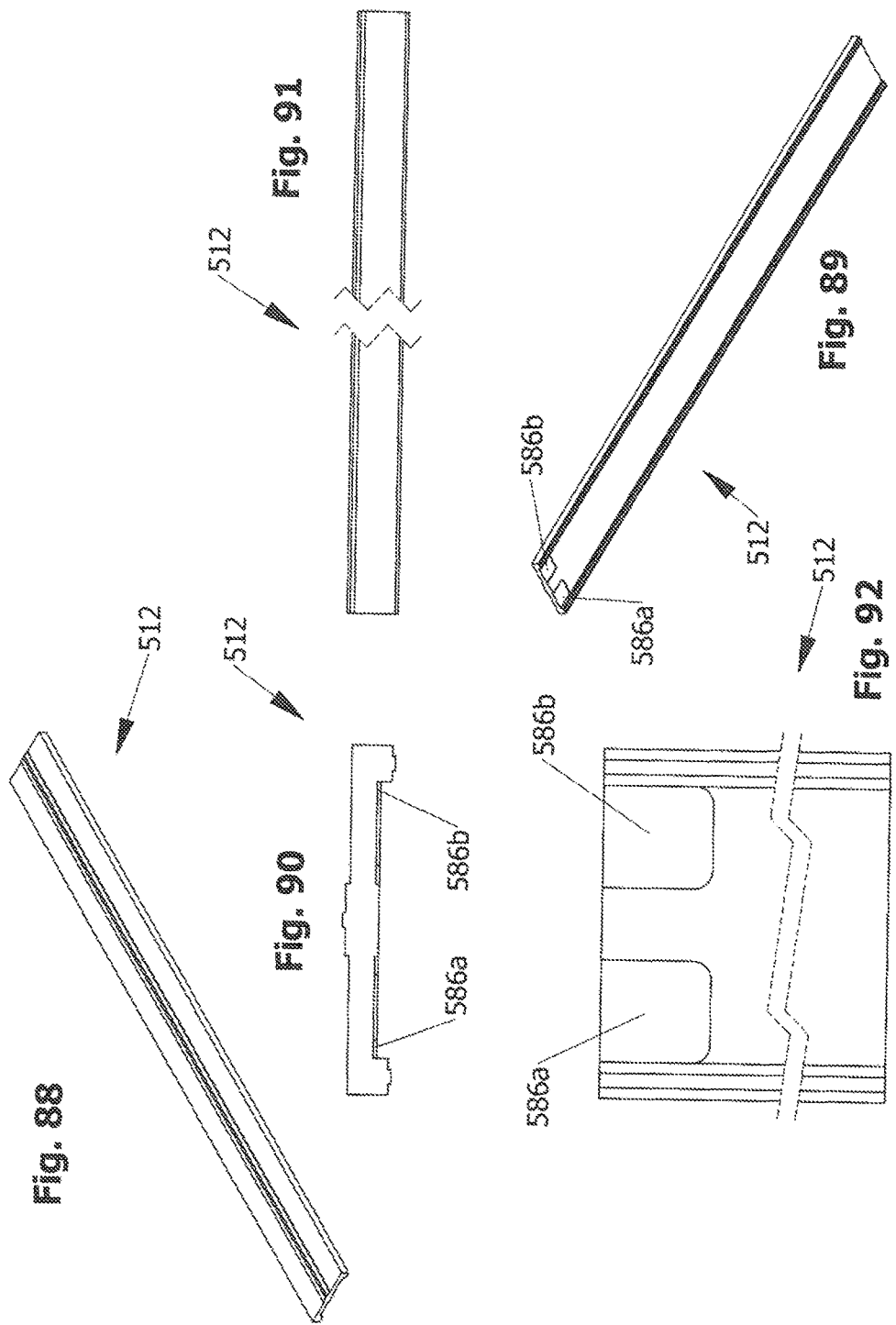

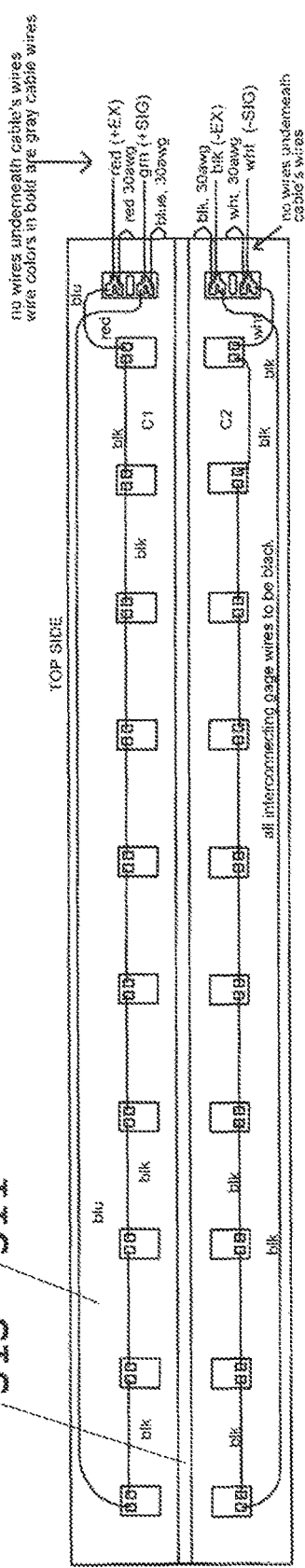
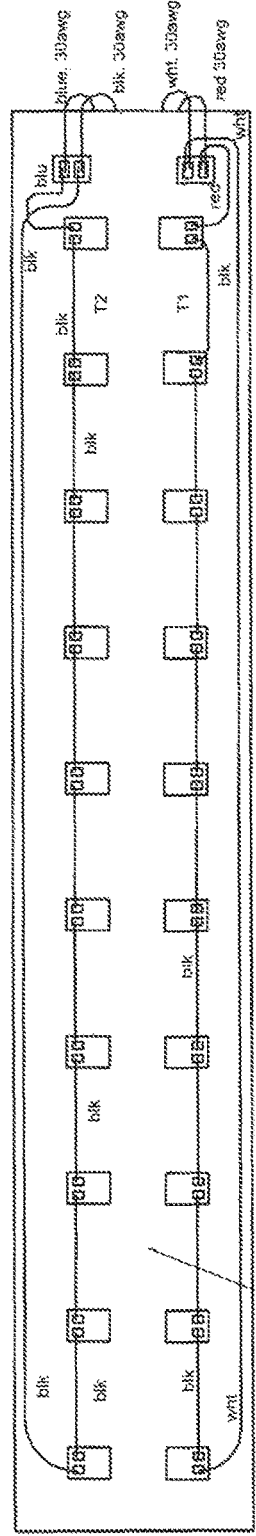
Fig. 93
Fig. 94

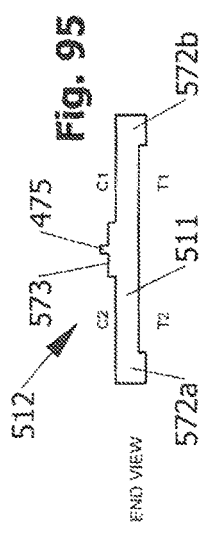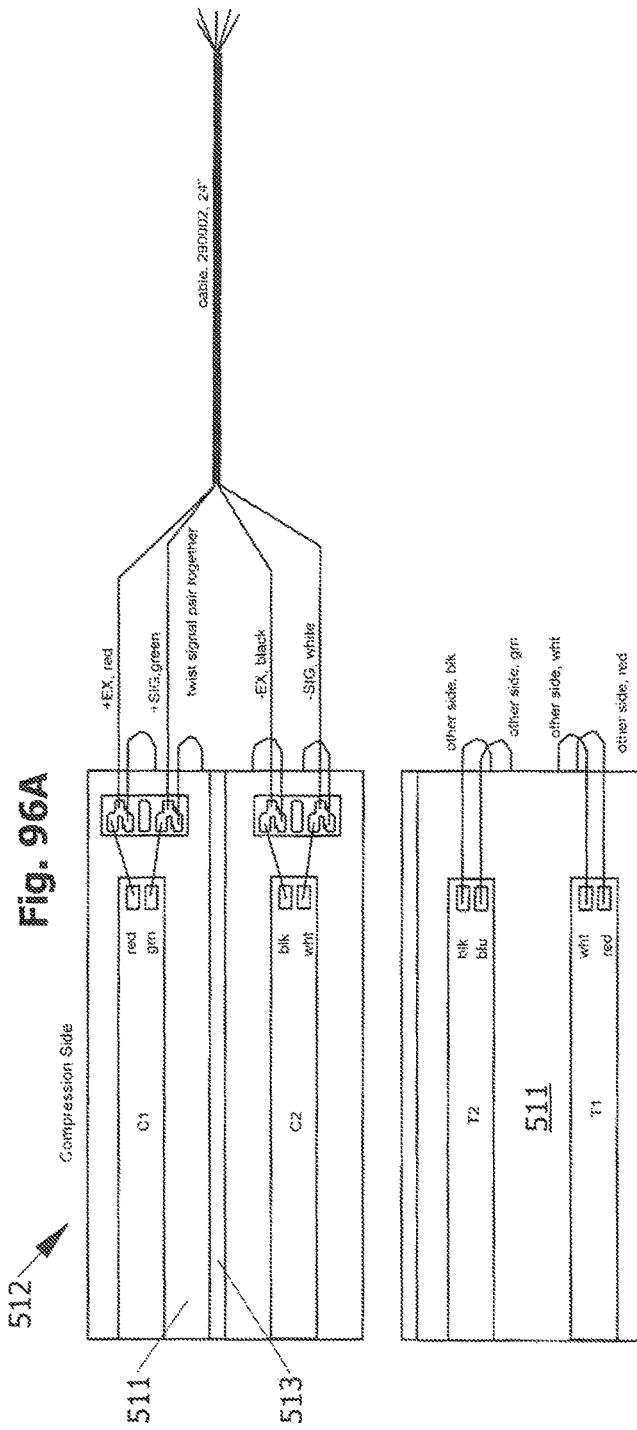

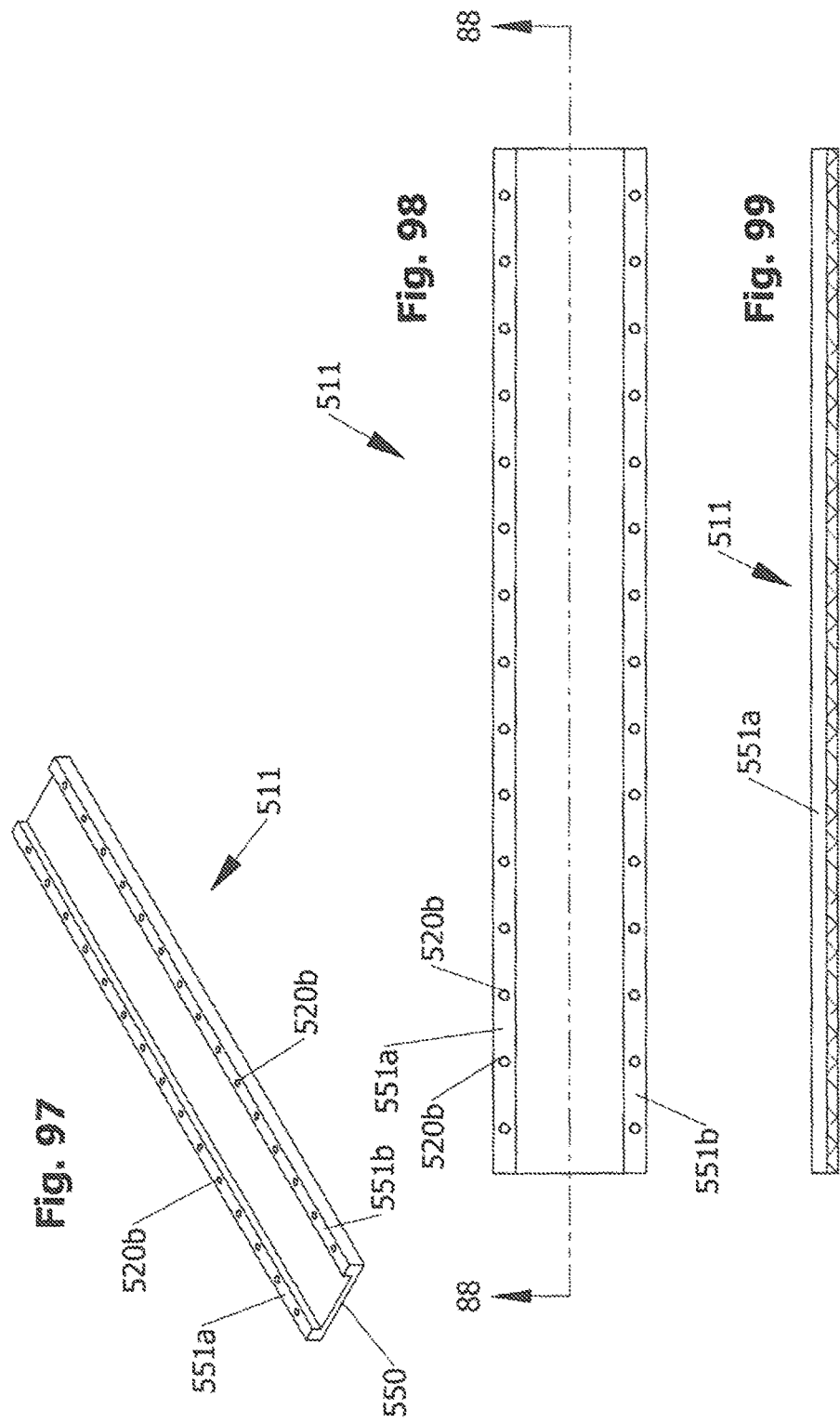

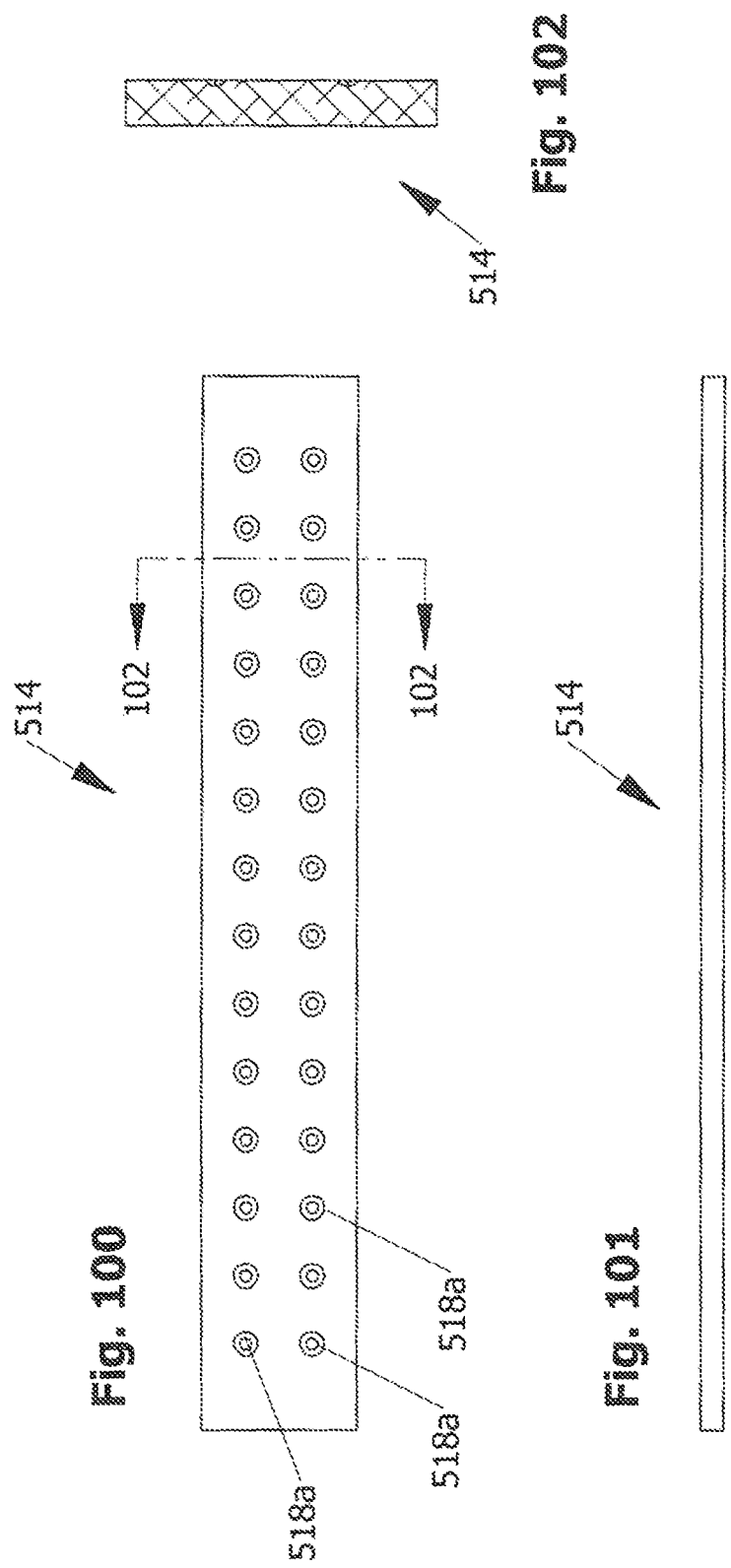

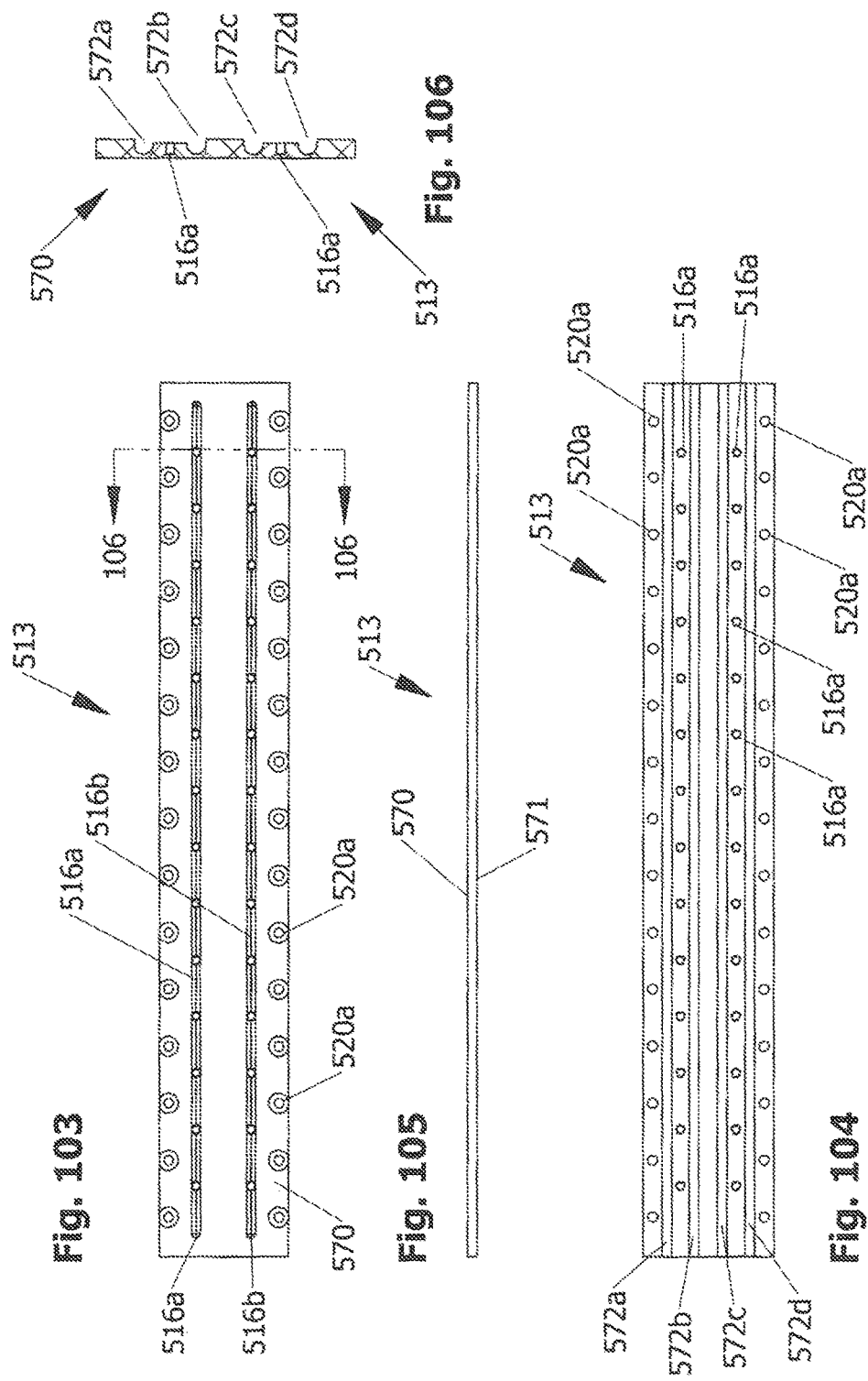

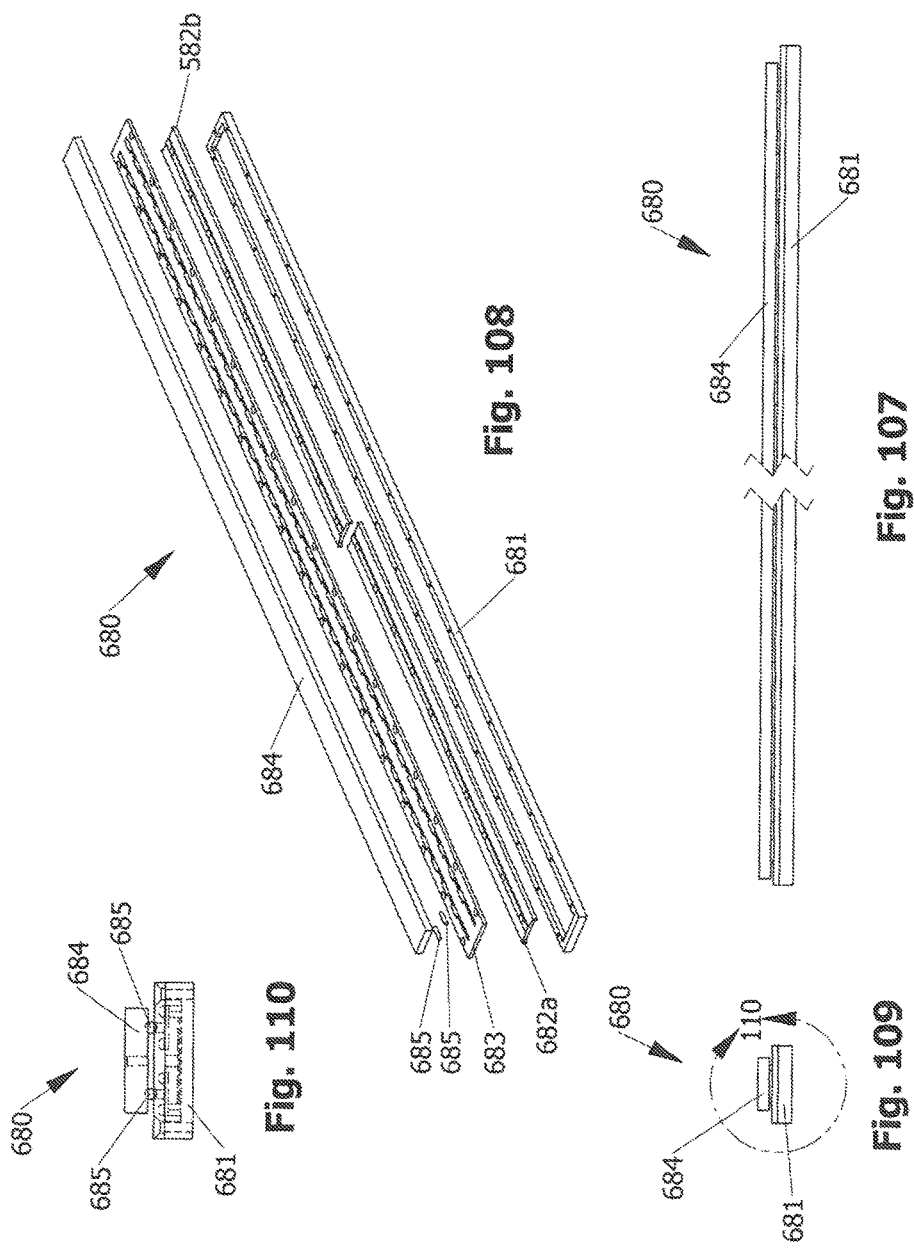

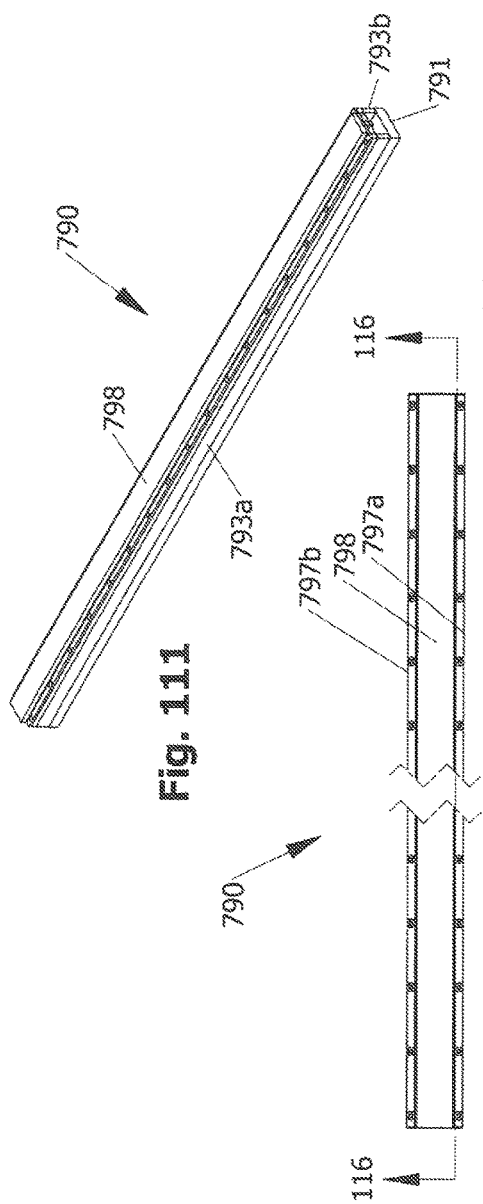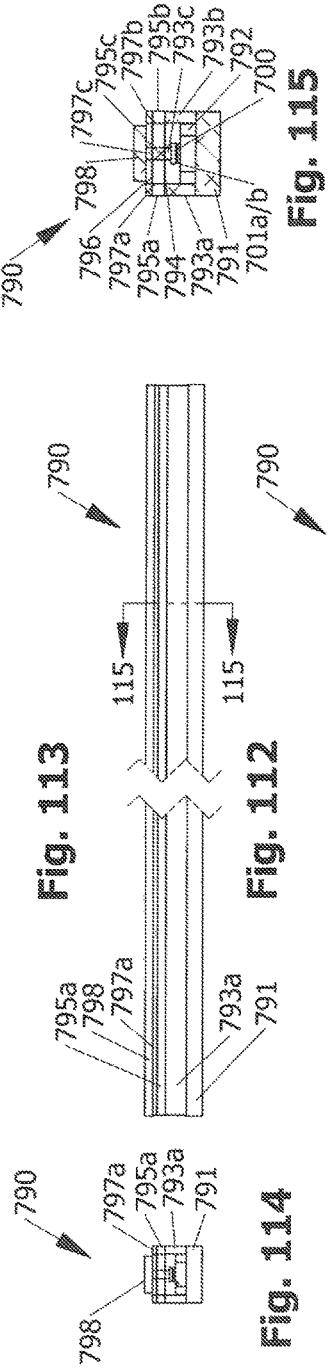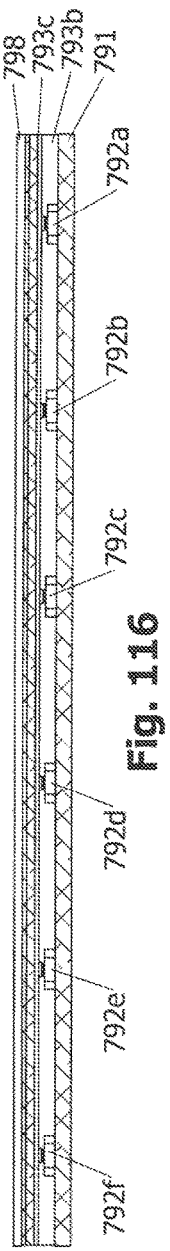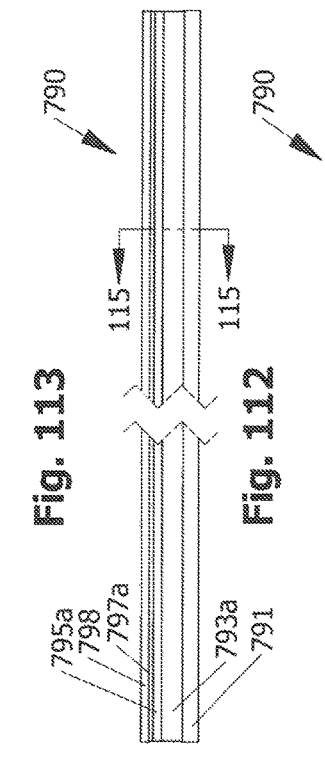

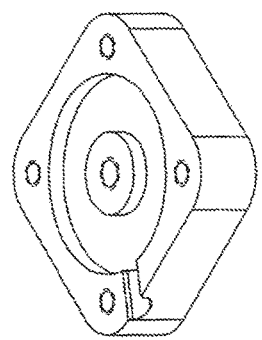
Fig. 121
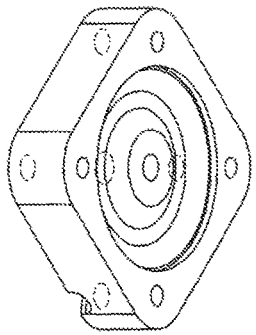
Fig. 122
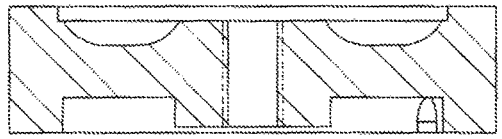
Fig. 126
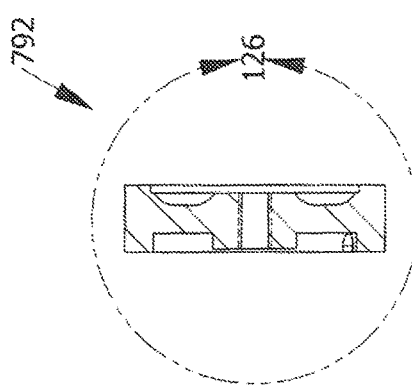
Fig. 125
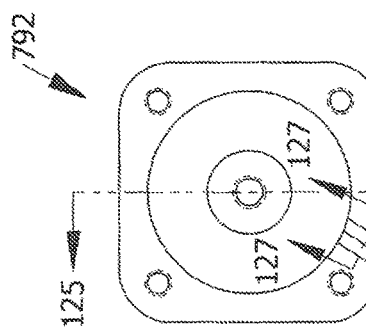
Fig. 123
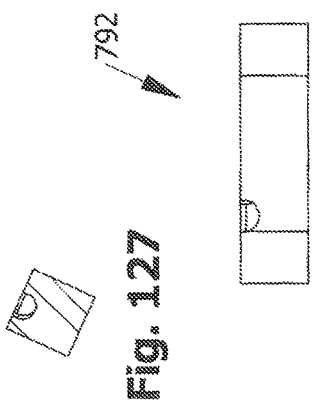
Fig. 124
Fig. 127

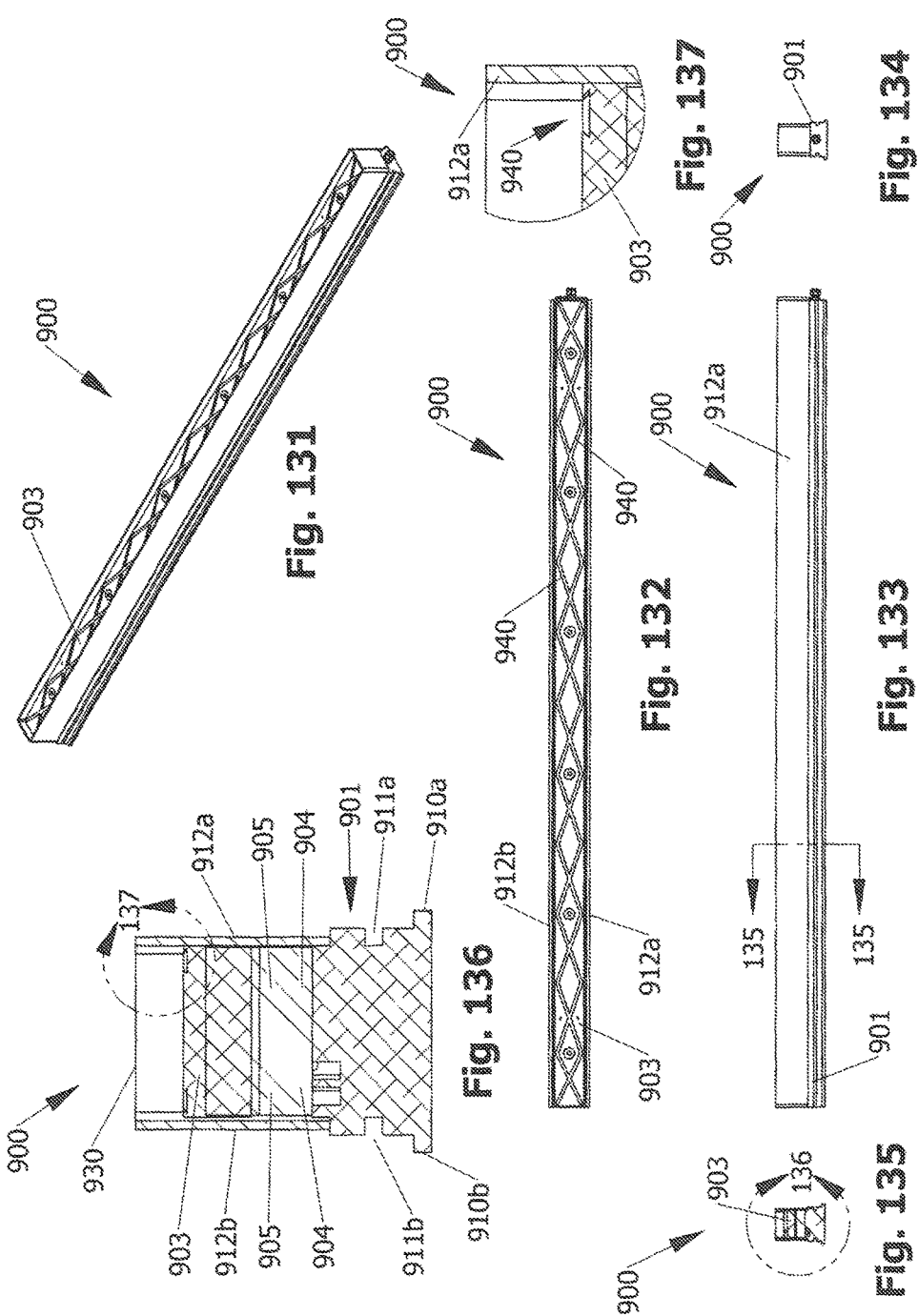

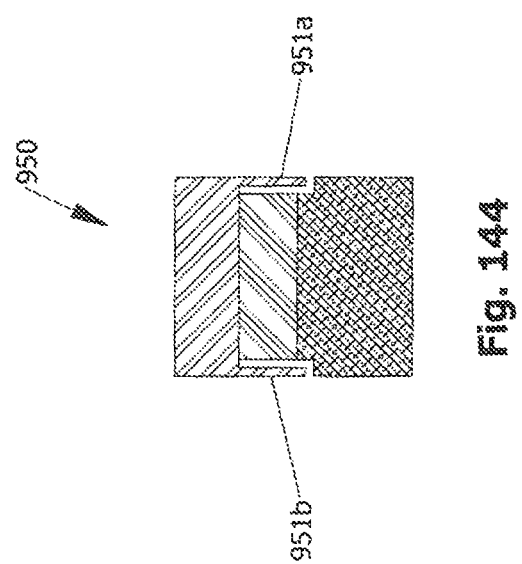

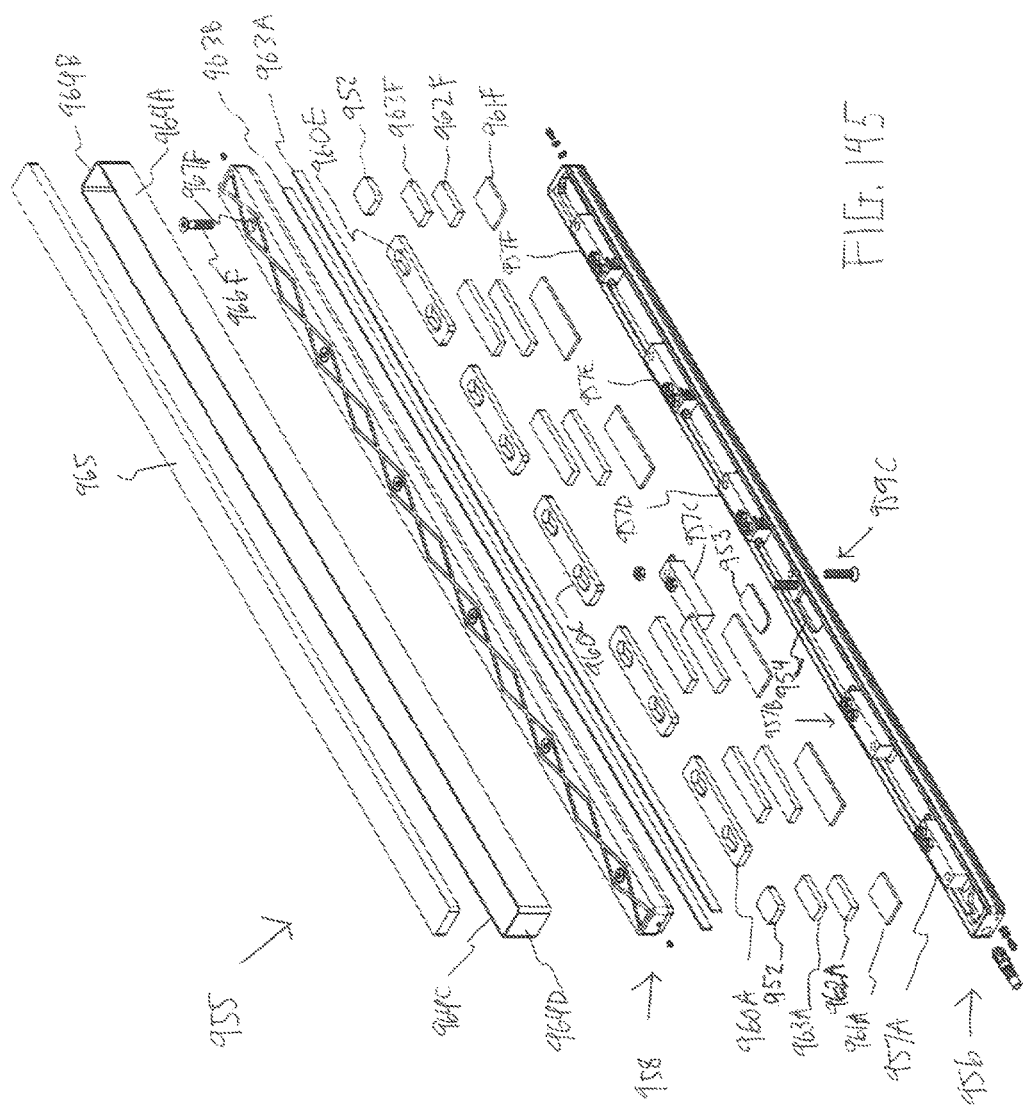

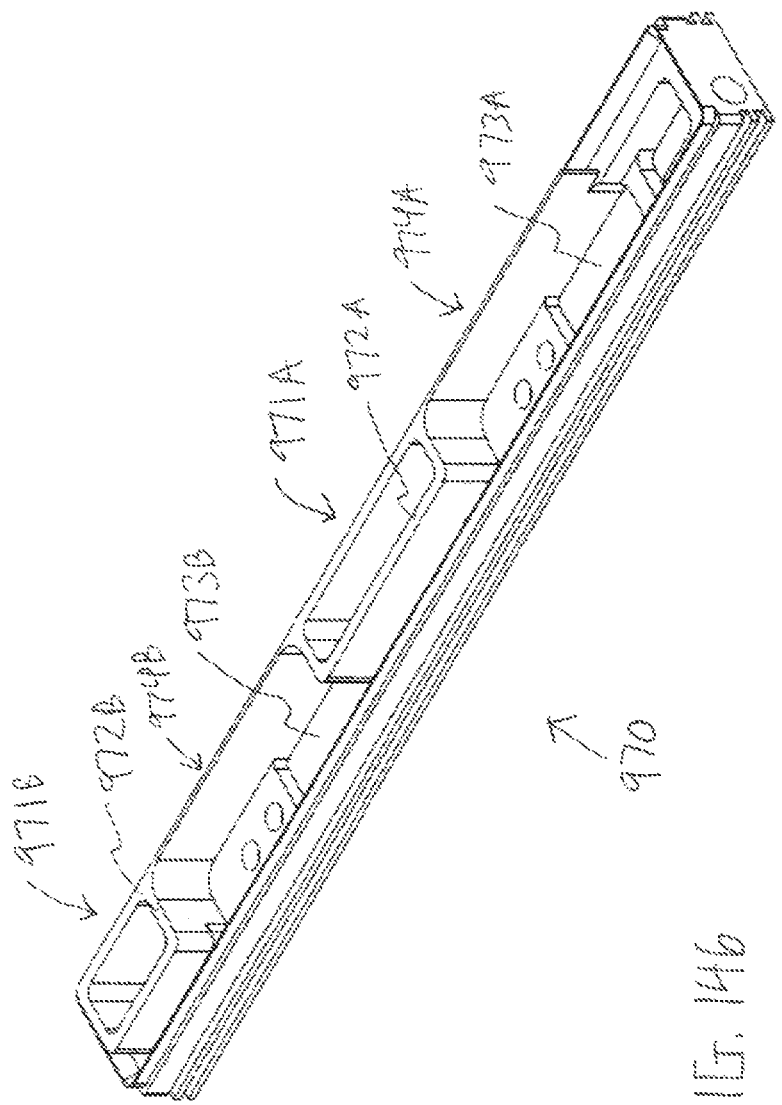

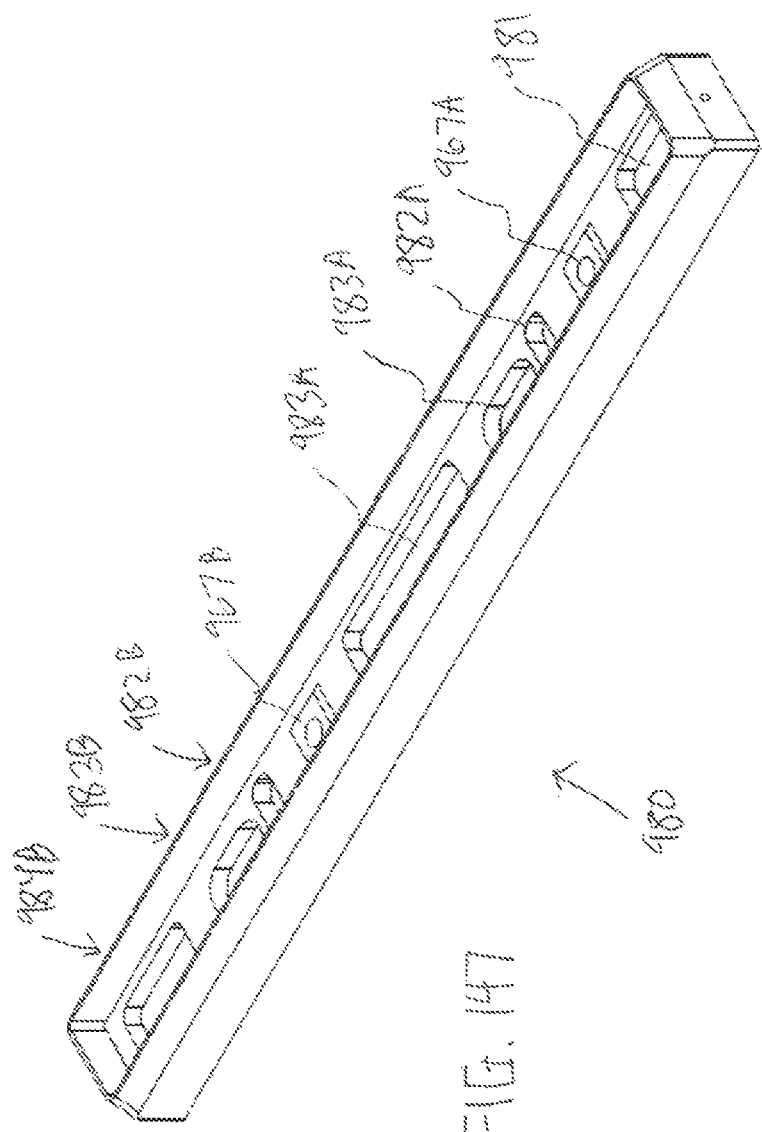

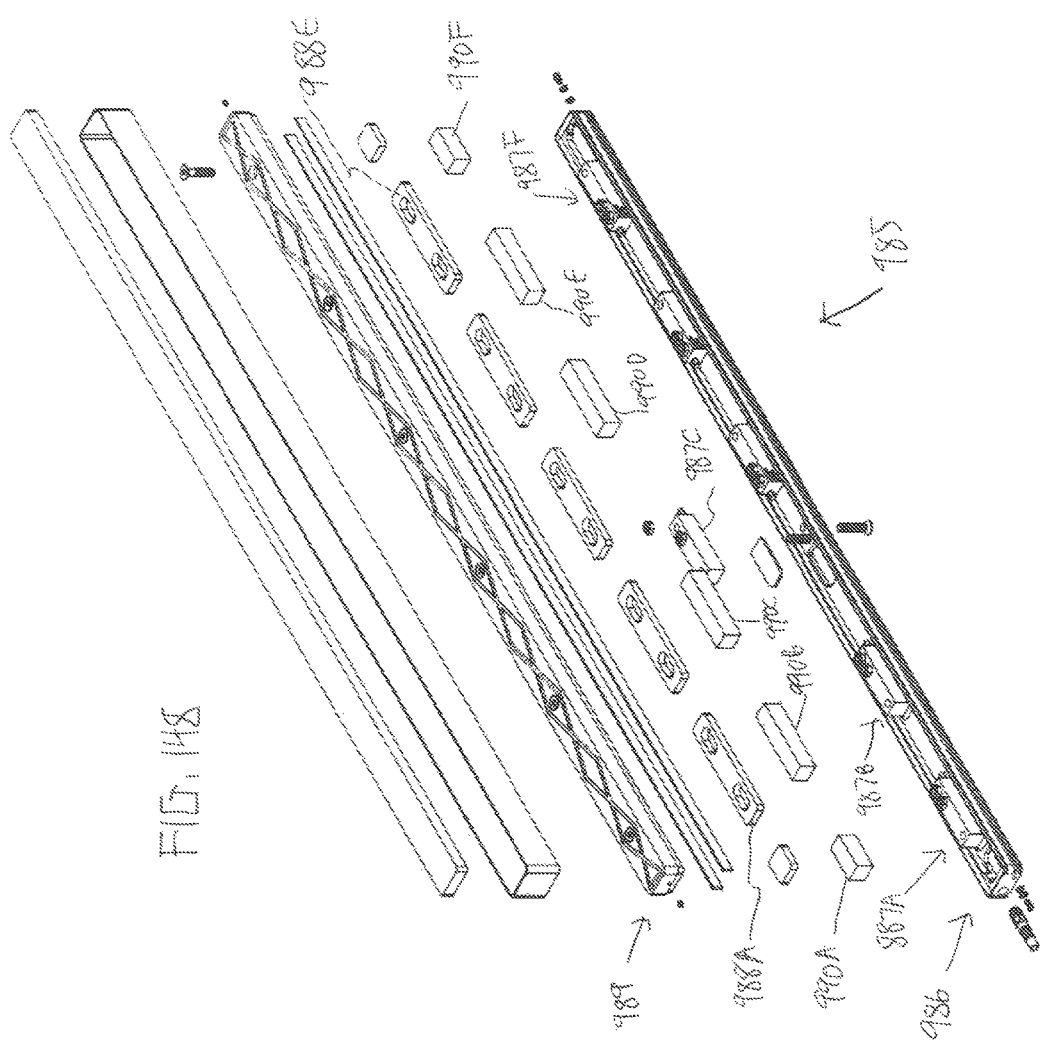

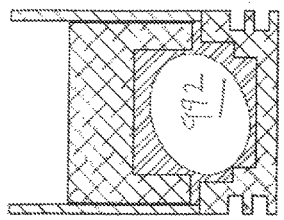
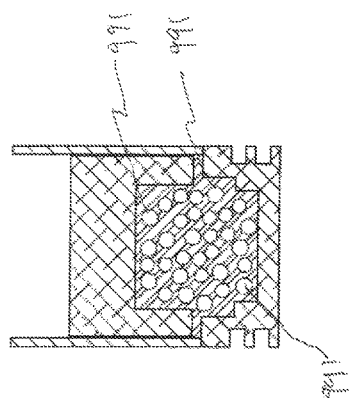
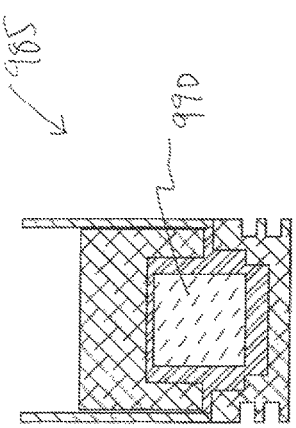
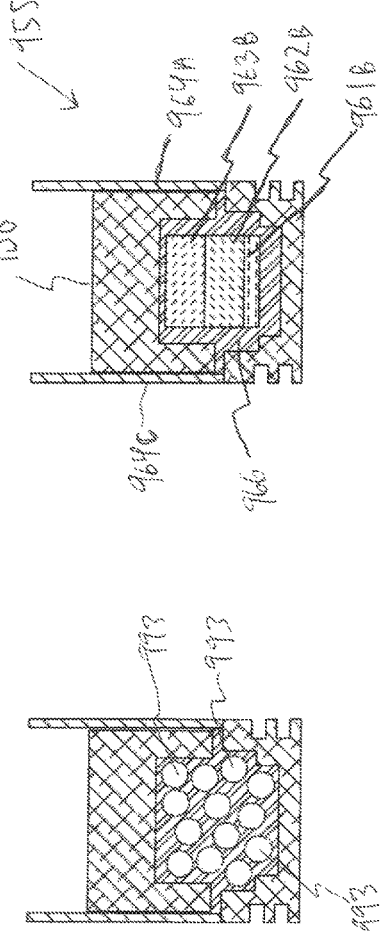
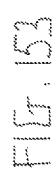

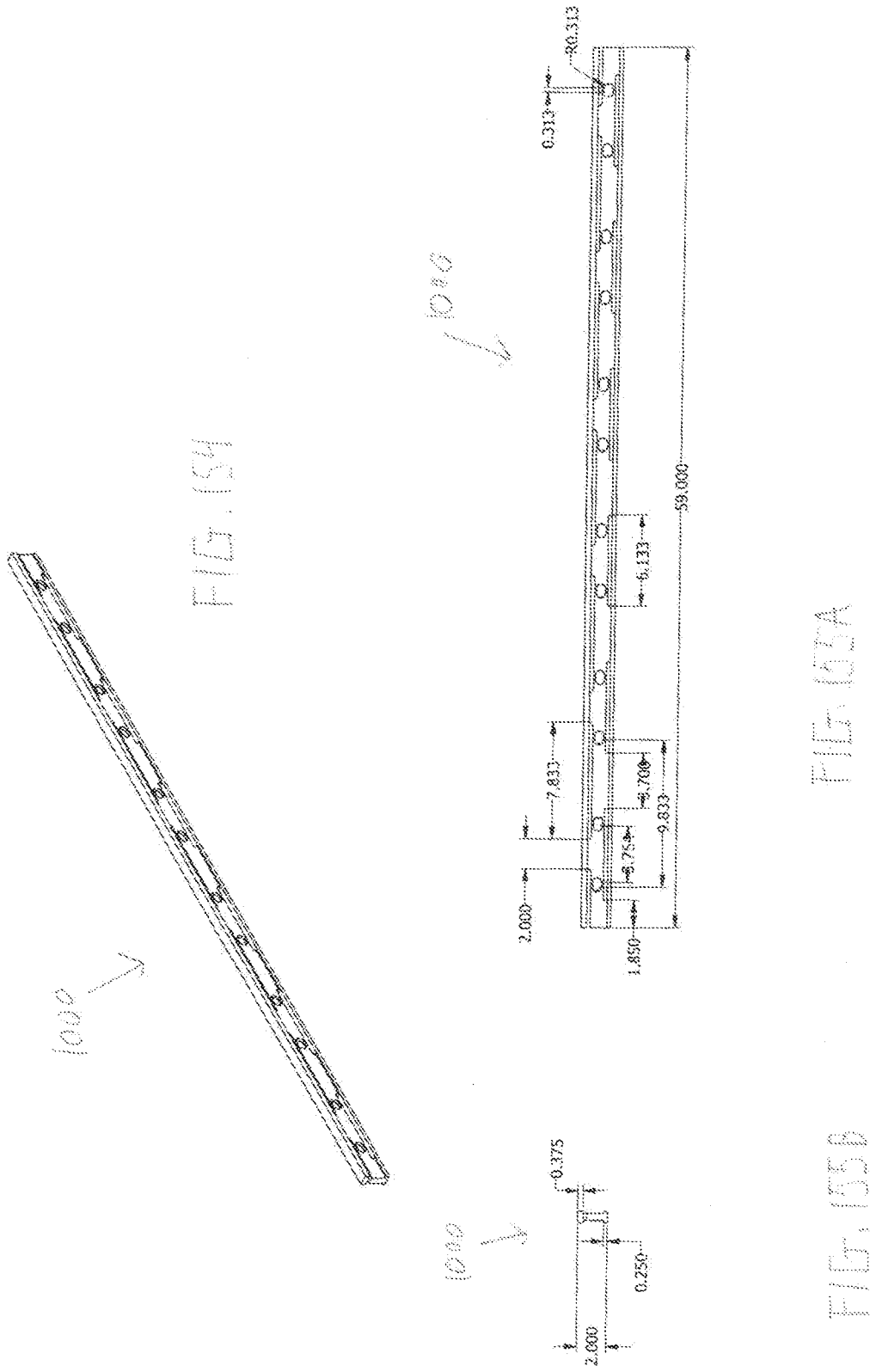

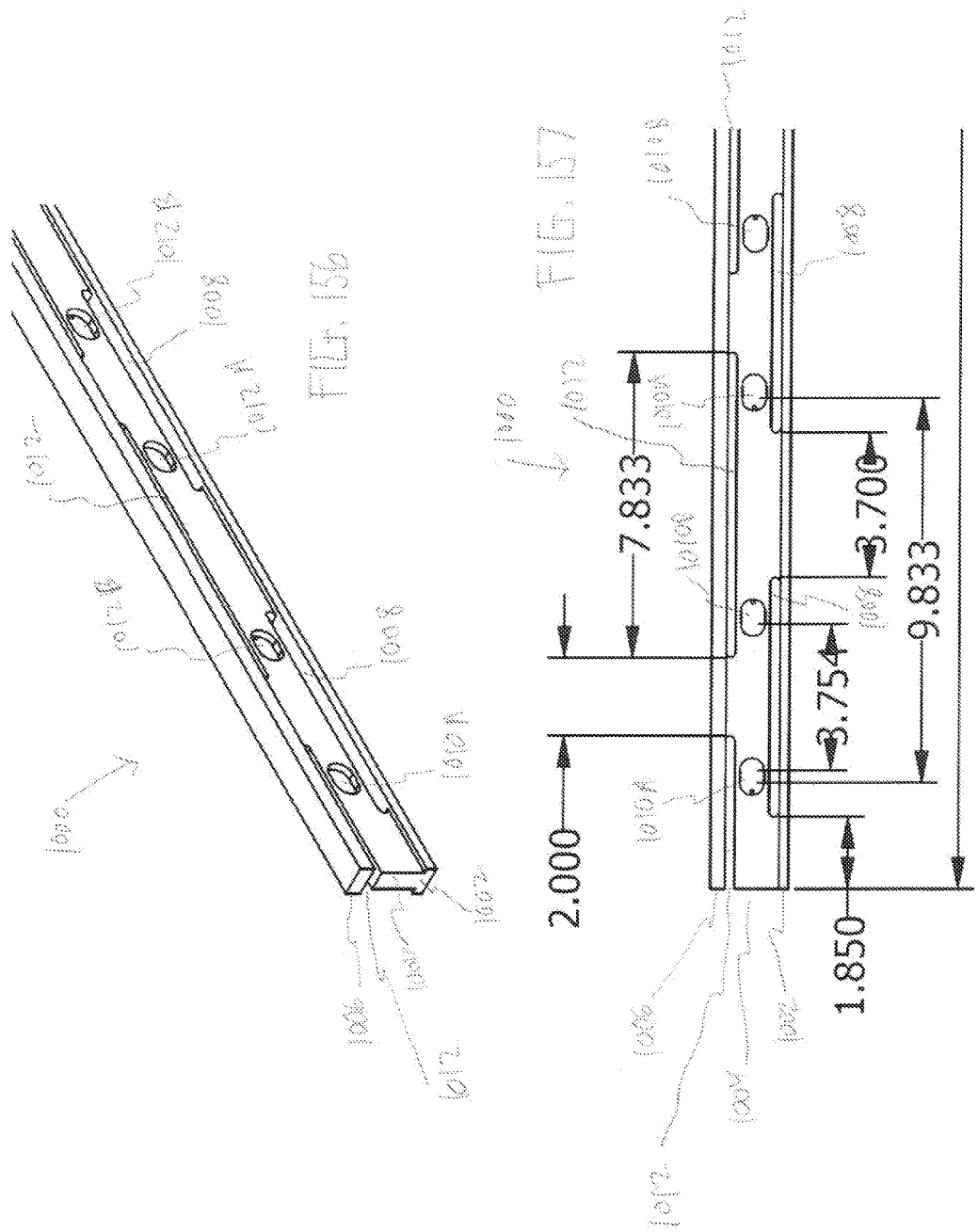

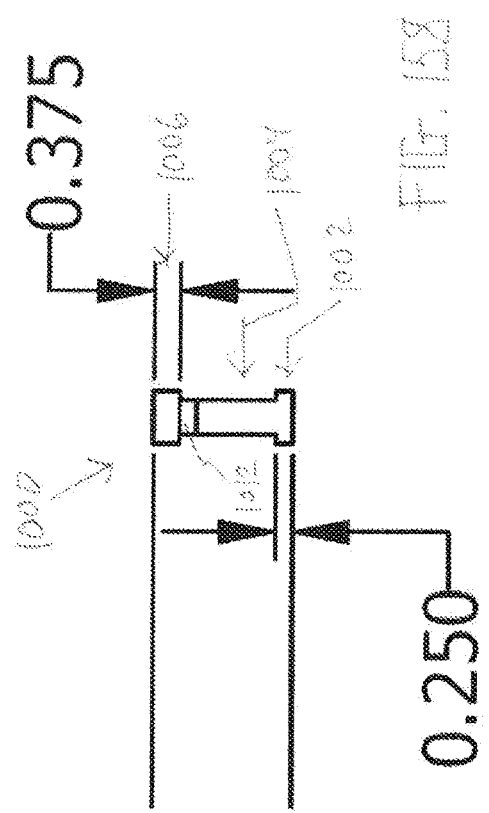

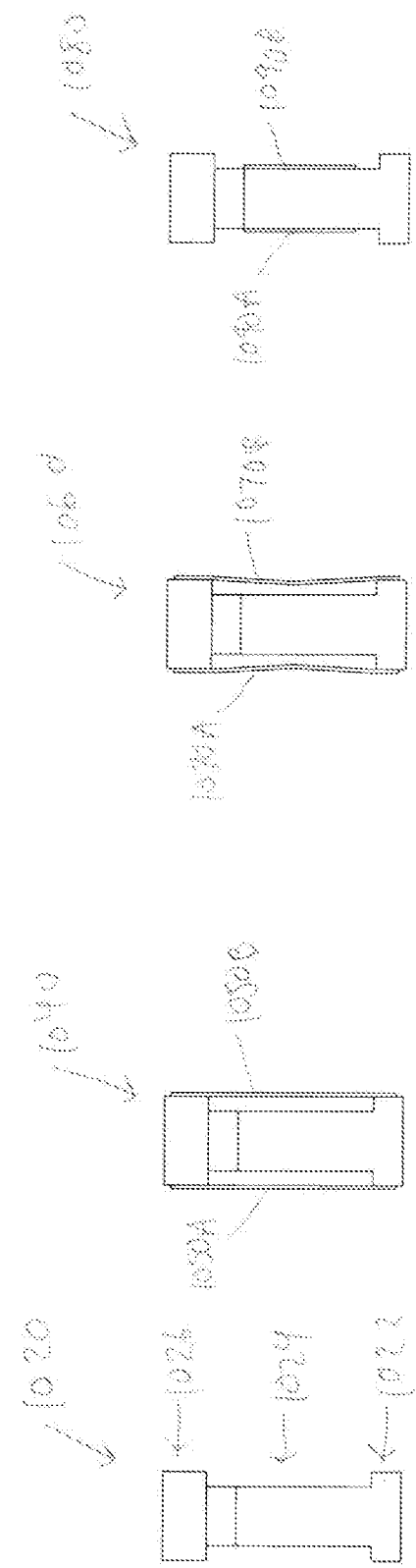

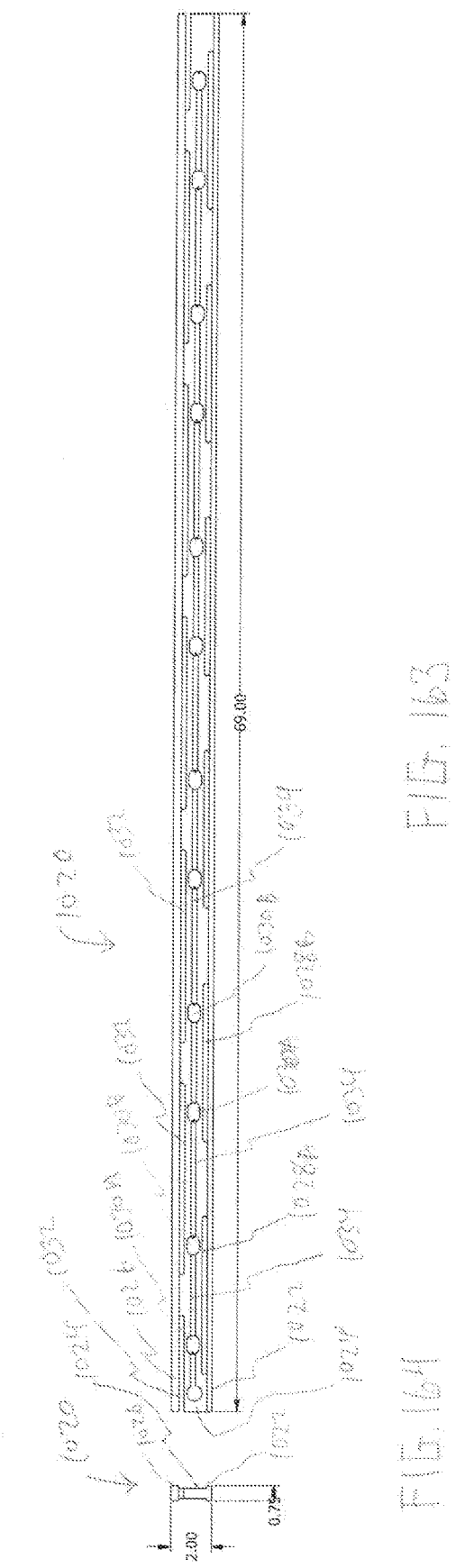

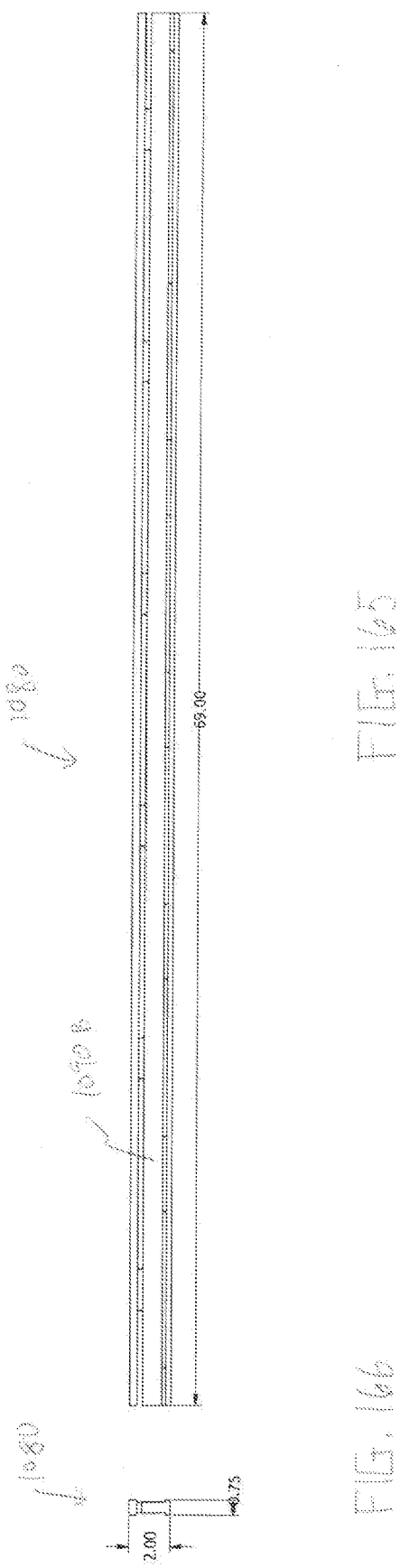

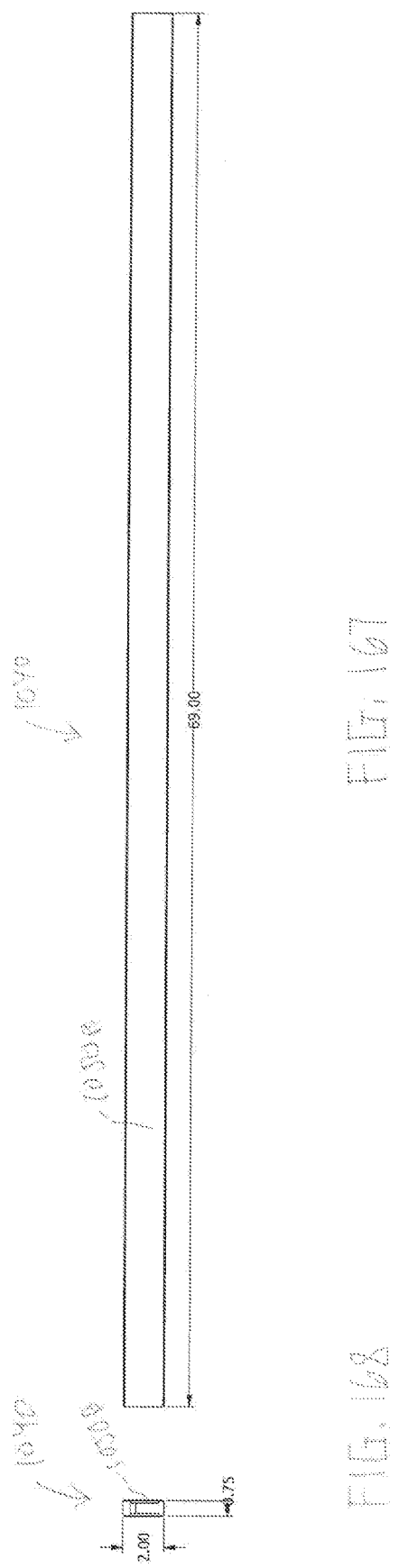

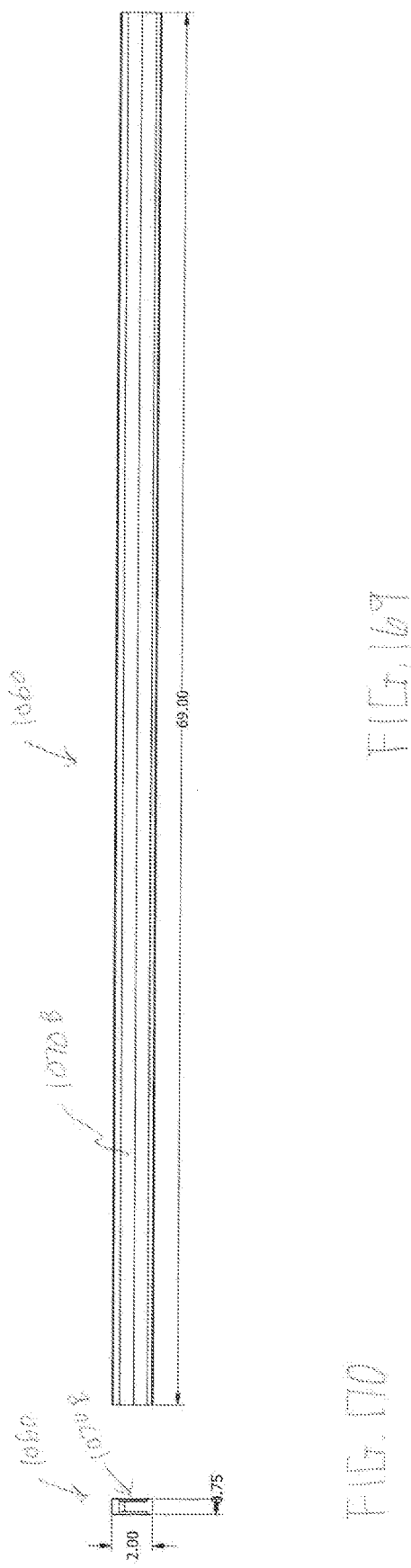

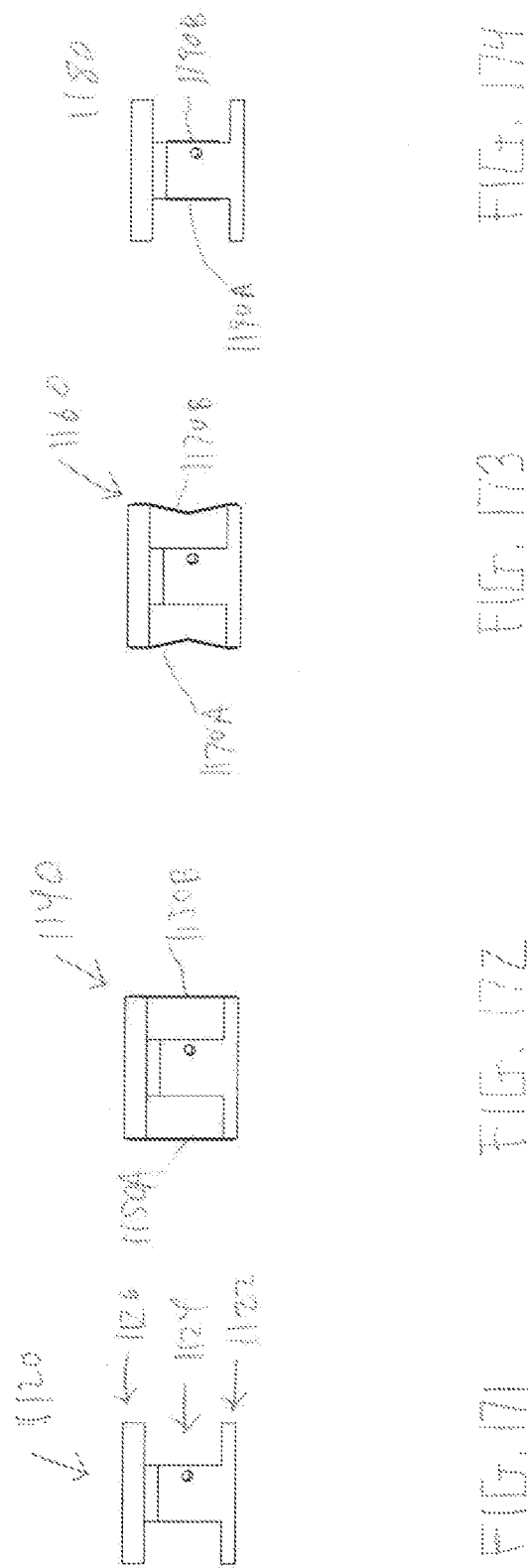

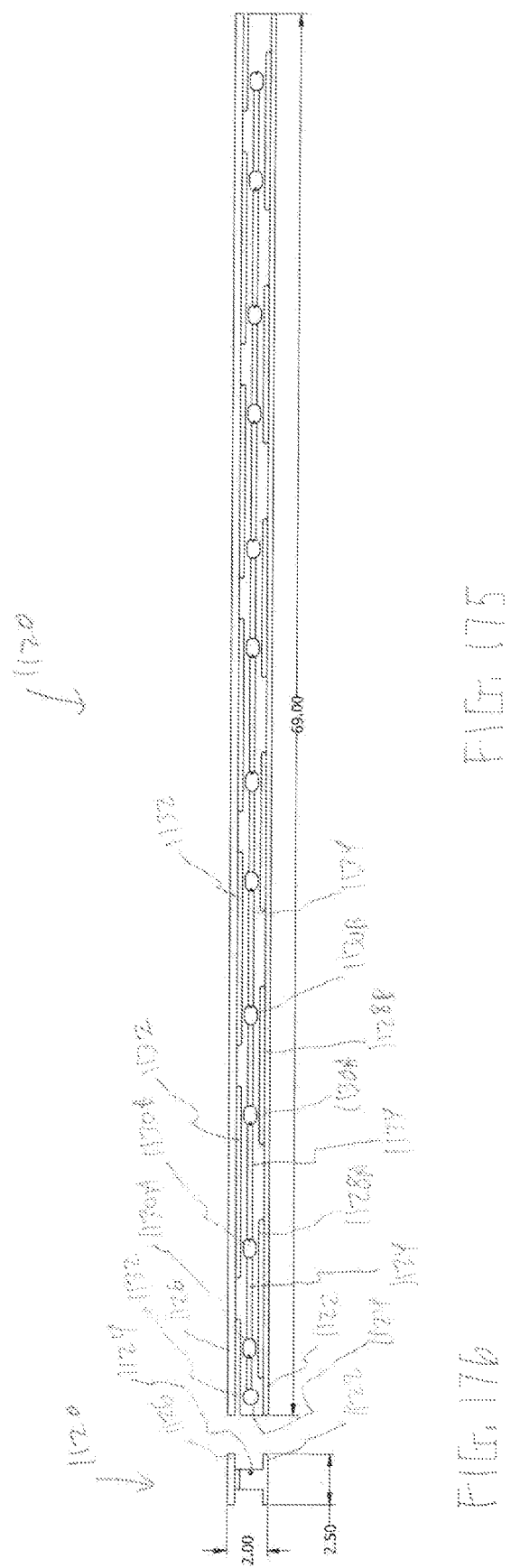

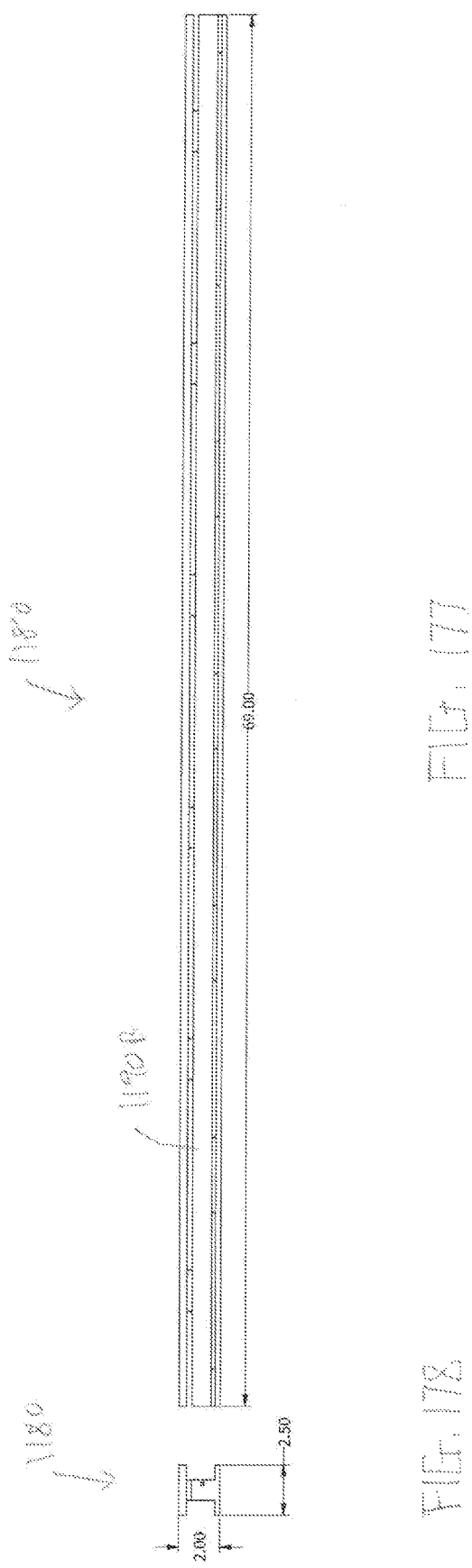

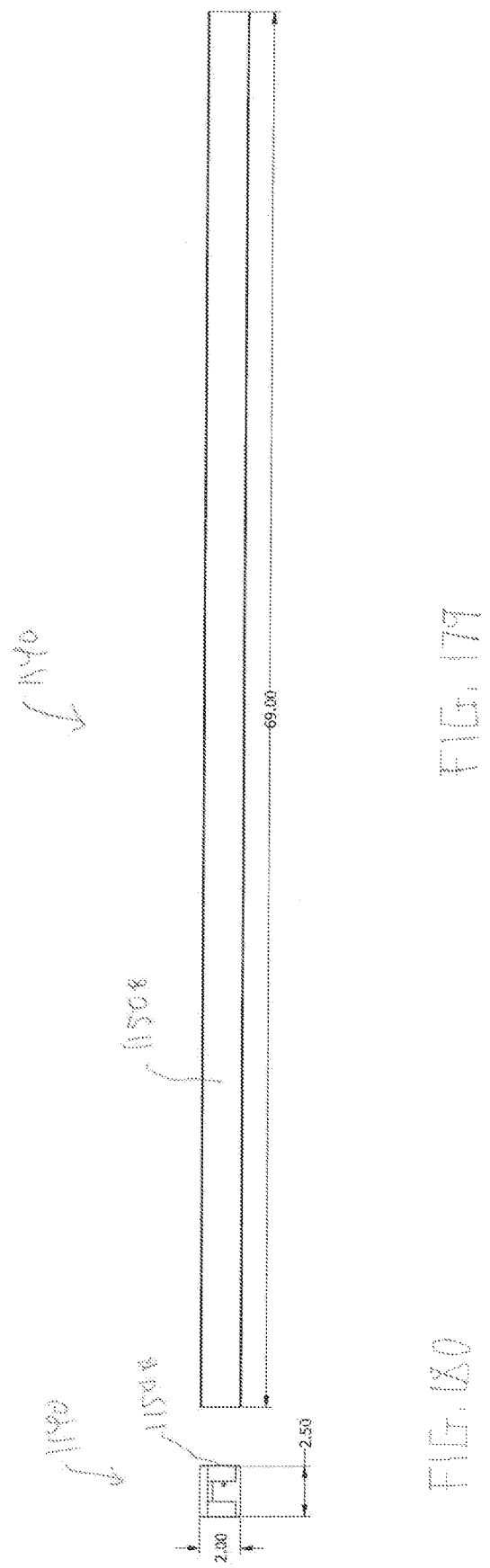

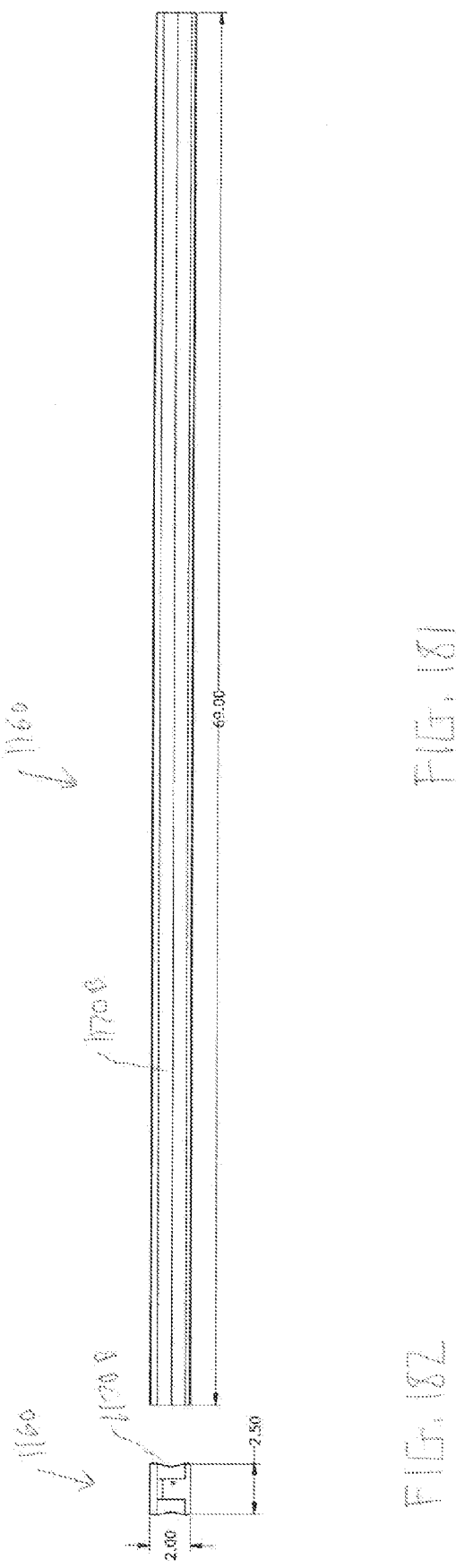

WEIGH IN MOTION STRIP SCALE HAVING PLURAL COMPLIANT FEATURES

CROSS REFERENCE TO RELATED APPLICATIONS, IF ANY

This application is a continuation-in-part of co-pending U.S. patent application Ser. No. 14/051,255, filed Oct. 10, 2013; which claims the benefit under 35 U.S.C. § 119(e) of U.S. Provisional Patent Application Ser. No. 61/960,140, filed Sep. 11, 2013, status converted; and U.S. Provisional Patent Application Ser. No. 61/712,002, filed Oct. 10, 2012, status converted, which are hereby incorporated by reference.

37 C.F.R. § 1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

Field of the Invention

The present invention relates, generally, to weighing systems, apparatus and methods. Particularly, the invention relates to a strip scale used for example to weigh vehicles or other articles while they are in motion. The scale of the invention is particularly well suited for weighing of vehicles moving at high speeds over road ways.

Background Information

Existing technology in this field is believed to have significant limitations and shortcomings.

All US patents and patent applications, and all other published documents mentioned anywhere in this application are incorporated by reference in their entirety.

BRIEF SUMMARY OF THE INVENTION

The present invention provides weighing apparatus and methods which are practical, reliable, accurate and efficient, and which are believed to constitute an improvement over the background technology.

In one aspect, the invention provides a scale comprising, a base for placement on a surface, the base having an elongated configuration, at least one load cell communicatively connected to the base, a platform disposed over the base, the platform being communicatively connected to the at least one load cell, and at least one compliant member disposed between the at least one load cell and the platform.

In another aspect, the invention provides a scale adapted to be embedded in a roadway and used in electronic, in-motion, high speed weighing of vehicles or cargo passing over the scale comprising, a. a base for placement on a surface, the base having an elongated configuration, b. a plurality of load cells communicatively connected to the base, c. a platform disposed over the base, the platform being communicatively connected to the at least one load cell, d. at least one compliant member disposed between the at least one load cell and the platform;

e. at least one compliant member disposed between that at least one load cell and the base; and f. at least one compliant member disposed between the load cells.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 2 is a front, elevation view of the scale.

FIG. 3 is a crossectional view of the scale taken along line 3-3 of FIG. 2.

FIG. 4 is a crossectional view of the scale taken along line 4-4 of FIG. 2.

FIG. 5 is bottom view of the scale.

FIG. 6 is a detailed view of the scale portion shown in FIG. 4.

FIG. 7 is a top view of the scale.

FIG. 8 is an end view of the scale.

FIG. 9 is an opposite end view of the scale.

FIG. 10 is a longitudinal crossectional of the scale taken along line 10-10 of FIG. 7.

FIG. 11 is a detailed view of the portion of the scale shown in FIG. 10.

FIG. 12 is an exploded view of the scale.

FIG. 14 is a front, elevation view of the scale.

FIG. 15 is a crossectional view of the scale taken along line 15-15 of FIG. 14.

FIG. 16 is a crossectional view of the scale taken along line 16-16 of FIG. 14.

FIG. 17 is top view of the scale.

FIG. 18 is a detailed view of the scale portion shown in FIG. 15.

FIG. 19 is a detailed view of the scale portion shown in FIG. 16.

FIG. 20 is a top view of the scale.

FIG. 21 is an end view of the scale.

FIG. 22 is an opposite end view of the scale.

FIG. 23 is a longitudinal crossectional of the scale taken along line 23-23 of FIG. 20.

FIG. 24 is a detailed view of the portion of the scale shown in FIG. 23.

FIG. 27 is a front, elevation view of the scale.

FIG. 28 is a crossectional view of the scale taken along line 28-28 of FIG. 27.

FIG. 29 is a crossectional view of the scale taken along line 29-29 of FIG. 27.

FIG. 30 is a bottom view of the scale.

FIG. 31 is a detailed view of the scale portion shown in FIG. 28.

FIG. 32 is a detailed view of the scale portion shown in FIG. 29.

FIG. 33 is a top view of the scale.

FIG. 34 is an end view of the scale.

FIG. 35 is an opposite end view of the scale.

FIG. 36 is a longitudinal crossectional of the scale taken along line 36-36 of FIG. 33.

FIG. 37 is a detailed view of the portion of the scale shown in FIG. 36.

FIG. 38 is an exploded view of the scale.

FIG. 40 is a front, elevation view of the scale.

FIG. 41 is a crossectional view of the scale taken along line 41-41 of FIG. 40.

FIG. 42 is a crossectional view of the scale taken along line 42-42 of FIG. 40.

FIG. 43 is a bottom view of the scale.

FIG. 44 is a detailed view of the scale portion shown in FIG. 42.

FIG. 45 is a top view of the scale.

FIG. 46 is an end view of the scale.

FIG. 47 is an opposite end view of the scale.

FIG. 48 is a longitudinal crossectional of the scale taken along line 48-48 of FIG. 45.

FIG. 49 is a detailed view of the portion of the scale shown in FIG. 48.

FIG. 50 is an exploded view of the scale.

FIG. 52 is a perspective view of the strip scale of FIG. 51.

FIG. 53 is a side view of the strip scale.

FIG. 54 is a top view of the strip scale.

FIG. 55 is a lateral or transverse crossectional view of the scale taken along line 55-55 of FIG. 53

FIG. 56 is a detailed view of FIG. 55.

FIG. 57 is another top view of the scale.

FIG. 58 is an end view of the scale.

FIG. 59 is an opposite end view of the scale.

FIG. 60 is yet another top view of the scale.

FIG. 61 is a longitudinal crossectional view of the scale taken along line 61-61 of FIG. 60.

FIG. 62 is a detailed view of the area "62" of FIG. 61.

FIG. 71 is a front elevation view of a fifth alternative embodiment of the strip scale of the present invention.

FIG. 72 is an end view of the strip scale.

FIG. 73 is an exploded view, in perspective, of the strip scale.

FIG. 74 is another perspective view of the strip scale.

FIG. 75 is perspective view of a first embodiment of a load cell for use with the strip scale of FIGS. 71-74.

FIG. 76 is an end view of the load cell of FIG. 75.

FIG. 77 is a front elevation view, broken to fit on the page, of the load cell of FIG. 75.

FIG. 78 is a perspective view of a second embodiment of the load cell.

FIG. 79 is an end view thereof.

FIG. 80 is a side elevation view thereof, broken for clarity.

FIG. 81 is a perspective view of a third embodiment of the load cell.

FIG. 82 is an end view thereof.

FIG. 83 is a side elevation view thereof, broken for fit.

FIG. 84 is a perspective view of fourth embodiment of the load cell.

FIG. 85 is a further perspective view thereof.

FIG. 86 is an end view thereof.

FIG. 87 is a side elevation view thereof, broken for fit.

FIG. 88 is a perspective view of fifth embodiment of the load cell.

FIG. 89 is a further perspective view thereof.

FIG. 90 is an end view thereof.

FIG. 91 is a side elevation view thereof, broken for fit.

FIG. 92 is a detailed view of a portion of the load cell from one end and at the bottom.

FIG. 93 is a top view of one embodiment of a gauging pattern on a load cell.

FIG. 94 is a bottom view of the gauging pattern shown in FIG. 93.

FIG. 95 is a end diagram for another embodiment of a process of gauging yet another embodiment of a load cell.

FIGS. 96A and B are compression side and tension side view of the gauging process of FIG. 95.

FIG. 97 is a perspective view of an embodiment of a base of the strip scale of FIGS. 71-74.

FIG. 98 is a top view of the base.

FIG. 99 is a crossectional view of the base, taken along line 99-99 of FIG. 98.

FIG. 100 is a perspective view of an embodiment of a platform of the strip scale of FIGS. 71-74.

FIG. 101 is a side elevation view of the platform.

FIG. 102 is a crossectional view of the platform taken along line 102-102 of FIG. 100.

FIG. 103 is a top view of an embodiment of a top plate of the strip scale of FIGS. 71-74.

FIG. 104 is a bottom view of the top plate.

FIG. 105 is a side elevation view of the top plate.

FIG. 106 is a crossectional view of the top plate taken along line 106-106 of FIG. 103.

FIG. 107 is a front elevation view of a sixth alternative embodiment of the strip scale of the invention, having a length substantially longer than the embodiment of FIGS. 71-74, and further including a pair of load cells.

FIG. 108 is an exploded view, in perspective, of the scale of FIG. 105.

FIG. 109 is an end view of the scale.

FIG. 110 is a detailed end view.

FIG. 111 is a perspective view of a seventh alternative embodiment of the scale of the invention.

FIG. 112 is a side elevation view of the scale.

FIG. 113 is a top plan view of the scale.

FIG. 114 is an end view of the scale.

FIG. 115 is a lateral crossectional view of the scale, taken along line 115-115 of FIG. 112.

FIG. 116 is a longitudinal crossectional view of the scale, taken along line 116-116 of FIG. 113.

FIG. 120 is a side view of the first checking plate.

FIG. 121 is a top perspective view of an embodiment of a load cell for use with the scale embodiment of FIGS. 111-120.

FIG. 122 is a bottom perspective view of the load cell.

FIG. 123 is a top plan view of the load cell.

FIG. 124 is a side view of the load cell, with interior structure shown in phantom.

FIG. 125 is a crossectional view of the load cell, taken along line 125-125 of FIG. 123.

FIG. 126 is a detailed view of the load cell, taken at area—126—of FIG. 125.

FIG. 127 is a crossectional view of a portion of the load cell taken at line 127-127 of FIG. 123.

FIG. 128 illustrates an embodiment of a strip scale of the invention in use on a road for weighing vehicles in motion.

FIG. 129 is a plan view of the system.

FIG. 130 is an end view of the system embedded in a roadway.

FIG. 131 is a perspective view of a further alternative embodiment of the scale of the invention.

Figure 1:
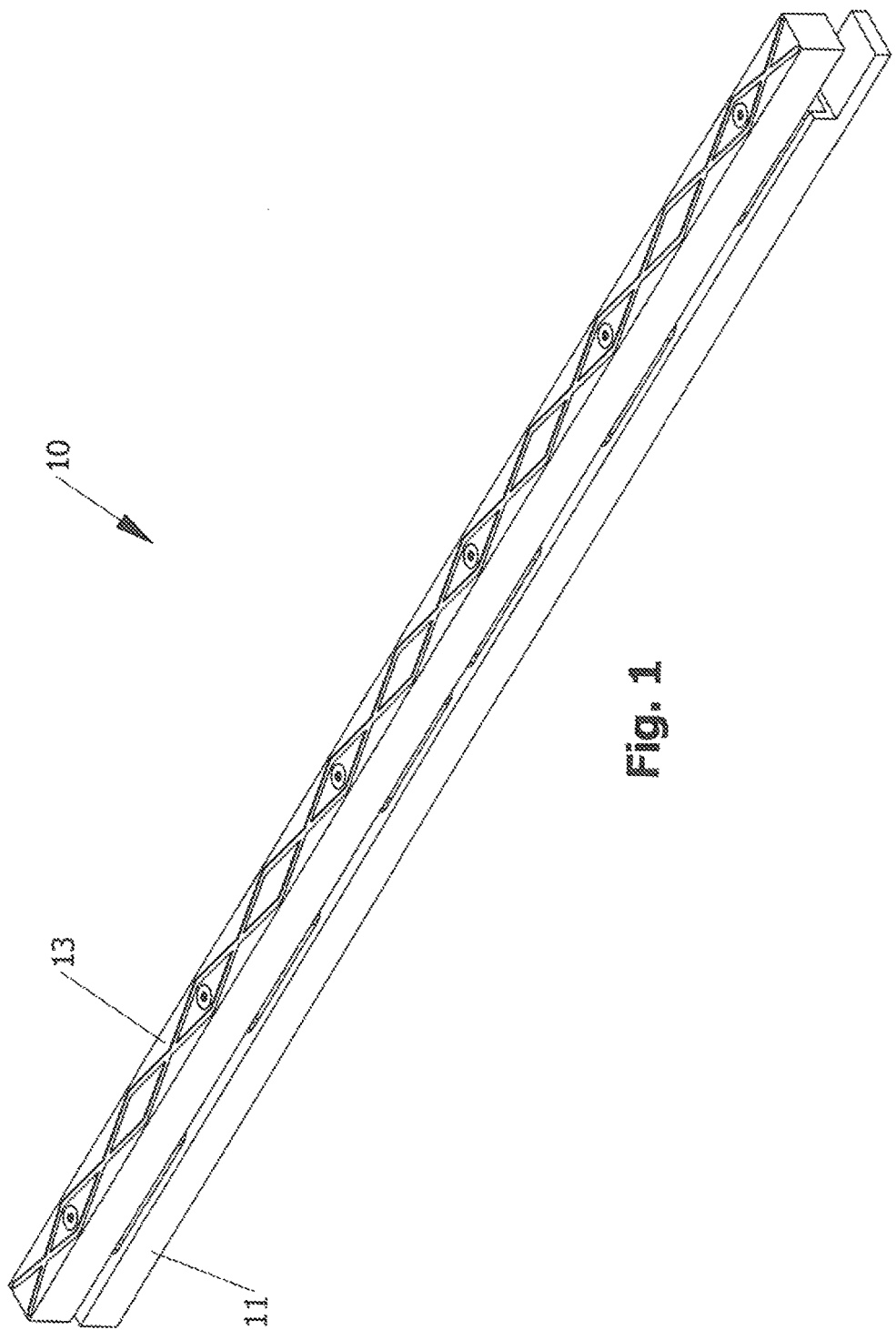
FIG. 1 is a perspective view of an embodiment of the strip scale of the present invention.
Figure 13:
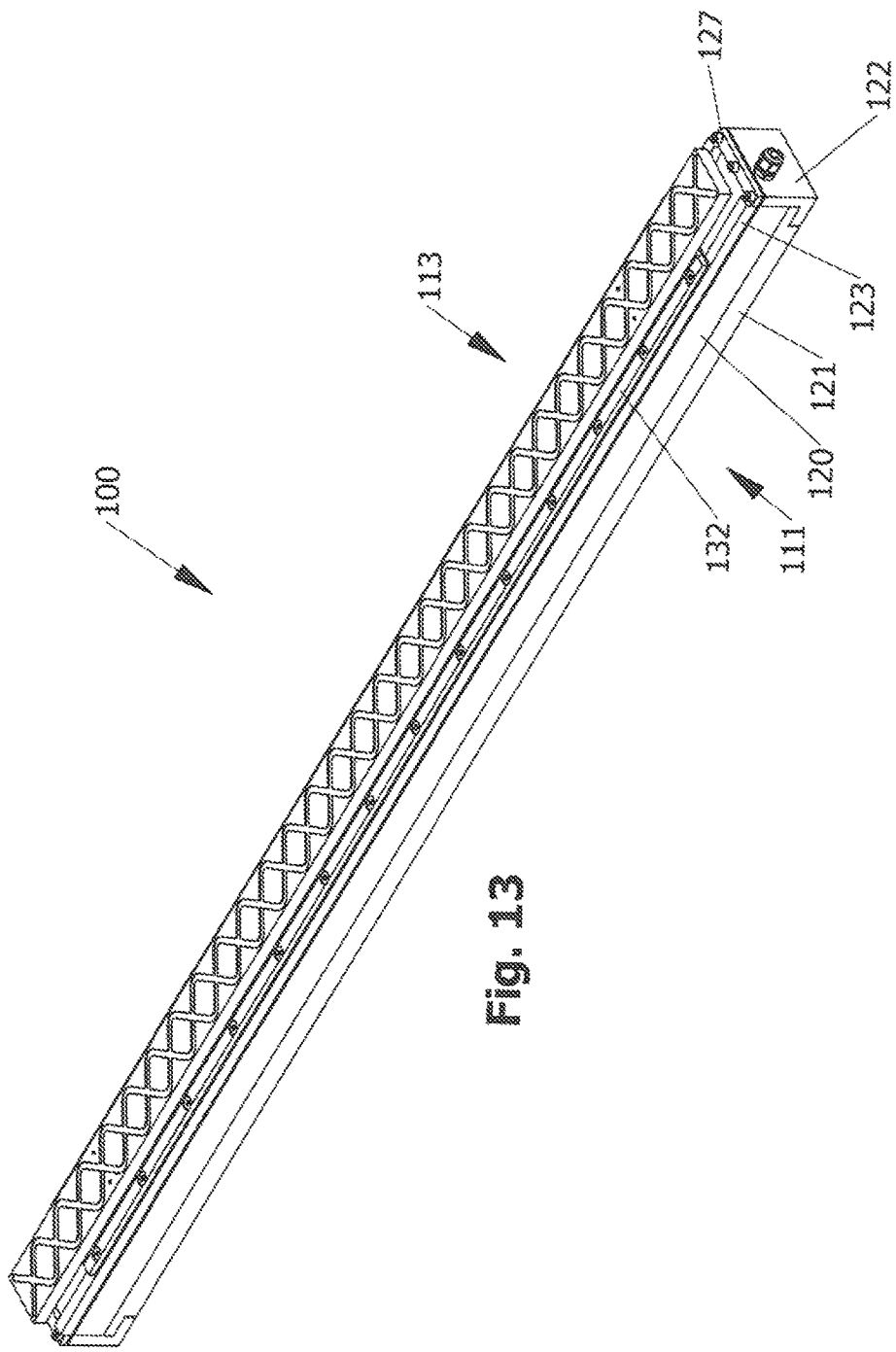
FIG. 13 is a perspective view of a first alternative embodiment of the strip scale of the invention.

FIG. 132 is a top view of the scale of FIG. 131.

FIG. 133 is a side view of the scale.

FIG. 134 is an end view of the scale.

FIG. 135 is a crossectional view of the scale, taken along line 135-135 of FIG. 133.

FIG. 136 is a detailed view of FIG. 135.

FIG. 137 is a detailed view of the section "137" of FIG. 136.

FIGS. 138-143 are sectional views of alternative embodiments of the scale base of FIGS. 131-137.

FIG. 144 is a sectional view of a further alternative embodiment of the scale base.

FIG. 145 is an exploded view of an alternative embodiment of the strip scale of the present invention FIG. 146 is a perspective view of an embodiment of a base member of the scale shown in FIG. 145.

FIG. 147 is a perspective view of an embodiment of a platform member of the scale of FIG. 145.

FIG. 148 is an exploded view of another alternative embodiment of the strip scale.

FIG. 149 is a crossectional view of the strip scale of FIG. 148.

FIG. 150 is a crossectional view of another embodiment of a compliant element of the strip scale of FIG. 145.

FIG. 151 is a crossectional view of yet another embodiment of a compliant element of the strip scale of FIG. 145.

FIG. 152 is a crossectional view of a further embodiment of a compliant element of the strip scale of FIG. 145.

FIG. 153 is a crossectional view of the strip scale of FIG. 145.

FIG. 154 is a perspective view of an embodiment of a load cell for use with strip scales.

FIG. 155a is a front or side view of the load cell of FIG. 154.

FIG. 155B is an end view of the load cell.

FIG. 156 is a detailed view of an end portion of the load cell.

FIG. 157 is another detailed view of the end portion.

FIG. 158 is yet another detailed view of the end portion.

FIG. 159 is an end view of another embodiment of a load cell.

FIG. 160 is an alternative embodiment of the load cell of FIG. 159, including outside plates.

FIG. 161 is another alternative embodiment of the load cell of FIG. 159, including bent outside plates.

FIG. 162 is yet another alternative embodiment of the load cell of FIG. 159, including inside plates.

FIG. 163 is a side or front view of the load cell of FIG. 159.

FIG. 164 is another end view of the load cell of FIG. 159.

FIG. 165 is a front or side view of the load cell of FIG. 162.

FIG. 166 is another end view of the load cell of FIG. 162.

FIG. 167 is a front or side view of the load cell of FIG. 160.

FIG. 168 is another end view of the load cell of FIG. 160.

FIG. 169 is a front or side view of the load cell of FIG. 161.

FIG. 170 is another end view of the load cell of FIG. 161.

FIG. 171 is an end view of another embodiment of a load cell.

FIG. 172 is an alternative embodiment of the load cell of FIG. 171, including outside plates.

FIG. 173 is another alternative embodiment of the load cell of FIG. 171, including bent outside plates.

FIG. 174 is yet another alternative embodiment of the load cell of FIG. 171, including inside plates.

FIG. 175 is a side or front view of the load cell of FIG. 171.

FIG. 176 is another end view of the load cell of FIG. 171.

FIG. 177 is a front or side view of the load cell of FIG. 174.

FIG. 178 is another end view of the load cell of FIG. 174.

FIG. 179 is a front or side view of the load cell of FIG. 172.

FIG. 180 is another end view of the load cell of FIG. 172.

FIG. 181 is a front or side view of the load cell of FIG. 173.

FIG. 182 is another end view of the load cell of FIG. 173.

DETAILED DESCRIPTION

The scale of the present invention is suitable to weigh vehicles or other articles while they are in motion. The scale is particularly well suited for weighing of vehicles moving at high speeds over road ways. The scale may be used for example by embedding the scale in a roadway either during construction of the roadway or after construction by retrofit, and then weighing vehicles traveling at normal speeds over the roadway of for example of 35-75 miles per hour. Examples of vehicles include motorcycles, cars, trucks, buses and the like.

FIGS. 1-12 show an embodiment of a strip scale 10 of the present invention. The strip scale 10 has an elongated, strip-like configuration with a low profile. It may be placed on a surface such as a road or a floor, either directly or indirectly as part of a larger weighing system. The strip scale 10 may be used for static weighing, but it is ideally suited for in motion weighing of vehicles or craft such as cars, trucks, aircraft, boats and other consumer, commercial, industrial, municipal or military articles or apparatus. The scale 10 is relatively long and thin compared to known scales and very low profile. As is best shown in FIGS. 1, 2, and 8-12, the scale 10 basically comprises a bottom base 11, a plurality of load cells 12, and a top platform 13. The base 11 is placed on a support surface such as a floor, roadway or mounting area of a floor or roadway 50. The base 11 is constructed of a strong, rigid material such as steel (preferably stainless steel) or aluminum (preferably 6061 aluminum). The platform 13 is preferably constructed of the same or similar material as the base 11. The load cell 12 is placed on the top surface of the base 11. Platform 13 is placed over the top plate 13. Top fastening screws 17 are oriented through apertures 18a (threaded) of the platform 14 and apertures 18b at one end of the load cells 12 to connect the platform 14 to the load cells 12. Circular, washer shaped spacers 20 are disposed between the top of the load cells 12 and the bottom of the platform 13. A pair of lower fastening screws 30 a/b are oriented through apertures 31 a/b (threaded) of the base 11 and apertures 32a/b (threaded) at an opposite end the load cells 12 to connect each load cell 12 to the base 11. Nuts 33a/b secure the connection. A spacer 34, with apertures 35 a/b, is disposed between the base 11 and each load cell.

The strip like configuration of the scale 10, and the other embodiments described below, is at least three (3) times longer than it is wide, and preferably between 17-22 times longer. The range of satisfactory lengths and widths is 2.0-6.0 inches (5.08-15.24 cm) wide, and 20.0-78.7 inches (0.5-2.0 meters) long. Preferably, the scale is approximately 3.41 inches (8.66 cm) wide and a length of 1.5 meters (59.0 in.), 1.75 meters (68.8 in.) or 2.0 meters (78.7 in). The scales are relatively low profile. A preferred height is approximately 1.465 to 1.475 inches (3.721 to 3.746 cm).

FIGS. 1, 2, 5, 10 and 12 show an embodiment of the base 11 having an elongated rectangular configuration with a predetermined length, width and height. Base 11 has a flat bottom surface 40 and a substantially flat top surface 41. Recesses 43 of predetermined dimensions are disposed in the top surface 41 of the base 11 for placement of the load cells 12. An end portion 44 is disposed at one end of the base 11. FIGS. 1, 2, 7, and 12 show an embodiment of the platform 13 having an elongated rectangular configuration with predetermined length, width, height and thickness. Platform 13 has top and bottom flat surfaces. Referring also to FIGS. 10 and 11, recesses 45 are disposed in the bottom surface of the platform 11 to accommodate the nuts 33. Referring to FIGS. 10-12, in the preferred embodiment, six (6) load cells 12a-f are used. However, it is within the purview of the invention that between one and ten load cells may be used. This embodiment of the scale 10 uses single ended, shear beam load cells 12 oriented in-line with each other in a tandem or end to end fashion. As is shown in FIG. 12, three load cells on one end of the scale 10 have their ends connected to the base 11 in one direction (for example to the right and towards the center or mid-point of the scale—lengthwise) and the other three load cells have their base connected ends in the opposite direction (to the left and towards the center/mid-point).

Figure 25:
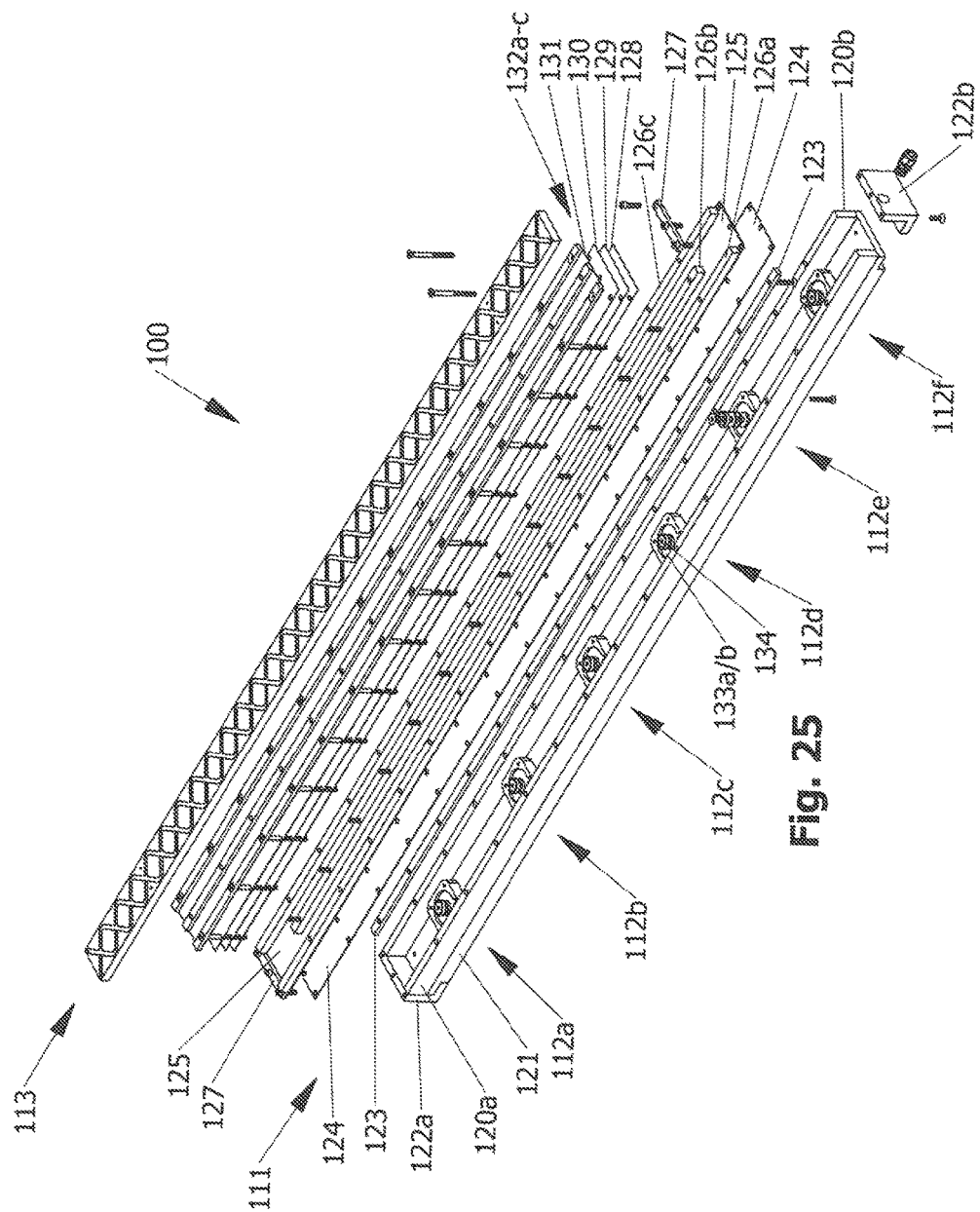
FIG. 25 is an exploded view of the scale.
Figure 26:
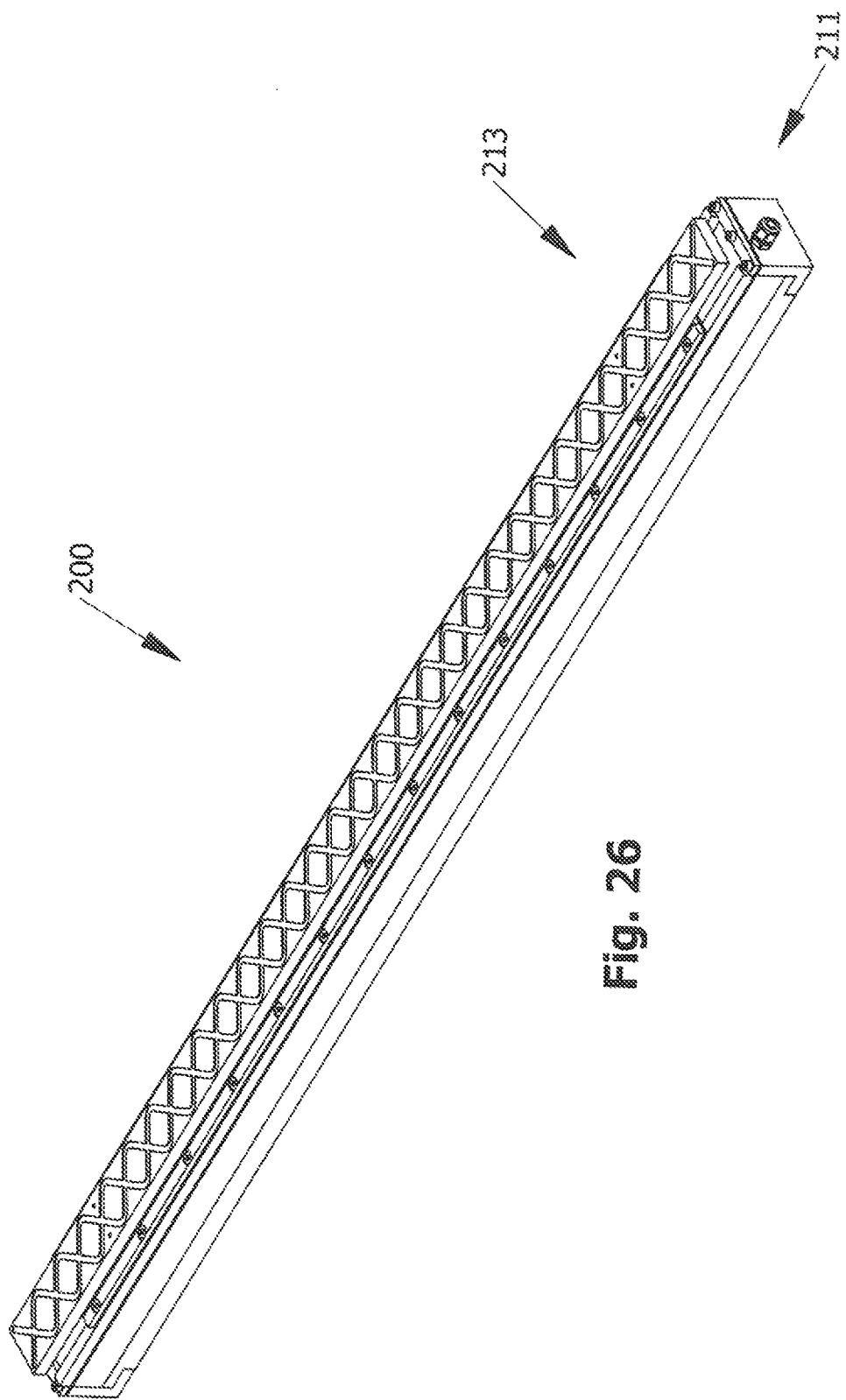
FIG. 26 is a perspective view of a second alternative embodiment of the strip scale of the invention.
Figure 39:
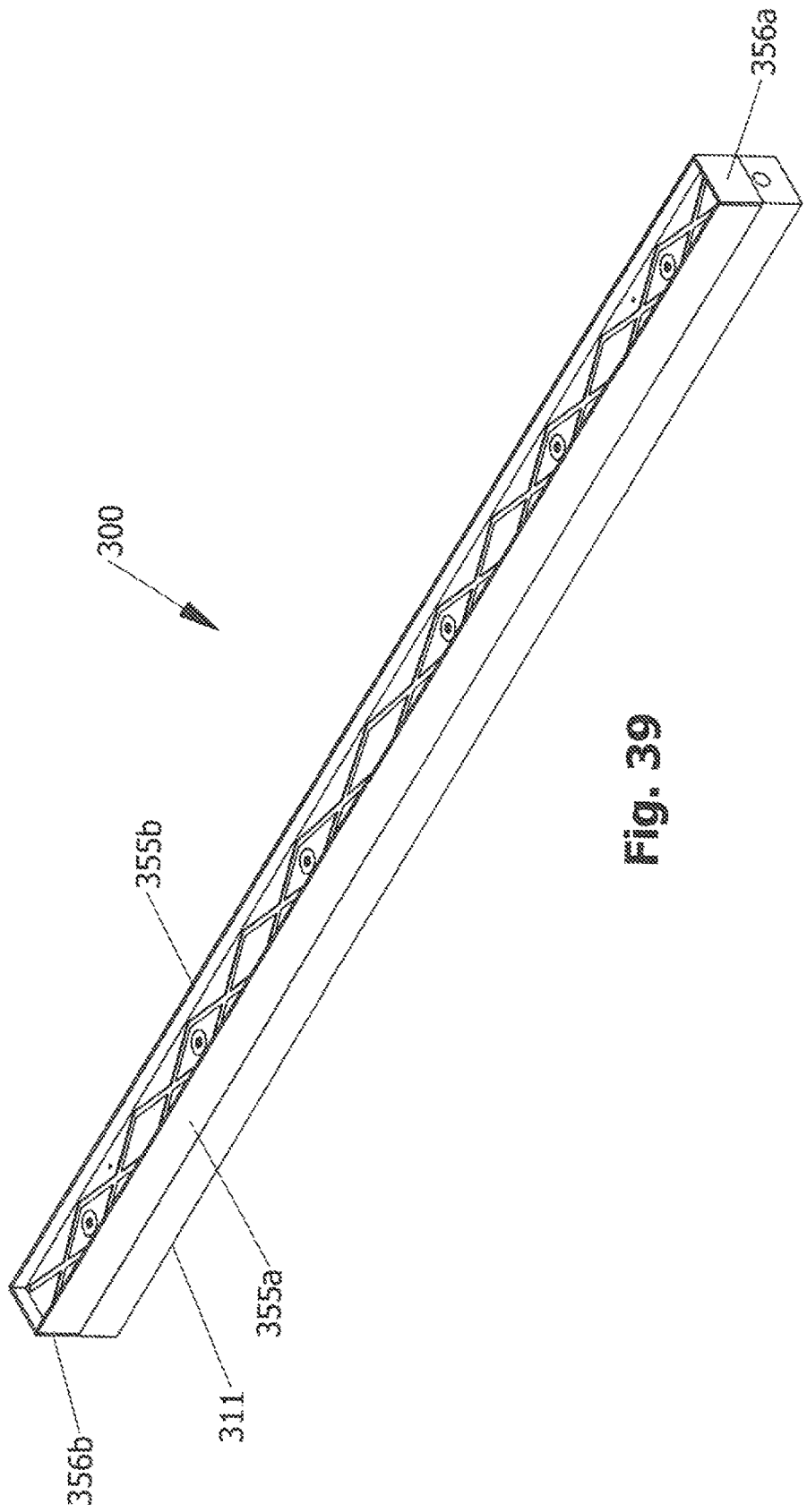
FIG. 39 is a perspective view of a third alternative embodiment of the strip scale of the invention.

FIGS. 13-25 show a first alternative embodiment of the strip scale 100 of the invention. Scale 100 is also elongated, thin and low profile. It also has a bottom base assembly 111, several load cells 112, and a top platform 113. As is best shown in FIGS. 23 and 25, load cells 112 are disposed a predetermined distance apart on the base assembly 111. Base sides 120 a/b are connected to the base member 121 along its sides, longitudinally. End plates 122 are connected at the end of the base member 121. A center (side loading) strap 123 is disposed over the load cells 112. A first (bottom) 124 and a second 125 checking plate or flexure are disposed on top of the center strap 123. First spacers 126 a, b and c (side 1, center and side 2) are disposed on top of the second checking plate 125. End straps 127 a/b are disposed at the ends. Third, fourth, fifth and sixth checking plates/flexures 128, 129, 130 and 131 are disposed on top of the first spacers 126, respectively. Second spacers 132 a, b and c (side 1, center and side 2) are disposed over the sixth flexure 131. And platform 113 is disposed over the second spacer set 132. Each load cell 112 has a pair of washers 133 a/b centrally disposed on its top, and a top load button 134 is disposed on the washers 133 for connection to the center spacer 123. Referring also to FIG. 24, the load cells 112 are connected to the base member 121 via downwardly oriented screws 140. And the platform 113 is connected to the layer of elements extending downwardly to the center strap 123 by upwardly oriented screws 141.

FIGS. 26-38 show a second alternative embodiment of the elongated, low profile strip scale 200 of the invention. Scale 200 has a substantially similar structure and function to that of scale 100 described above, except, as best shown in FIG. 38, that it has a single checking plate or flexure 228 disposed between lower spacers 226 a-c and upper spacers 232 a-c.

FIGS. 39-50 show a third alternative embodiment of the elongated, low profile strip scale 300 of the invention. Scale 300 a base 311 and a platform 313. Beam type load cells 312 are disposed in apertures 320 in the base 311. Channels are preferably machined into the base to permit routing of electronic cables between the load cells and a disposition of a summing junction. Layer 350 is a sealing member preferably constructed of extruded silicone foam rubber material, with apertures 351 aligned with the load cells 312. The apertures permit addition of a potting compound, for example a gel, during installation of the scale 300 in a roadway. Side members 355 are disposed lengthwise with respect to the scale 300. The side members 355 protect the scale 300 during installation and use. Side members 355 are flexible to permit scale operation and are preferably constructed of a foam material. End plates 355a-d enclose the scale 300.

The internal foam member 350 compresses due to the force exerted by the potting gel. The potting gel is largely incompressible but has a very low durometer allowing it to deform and transfer the force to the compressible foam. The foam must be easily compressible. One common means to quantify the compressibility is to report the force required to compress the foam by 25% and report the results in pounds per square in or PSI. Suitable foams would have compressibility in the range of 3-20 PSI. Foams in the ranges of 5-15 or 8-12 PSI are common. The foam must also have a closed cell structure to prevent water and other fluid absorption. This is very important when designing scales for use in cold climates with alternate thawing and freezing cycles. The must also maintain the flexibility at low temperatures. Many otherwise suitable types of foam become less flexible at cold temperatures. The foam must also be relatively inert and chemical resistant. Cross-linked polyethylene foam is low cost and commonly used for thermal insulation, industrial gaskets, packaging and in flotation equipment. It has low moisture permeability and high buoyancy. Silicone foam rubber is also good for the application although priced higher. In some applications depending on scale dimensions and weather constraints, PVC/NBR, polyethylene, neoprene, urethane, EPDM, and other synthetic foam rubbers may be suitable. The foam is ideally inserted to fill the space between the scale base and platform. This may be 0.05 up to 1 inch. Typical thickness of the foam is 0.25 to 0.75 inches. The foam may be compressed slightly under the platform but not more than 25% and ideally in the range of 5-15%. The width of the foam is generally from the side of the base to close to the load cells. This may be in the range of 0.25-0.5 inches. It may be important to leave a small gap between the load cell and the foam to allow gel to flow between the load cell and foam. The foam also plays an important role in keeping the gel within the scale during pouring and the curing time.

The external layer of foam 355 separates the scale platform and body from the road surface. During installation, the scale is placed within a cutout slot in the road way. After careful placement the void between the scale and the roadway is filled in with a potting compound that is typically a type of epoxy, polyurethane or cementitious product. The potting compound cures adjacent to and directly to the foam and to the cement or asphalt road. The foam allows the scale platform to deflect slightly relative to the roadway due to its flexibility. An installation without the foam would result in very poor performance due to the platform being bonded to the roadway. Many of the requirements on the foam are met by the internal foam discussed elsewhere in the specification. Additional requirements are of ultra-violent insensitivity and very durable against abrasion. Tough silicone foam rubbers in the 5-15 PSI range are ideal for this application although others may be suitable. The foam must be thin to prevent pebbles and excessive abrasion on the road surface and ideally less than 0.15-0.25 inches. The foam must also be thick enough to create a low resistance to flexing and compression to allow for optimal scale performance. Minimum dimensions are in the range of 0.05 to 0.1 inches for highly compressible materials. The preferred external foam is a 10 PSI silicone foam rubber with a nominal ⅛ inch or 3 mm thickness and a pressure sensitive adhesive backing allowing it to be placed directly over the platform and extending down to the base also covering the gap between the platform and base.

The scales are typically placed in the roadway or runway and exposed to weather elements including rain, snow, ice and sleet. The substrate could be constructed using asphalt, cement, steel, gravel or any combination thereof and generally porous to liquids and or continuously saturated. In cold weather regions where salt is used to melt snow and ice or near the shoreline, the potential for problems is more acute due to the corrosive nature of saltwater and the damage it may cause to the load cells, wires and electronics. The potting gel creates a barrier to protect the sensitive elements from external liquid. In order to maintain the performance, the gel must have a very low durometer typically measured on the Shore 00 scale. Alternatively, the gels may be quantified with a probe and measuring the force to insert probe to a predetermined depth. Suitable gels are commonly termed reenterable gels in that they allow entry of a tool and reseal themselves. The gels must also have high resistivity and insulation values as well as maintaining the flexibility at cold temperatures commonly specified at −40 degrees Celsius. Silicone gels that meet these specifications are available. There are newer polyurethane and epoxy gels that may be suitable in some applications.

An alternative to potting the scales is to use a hermetic design. In this embodiment, the base and platform are welded together with a flexible accordion-like section between them. Alternatively, an extrusion is formed with thin walls and further machining steps are taken to ensure side wall flexibility. The load cells are pushed in from the end of the assembly and the end cap is welded to the assembly. The electrical connection is made through a feed thru which consists of a metal ring filled with glass and wires penetrating the glass.

Figure 51:
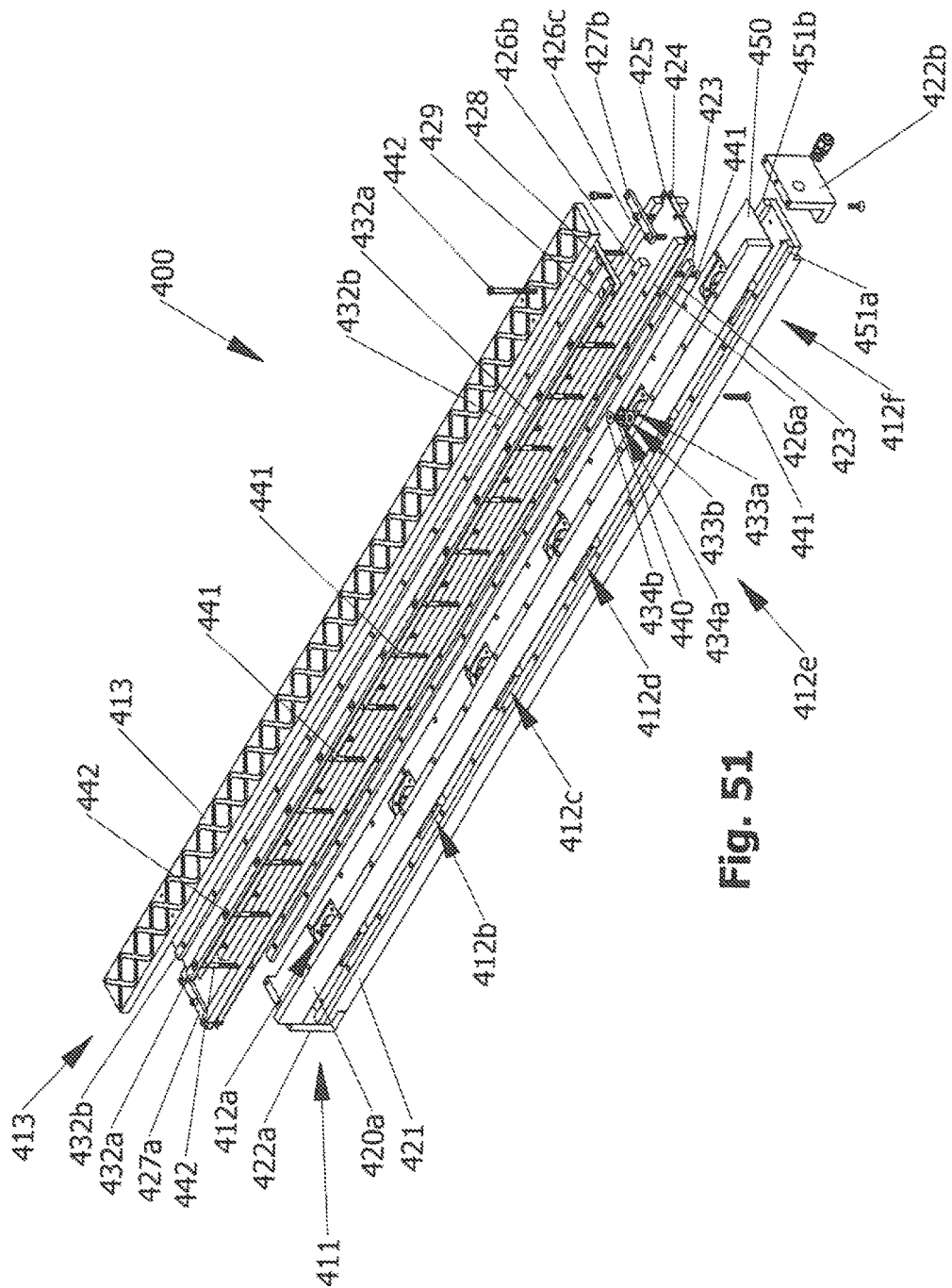
FIG. 51 is an exploded view of a fourth alternative embodiment of the strip scale of the invention.

FIGS. 51-62 show a fourth alternative embodiment of the high speed, weigh in motion strip scale 400 of the invention. Scale 400 has a substantially similar structure and function to that of scales 100 and 200 described above, except that it has an additional lower (first) checking plate or flexure 450 disposed below the central spacer 423, and the checking plate 450 is disposed above an additional lower side spacers 451. Scale 400 is also elongated, thin and low profile. It has a bottom base assembly 411, several load cells 412, and a top platform 413. Referring in particular to FIGS. 51, 56 and 61, the load cells 412 are disposed a predetermined distance apart, along the central longitudinal axis of the base assembly 411. Base sides 420 a/b are connected to the base member 421 along its sides a/b, longitudinally on top of the spacers 451. End plates 422 are connected at the ends a/b of the base member 421. A center (side loading) strap 423 is disposed over the load cells 412. A second 424 and a third 425 checking plate/flexure are disposed over the center strap 423. Second spacers 426 a, b and c (side a, center b and side c) are disposed on top of the third checking plate 425. As is best shown in FIGS. 51 and 61, end straps 427 a/b are disposed at the ends, over flexure 425 and connected via screws or bolts. Fourth and fifth checking plates/flexures 428 and 429 are disposed on top of the second spacers 426, respectively. Third spacers 432 a, b and c (side loading strap 1, center platform spacer and side loading strap 2) are disposed over the fifth flexure 429. And platform 413 is disposed over the third spacer set 432. These elements have predetermined dimensions and are constructed and arranged as shown to provide an optimum balance between load sensing and resistance to side loading, particularly for high speed weighing of vehicles traveling over a roadway in which the scale is embedded. As is best shown in FIGS. 51 and 62, each load cell 412 has a pair of washers 433 a/b centrally disposed on its top, and a top load button and cap 434a/b is disposed on the washers 433 for engagement with the center spacer 423. The load cells 412 are connected to the base member 421 via, centrally aligned downwardly oriented screws 440. As is best shown in FIGS. 51 and 62, the top platform 413 is connected down to central side loading strap 423, second and third checking plates 424/5, the middle second spacer 426b, fourth and fifth checking plates 428/9, and the platform spacer 423b by upwardly oriented screws 441 arranged along the central longitudinal axis of the scale 400. Elements 432, 428/9, 426, 424/5, 420, 450 and 451 are connected to the base 421 at each side a/b of the scale 400 by downwardly oriented screws 442

FIGS. 52-59 show embodiments of the load cell for use with the embodiments of the scale of the invention described above. FIGS. 52-55 show a first embodiment of a load cell 112. The load cell 112 has a cylindrical, disc shaped configuration. It may be used in the strip scale embodiments shown in FIGS. 13-38 and 51. Referring to FIGS. 56-59 show a second embodiment of the load cell 12 has a generally rectangular configuration with a relatively long length and a relatively thin height or thickness, or low profile. Load cell 12 is a single ended, shear beam type load cell. It may be used in the strip scale embodiments shown in FIGS. 1-12 and 39-50.

The load cells shown in FIGS. 52-59 are associated with strain gauges as is generally known in the art. on the load cells. The process of gauging process involves first sandblasting the load cell (for example load cell 12, 121, 500 or 600, then dipping it in alcohol as an initial cleaning. After dipping, the load cell is sprayed with alcohol as a rinse cleaning. After rinsing, gages are labeled and oriented at predetermined locations on the load cell. A predetermined amount of adhesive is applied to bond the gages to the load cell. Care should be exercised to avoid contaminating material or debris that may be present on the gage during gluing. Preferably, the gage should be inspected under magnification after glue is applied. Glue should not be placed on the top of the solder pads. Next, the assembly is cured, for example via heat in an oven. After curing, the resistance values of each gage are recorded. After verification of proper resistance values, wires are connected to the gages. After wiring, a coating is applied to the gages.

Figure 63:
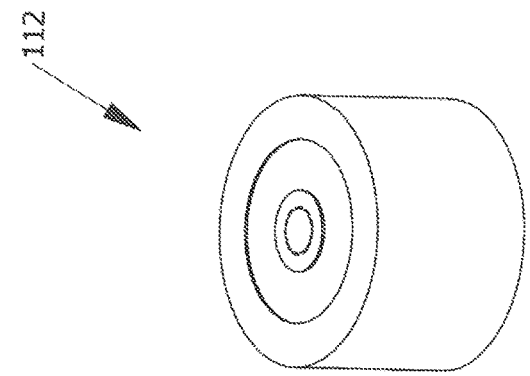
FIG. 63 is a perspective view of an embodiment of a disc shaped load cell for use in a strip scales shown in FIGS. 13-38 and 51.

FIGS. 60-63 show fifth alternative embodiment of a strip scale 510 of the present invention. The strip scale 510 has a low profile. It may be placed on a surface such as a road or a floor, either directly or indirectly as part of a larger weighing system. The strip scale 510 may be used for static weighing, but it is ideally suited for in motion weighing of vehicles or craft such as cars, trucks, aircraft, boats and other consumer, commercial, industrial, municipal or military articles or apparatus. The scale 510 is relatively long compared to known scales and very low profile. As is best shown in FIGS. 62 and 63, the scale 10 basically comprises a bottom base 511, a load cell 512, an intermediary top plate 513, and a top platform 514.

Figures 118, 119, 120:
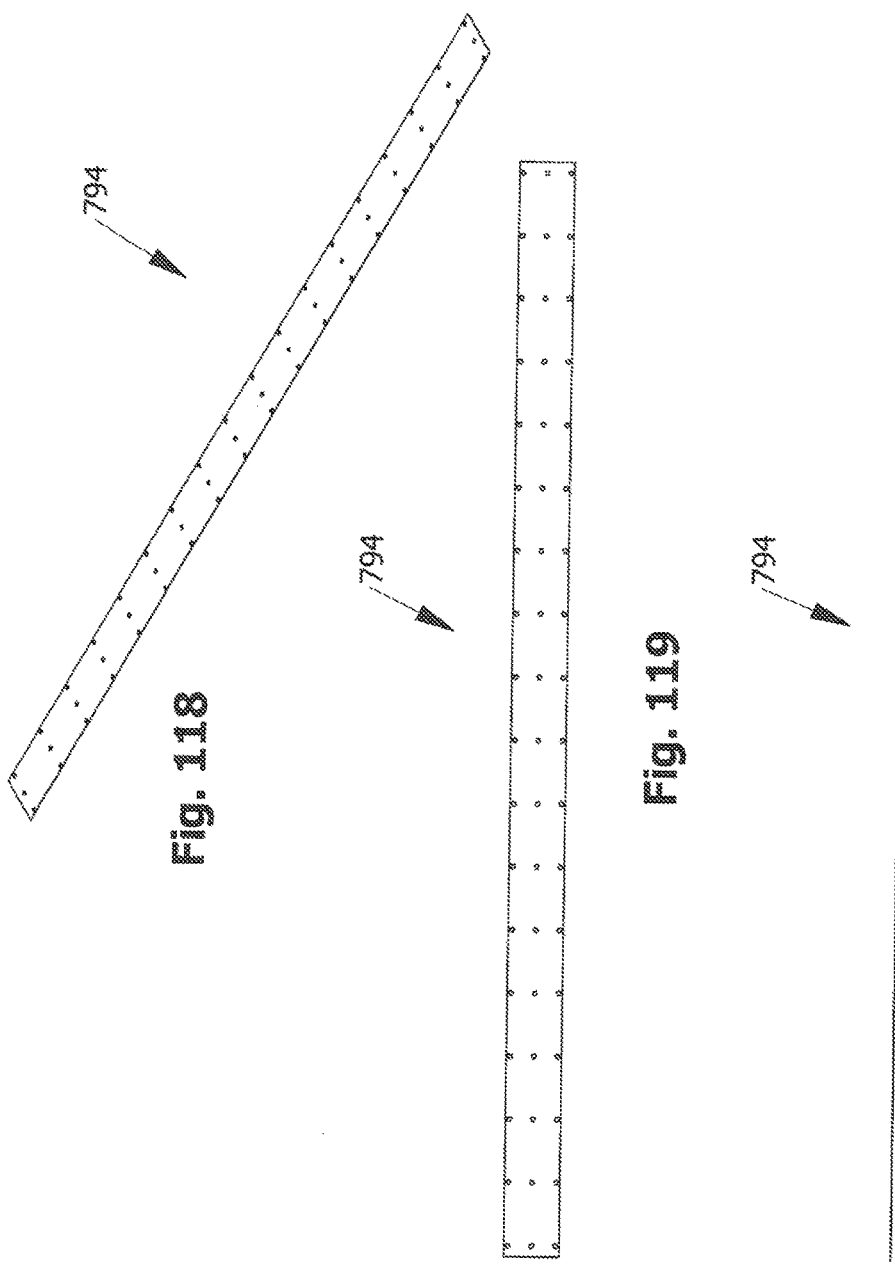
FIG. 118 is a perspective view of the first checking plate of the scale.
FIG. 119 is a top view of the first checking plate.
Figure 128:
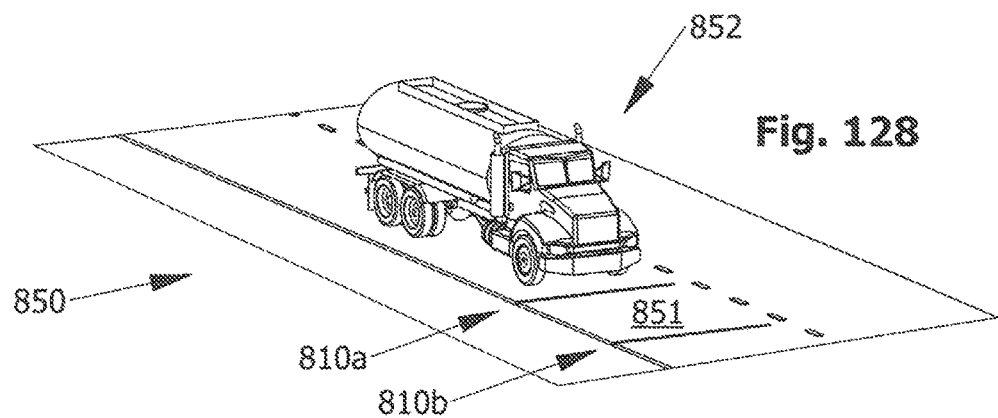
Figure 129:
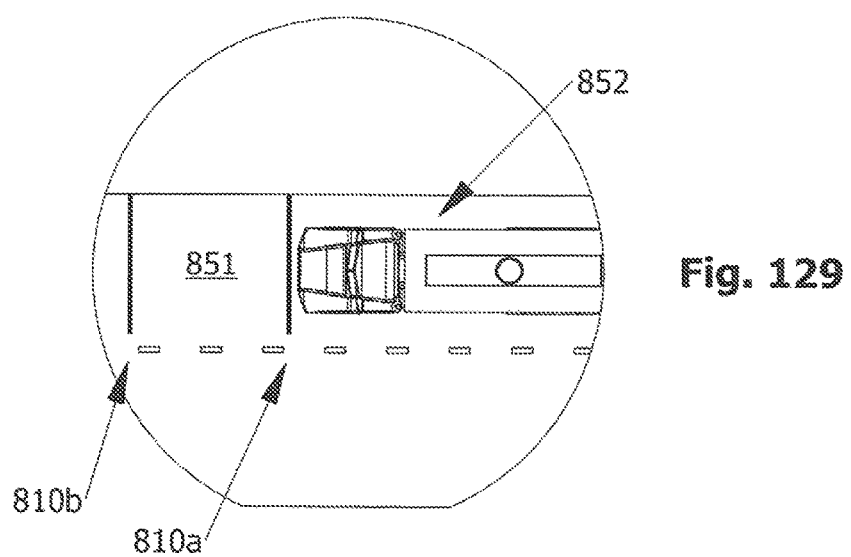
Figure 130:
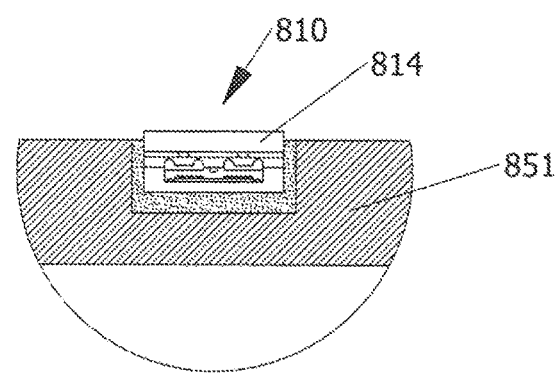
Figure 138:
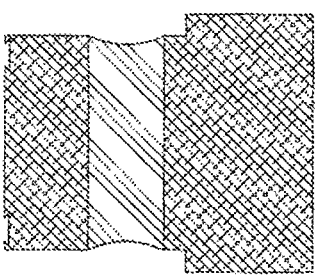
Figure 139:
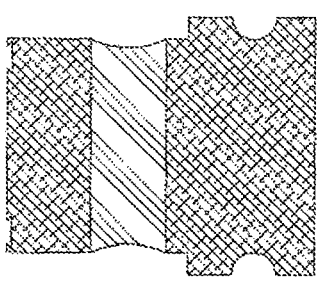
Figure 140:
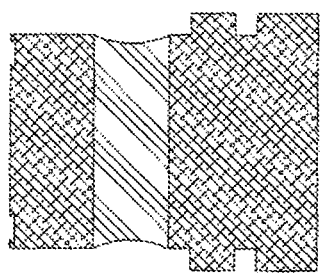
Figure 141:
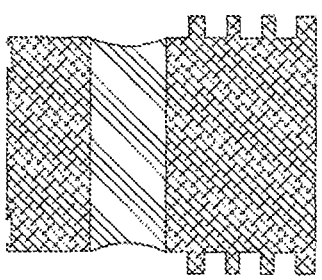
Figure 142:
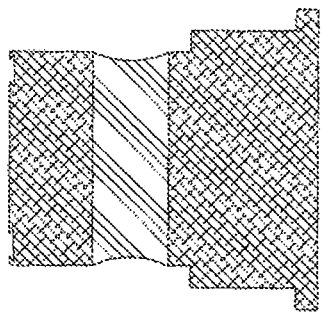
Figure 143:
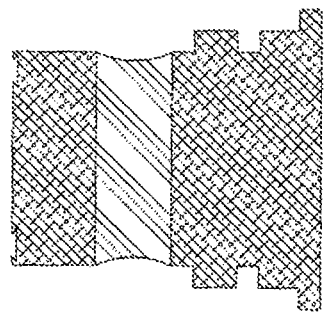

The base 511 is placed on a support surface (See FIG. 119 for example). The load cell 512 is placed on the top surface of the base 511. The top plate 513 is placed on the base 511, over the load cell 512. Pins 515 are placed (end to end) in slots 516 disposed on the top surface of the top plate 513. Platform 514 is placed over the top plate 513. Top, inner fastening screws 517 are oriented through apertures 518 $a$ and 158 $b$ (threaded) of the platform 514 and top plate 13 respectively to connect the platform 514 to the top plate 513. Lower, outer fastening screws 519 are oriented through apertures 520 $a$ and 520$b$ (threaded) of the top plate 513 and base 511 respectively to connect the top plate 13 to the base 511.

Figures 64, 65:
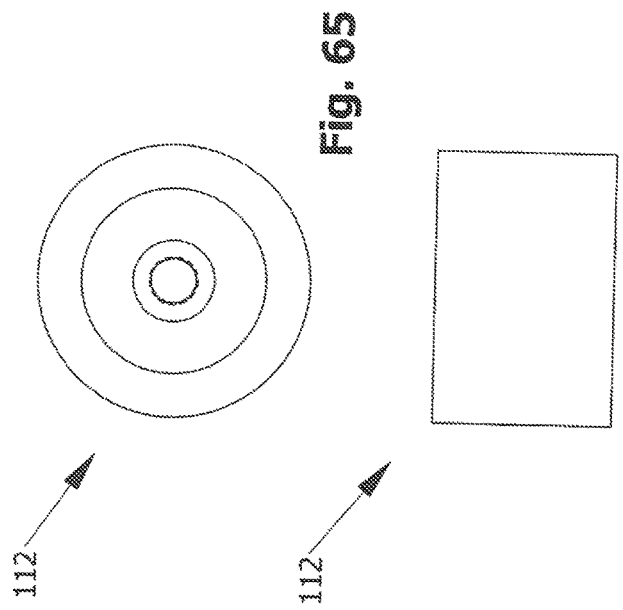
FIG. 64 is a front, elevation view thereof.
FIG. 65 is a top view thereof.
Figure 66:
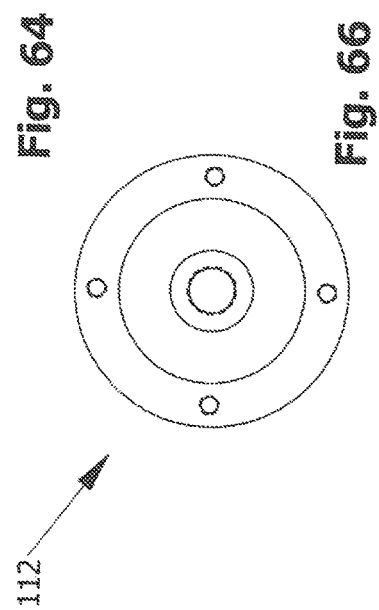
FIG. 66 is a bottom view thereof.
Figure 67:
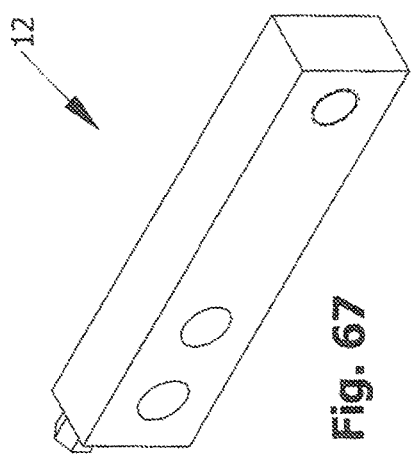
FIG. 67 is a perspective view of an alternative embodiment of a load cell, a single ended, shear beam configuration, for use in the strip scales shown in FIGS. 1-12 and 39-50.
Figure 69:
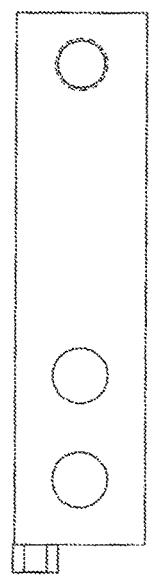
FIG. 69 is a top view thereof.
Figure 68:
FIG. 68 is a front, elevation view thereof.
Figure 70:
FIG. 70 is an end view thereof.

FIGS. 64-81 show several embodiments of the load cell for use with the embodiments of the scale of the invention. Referring to FIGS. 64-66, first embodiment of the load cell 512 has a generally rectangular configuration with a relatively long length and a relatively thin height or thickness, or low profile. The load cell 512 has a body portion 571, a pair of legs 572$a$ and 572$b$ extending downwardly from the edges of the body 570, and a central base rail 573 extending upwardly from the center of the body 570. A foot 34 is disposed downwardly from each leg 32. A top rail 35 extends upwardly from the center of the base rail 573. FIGS. 67-76 show second, third and fourth load cell structures 570', 570'' and 570''' that are substantially similar to the geometry of load cell 570, but have particular dimensions which differ. FIGS. 77-81 shows a fifth alternative embodiment of a low profile, elongated load cell 512$^4$ which has a pair of slots 58 disposed at one end.

FIGS. 82-85 show methods and arrangements of strain gauges on the load cells 512. FIG. 82 is a top view of one embodiment of a gauging pattern on a load cell 512, for example a sixth embodiment of a load cell 512'. Load cell 512$^5$ has a structure which is similar to that of load cells 512 to 512''', but does not have a bottom foot, or a top central base rail. FIG. 83 is a bottom view of the gauging pattern shown in FIG. 23. FIG. 84 is an end diagram for an example process of gauging a seventh embodiment of the load cell 512$^7$ of the present invention. The load cell 512$^7$ has a similar structure to that of load cell 512, except that it also has a top central base rail. FIGS. 85A and B are compression side and tension side view of the gauging process of FIG. 25 on load cell 512$^7$. This embodiment of the process of gauging involves first sandblasting the load cell 512', then dipping it in alcohol as an initial cleaning. After dipping, the load cell 512$^7$ is sprayed with alcohol as a rinse cleaning. After rinsing, gages labeled C1, C2, T1 and T2 are oriented at predetermined locations on the load cell 512$^7$, for example the locations shown in FIGS. 25 and 26. A predetermined amount of adhesive is applied to bond the gages to the load cell 512$^7$. Care should be exercised to avoid contaminating material or debris that may be present on the gage during gluing. Preferably, the gage should be inspected under magnification after glue is applied. Glue should not be placed on the top of the solder pads. Next, the assembly is cured, for example via heat in an oven. After curing, the resistance values of each gage are recorded. After verification of proper resistance values, wires are connected to the gages. After wiring, coat M is applied to the gages.

FIGS. 86-88 show an embodiment of the base 511. The base 511 also has an elongated rectangular configuration. It has a flat bottom surface 550. Rails 551$a$ and 551$b$ are disposed along the sides of the base 511, extending upwardly. Threaded apertures 520$b$ are disposed in the rails 551. Apertures 520$b$ are aligned with outer apertures 520$a$ of the top plate 513.

FIGS. 89-91 show an embodiment of the platform 514. The platform 514 also has an elongated rectangular configuration. It has top and bottom flat surfaces. Apertures 518$a$ are disposed in the platform 514 in tandem rows that, in a operative position, align with the inner apertures 518$b$ of the top plate 513.

And FIGS. 92-95 show an embodiment of the top plate 513. The top plate 513 also has an elongated rectangular configuration. Referring to FIG. 92, the top surface 570 of the plate 513 has the elongated slots 516$a$ and 516$b$ disposed toward the center of the plate 513 in parallel with each other. The slots 516$a/b$ have a curvilinear shape that complements the outside diameter of the pins 14. The apertures 518$b$ are disposed in the slots 516. Apertures 520$a$ are disposed in rows along the edges of the plate 513. Referring to FIGS. 93 and 95, the bottom surface 571 of the plate has four (4) slots 572$a$-$d$ running lengthwise or longitudinally and parallel to each other.

FIGS. 96-99 show sixth alternative embodiment of the strip scale 680. The scale 680 has a substantially longer length than that of scale 610. Scale 680 has a unitary base 681, a pair of load cells 682$a$ and 682$b$, a unitary top plate 683 and a unitary platform 684.

FIGS. 100-116 show a seventh alternative embodiment of the elongated, low profile strip scale 790 of the present invention. Referring first to FIGS. 100-109, scale 790 comprises a base 791, a plurality of load cells 792$a$-$f$, first side spacers 793$a/b$, a first central spacer 793$c$, a first checking plate 794, second spacers 795$a$-$c$, a second checking plate 796, third spacers 797$a$-$c$, and a top platform 798. Load cells 792 are connected to the base preferably via screws 799, which further connect on the top of the load cells to a load button 700 through one or more washers 701$a/b$. Details of the load cell 792 are shown in FIGS. 110-116. This load cell 792 may also be used in the scale embodiments of FIGS. 13-38 and 51.

Figure 117:
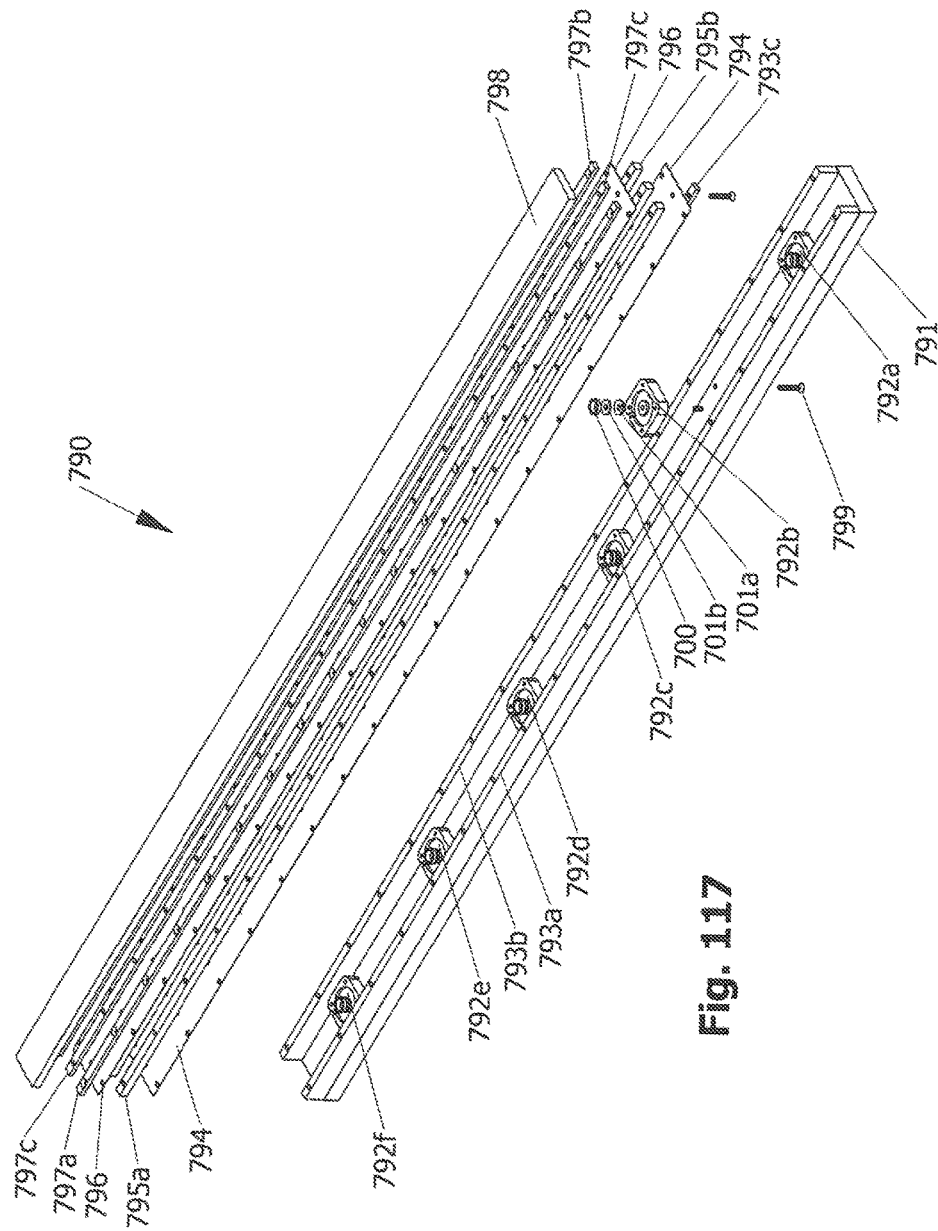
FIG. 117 is an exploded view of the scale.

FIGS. 117-119 show an embodiment of a system 850 including a pair of strip scales 810 $a$ and 810$b$ disposed in a roadway 851 and oriented perpendicular to the direction of traffic such that a vehicle, for example a truck 152 rolls over at least one scale 810. The scales 810$a/b$ may be embedded into the roadway 151, either during initial construction of the roadway 851 or as an add on later. FIG. 43 shows a means of embedding the scale 810 in the roadway 851. The scales 810$a/b$ are disposed a predetermined distance apart. The platform 814 of the scale 810 may be disposed above the top surface of the roadway 851 so that it comes into direct contact with a load (i.e. a vehicle 852) or a predetermined distance below the surface so that intermediate material transfers force thereto. The scales 810 are communicatively connected to an electronic control system (not shown).

FIGS. 120-126 show another embodiment of the scale 900. The scale 900 has a base 901, a plurality of load cells (not shown), and a platform 903. Load cells may be used and arranged as shown in connection with scale 300 described above. A pair of internal foam members 904 and 905 are disposed between the base 901 and the platform 903. The base 901 has lateral flanges 910 and slots/undercuts 911. The flanges 910 facilitate secure holding of the scale in place in a roadway embedding slot. The slots 911 also facilitate securement be accepting grout or other embedding materials. FIGS. 127-132 show alternative flange and slot geometries. External foam members 912 are disposed lengthwise. An epoxy coating 930 is preferably applied during installation embedding the scale 900 in a roadway. Grooves 940 are preferably made in the platform 903. Most preferably, the grooves 940 are configured in a diamond-shaped configuration best shown in FIG. 121. Further, the grooves 940 are preferably made in a dovetail geometry best shown in FIG. 126. The horizontal (diamond) and vertical (dovetail) configuration of the grooves 940 facilitate optimum adhesion of the epoxy coating 930. FIG. 133 shows an alternative embodiment of a platform 950 with downwardly extended flanges 951 *a/b* for increased strength and water proofing.

The scales shown and described above disclose load cells which are mechanically fastened to the base and platform using bolts or screws. Optionally, the load cells may be used which are not fastened to the base and/or the platform. Free floating load cells tend to have less off axis loading and hence better performance. Shims made of suitable metal or plastic may be used to keep the load cells in the correct locations. This is viable and may increase performance if using disc type load cells, for example FIGS. 52-55, FIGS. 110-115 or double ended shear beam load cells. Less constrained load cells allow for the use of a much thinner base and slightly thinner platform. The base can be thinner because there is no torque on the base. The platform may be thinner because the load cells are less susceptible to flexing of the platform. Platform flexing creates off axis loading on! the load cells. The result is a lower height scale that is easier to place in the roadway requiring less cutting, jack hammering and removal of roadway to create the slot for the scales. Using steel for the base and platform also potentially reduces the height of the scale.

The platforms used in the scales are preferably sandable to create a surface flush with the roadway. Epoxy or polyurethane with a silica sand filler makes a good platform finish. The platform is durable against high vehicle traffic and sandable. The epoxy may also be directly applied to the platform using its adhesive qualities to bond to aluminum or steel finish. Alternatively, several plastics or fiberglass may be suitable for the platform finish. The plastic must have high impact resistance, ultra violet resistance, and excellent wear qualities. In one embodiment, a 0.5 inch thick piece of fiberglass is bonded to the platform. The bonding may be mechanical fastening, a spray on or brush on adhesive, or double sided tape or a combination of the above. A suitable tape is 3M's VHB line of tape that is used in construction replacing screws and rivets.

The base and platforms disclosed herein may be made of the same material. Suitable materials include steel, particularly stainless steel, and aluminum, most particularly 6061 aluminum. The teachings of this invention about internal and external sealing foam, potting compounds, scale installation techniques, load cell electronics, and load cell gauging are generally applicable to substantially all of the scale embodiments disclosed. Although the scales of the invention are shown in connection with strain-gauge type load cells, it is within the purview of the invention that piezoelectric type load cells may be used effectively.

FIGS. 145-147 show another embodiment of the strip scale 955 of the present invention. Referring to FIG. 145, the scale 955 includes a base 956, at least one load cell 957 disposed on the base 956, and a platform 958 (preferably constructed of aluminum) disposed over the at least one load cell 957. In this embodiment, there are plural load cells 957, preferably six (6) 957A-F. The load cells 957A-F are spaced apart on the base 956 and each fixed to the base via a fastener 959A-F. One end of the load cell is preferably aligned with a depression 954 in the floor of the base 956. A foam insert 953 is preferably placed in the depression 956. A sealing member 960A-F is disposed on the top of each load cell 957A-F. The sealing members 960 have pair of apertures. The platform 958 is fixedly connected to each load cell 957 via a fastener 966 inserted through apertures 967. Referring also to FIG. 153, the scale 955 includes a set of compliant elements 961, 962 and 962 A-F which is disposed between each load cell 957, in layered or laminated fashion from bottom to top. An additional top element 952 is disposed on top of the set at each end of the scale 955. Seals 963A-B are disposed on the sides of the base/platform 956/958. Seals 964A-F extend around the sides and ends of the assembled scale 955. These seals 964 permit movement of the platform within the roadway. Compliant members 961-944 are preferably constructed of foam. The preferred foam is a very low durometer (i.e. soft) foam. The most preferred foam has a compressibility of approximately 25 percent deflection at approximately 2.0 psi. A gel 966 is preferably injected around the layered foam set 961-964. The gel 966 is preferably a silicone gel that is very soft and reenterable; that is to say very flexible, but not compressible. Scale seals 964A-F are preferably constructed of a medium durometer (for example approximately 15.0 psi) silicone foam. After placement in an operating environment, for example a road way such as that shown in FIGS. 128-130, a grout is preferably placed over the platform 958, in the space between the seals 964 as shown in FIG. 153. The grout may be epoxy, plastic or polyurethane based. In this embodiment, the load cells are single ended, shear beam type load cells.

FIG. 146 shows an alternative embodiment of the base 970 for scale 955. Base 970 has pockets 971A-x formed by walls 972A-x disposed between load cells. Recesses 973A-x are for placement of the load cell, adjacent aperture sets 974A-x. The pockets 971 serve as air pockets for compression. They may be filled with foam, or simply taped over to form a seal. Walls 972 are not required to define the pockets 961, but are preferred to add strength in higher load capacity scales. FIG. 147 shows an embodiment of the platform 980 including a cavity 985 with indent sets (982, 983 and 984 A-x) and end indent 981.

FIG. 148 is an exploded view of another alternative embodiment of the strip scale 985. The scale 985 is substantially similar to the scale 955 of FIGS. 145-147, except includes a single compliant member 990A-F in place of the 3 or 4 part set of members 961, 962, 963 and 964. Scale 985 comprises base 986, load cells 987A-F, sealing member 988A-F, and platform 989.

FIGS. 149-153 show variations, in crossectional views of compliant element of in scale designs. Each scale includes a base, at least one load cell, and a platform. The crosssections are taken at the end or between load cells where plural load cells are used. FIG. 149 is a crossectional view, between the load cells, of scale 985 of FIG. 148 including the single foam layer 990. FIG. 150 discloses a variation with bubble structures 991 as or included in the compliant structure or element(s). FIG. 151 discloses the use of bags 992. FIG. 152 discloses the use of balls 993. And, FIG. 153 is a view of scale 955 of FIG. 145 including the plural foam layers or members 961, 962 and 963.

FIGS. 154-158 disclose a perspective view of an embodiment of a load cell 1000 for use with strip scales. Load cell 1000 has a unitary structure constructed of a single piece of material. This embodiment has a length of 59.0 inches a height of 2.0 inches. The load cell can be constructed in other lengths, for example, 69.0 inch and 79.0 inch with the same height and lateral dimensions, by altering the dimensions of the bottom and top apertures. The cell 1000 has an I-Bean configuration with a base portion 1002, a center portion 1004 and a top portion 1006. The center portion 1004 is inset on its sides relative to the base and top portions 1002 and 1006. Base apertures 1008 are disposed at predetermined, spaced positions in the center portion 1004 and have a slot shape of predetermined dimensions. A pair of center apertures 1010A-B are aligned above each base aperture 1008, in the center portion 1004. Top apertures 1012 are disposed at spaces positions in the center portion 1004, staggered with respect to the base and center aperture pairs 1008 and 1010A/B. Top apertures 1012 overlap the center aperture 1010B of one set with 1010A of a following set of apertures 1010. A plurality of strain gauges, not shown, are coupled to the load cell 1000.

FIGS. 159-162 show variations, in end views of another embodiment of a load cell design. FIG. 159 shows the simplest embodiment wherein the load cell 1020 with base, center and top regions 1022, 1024 and 1026. FIG. 160 is an alternative cell 1040 having substantially the same structure of that of cell 1020 and including outside plates 1050A-B. FIG. 161 is another alternative cell 1060 having substantially the same structure of that of cell 1020 and including bent outside plates 1070A-B. FIG. 162 is yet another alternative cell 1080 having substantially the same structure of that of cell 1020 and including inside plates 1090A-B. FIGS. 163 and 164 are front and end views of the load cell 1020 of FIG. 159. The center portion 1024 is inset on its sides relative to the base and top portions 1022 and 1026. Base apertures 1028 are disposed at predetermined, spaced positions in the center portion 1024 and have a slot shape of predetermined dimensions. A pair of center apertures 1030A-B are aligned above each base aperture 1028, in the center portion 1024. Top apertures 1032 are disposed at spaces positions in the center portion 1034, staggered with respect to the base and center aperture pairs 1028 and 1030A/B. Top apertures 1032 overlap the center aperture 1030B of one set with 1030A of a following set of apertures 1030. Center channel segments 1034 are disposed between center apertures 1030. FIGS. 165 and 166 are front and end views of the load cell 1080 of FIG. 162. FIGS. 167 and 168 are front and end views of the load cell 1040 of FIG. 160. And, FIGS. 169 and 170 are front and end views of the load cell 1060 of FIG. 161.

FIGS. 171-74 show variations, in end views of another embodiment of a load cell design. FIG. 171 shows the simplest embodiment wherein the load cell 1120 with base, center and top regions 1122, 1124 and 1126. FIG. 172 is an alternative cell 1140 having substantially the same structure of that of cell 1020 and including outside plates 150A-B. FIG. 173 is another alternative cell 1160 having substantially the same structure of that of cell 1120 and including bent outside plates 1170A-B. FIG. 174 is yet another alternative cell 1180 having substantially the same structure of that of cell 1120 and including inside plates 1190A-B. FIGS. 175 and 176 are front and end views of the load cell 1120 of FIG. 171. The center portion 1124 is inset on its sides relative to the base and top portions 1122 and 1126. Base apertures 1128 are disposed at predetermined, spaced positions in the center portion 1124 and have a slot shape of predetermined dimensions. A pair of center apertures 1130A-B are aligned above each base aperture 1128, in the center portion 1124. Top apertures 1032 are disposed at space positions in the center portion 1134, staggered with respect to the base and center aperture pairs 1128 and 1130A/B. Top apertures 1132 overlap the center aperture 1130B of one set with 1130A of a following set of apertures 1130. Center channel segments 1134 are disposed between center apertures 1130. FIGS. 177 and 178 are front and end views of the load cell 1180 of FIG. 174. FIGS. 179 and 180 are front and end views of the load cell 1140 of FIG. 172. And, FIGS. 181 and 182 are front and end views of the load cell 1160 of FIG. 173.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A scale comprising, a base for placement on a surface, the base having an elongated configuration, a plurality of load cell pairs communicatively connected to the base, a platform disposed over the base, the platform being communicatively connected to the at least one load cell, at least one sealing compliant assembly disposed between each load cell and the platform, and a compliant assembly disposed between each pair of load cells, each compliant assembly including at least two vertically stacked, discreet foam members disposed between the base and the platform.

2. The scale of claim 1, further comprising a compliant member disposed between each load cell and the base.

3. The scale of claim 1, wherein each load cell has a plurality of strain gauges.

4. The scale of claim 1, wherein the load cells are single ended, shear beam type load cells.

5. The scale of claim 1, wherein there are six load cells disposed on the base, spaced apart from each other.

6. The scale of claim 1, wherein the compliant assembly comprises three foam members stacked on top of each other; and wherein the complaint assembly foam members have a compressibility of approximately 25 percent deflection at approximately 2.0 psi.

7. The scale of claim 1, further comprising a compliant gel disposed between the base and the platform and surrounding the compliant assembly and filling the space between the base and the platform.

8. The scale of claim 1, further comprising a flexible foam seal member disposed on the sides and ends of the scale.

9. The scale of claim 1, for use in electronic, in-motion, high speed weighing of vehicles or cargo passing over the scale.

10. The scale of claim 1, wherein the base placement surface is a floor or road, or a component thereof, and wherein the base is embedded in the floor, road, or component thereof.

11. A scale adapted to be used in electronic, in-motion, high speed weighing of vehicles or cargo passing over the scale comprising,
- a base for placement on a surface, the base having an elongated configuration,
- at least four load cell communicatively connected to the base,
- a platform disposed over the base, the platform being communicatively connected to the load cells,
- at least one sealing compliant member disposed between each load cell and the platform;
- at least one compliant member disposed between that at least one load cell and the base, and
- a compliant assembly disposed between each pair of load cells, each compliant assembly including at least two vertically stacked, discreet foam members disposed between the base and the platform.

12. A scale adapted to be embedded in a roadway and used in electronic, in-motion, high speed weighing of vehicles or cargo passing over the scale comprising,
- a. a base for placement on a surface, the base having an elongated configuration,
- b. six load cells fixedly connected to the base and laterally spaced apart from each other,
- c. a platform disposed over the base, the platform being fixedly connected to each load cell,
- d. at least one sealing compliant member disposed between the each load cell and the platform;
- e. at least one compliant member disposed each load cell and the base;
- f. at least one compliant assembly disposed between each pair of load cells each compliant assembly including at least three vertically stacked, discreet foam members disposed between the base and the platform;
- g. a compliant gel disposed between the base and the platform and surrounding the compliant assembly and filling the space between the base and the platform; and
- h. a flexible seal disposed on the sides and ends of the scale.

* * * * *